US011872877B2

(12) United States Patent
Tani et al.

(10) Patent No.: US 11,872,877 B2
(45) Date of Patent: Jan. 16, 2024

(54) FUEL LID OPENER

(71) Applicant: NHK SPRING CO., LTD., Yokohama (JP)

(72) Inventors: Yoshihisa Tani, Ina (JP); Ken Toriyama, Ina (JP); Akinori Sasaki, Ina (JP)

(73) Assignee: NHK SPRING CO., LTD., Yokohama (JP)

( * ) Notice: Subject to any disclaimer, the term of this patent is extended or adjusted under 35 U.S.C. 154(b) by 594 days.

(21) Appl. No.: 17/058,824

(22) PCT Filed: May 30, 2019

(86) PCT No.: PCT/JP2019/021646
§ 371 (c)(1),
(2) Date: Nov. 25, 2020

(87) PCT Pub. No.: WO2019/230924
PCT Pub. Date: Dec. 5, 2019

(65) Prior Publication Data
US 2021/0206258 A1    Jul. 8, 2021

(30) Foreign Application Priority Data
May 30, 2018  (JP) .................................. 2018-103773

(51) Int. Cl.
*B60K 15/05* (2006.01)
*E05B 83/34* (2014.01)
*B60K 15/04* (2006.01)
*E05B 83/28* (2014.01)

(52) U.S. Cl.
CPC .............. *B60K 15/05* (2013.01); *E05B 83/34* (2013.01); *B60K 2015/0458* (2013.01); *B60K 2015/0538* (2013.01); *B60K 2015/0561* (2013.01); *B60K 2015/0576* (2013.01); *E05B 83/28* (2013.01)

(58) Field of Classification Search
CPC ............... B60K 15/05; B60K 15/0582; B60K 15/0584; B60K 15/0576; B60K 15/0515; B60K 15/0505; E05C 19/022
USPC ..................................................... 296/97.22
See application file for complete search history.

(56) References Cited

U.S. PATENT DOCUMENTS
2010/0045049 A1   2/2010  Persiani et al.

FOREIGN PATENT DOCUMENTS

| JP | H 7-309173 | 11/1995 |
| JP | 2002-21391 | 1/2002 |
| JP | 2008-238895 | 10/2008 |
| JP | A 2010-006114 | 1/2010 |
| JP | 5320646 B2 * | 10/2013 |

(Continued)

*Primary Examiner* — Dennis H Pedder
(74) *Attorney, Agent, or Firm* — Dority & Manning, PA

(57) ABSTRACT

A fuel lid opener-has: a heart cam mechanism that is structured so as to, each time a lifter is push-operated via a fuel lid, cause the lifter to alternately repeat advancing-out and withdrawing, and so as to push the fuel lid open due to advancing-out of the lifter; and a locking mechanism-that can restrict operation of the heart cam mechanism. At the locking mechanism, a time when a stopper is moved by operation of a motor, and the aforementioned restricting is released, the aforementioned stopper engages with the heart cam mechanism and operates the heart cam mechanism. Due thereto, the lifter advances-out, and the fuel lid is pushed open.

6 Claims, 51 Drawing Sheets

(56) References Cited

FOREIGN PATENT DOCUMENTS

| JP | 2014-118693 | 6/2014 | | |
|----|----|----|----|----|
| JP | 2014-120232 | 6/2014 | | |
| JP | A 2015-209689 | 11/2015 | | |
| JP | 2016-75099 | 5/2016 | | |
| JP | 5926173 B2 * | 5/2016 | .......... | B60L 11/1818 |

* cited by examiner

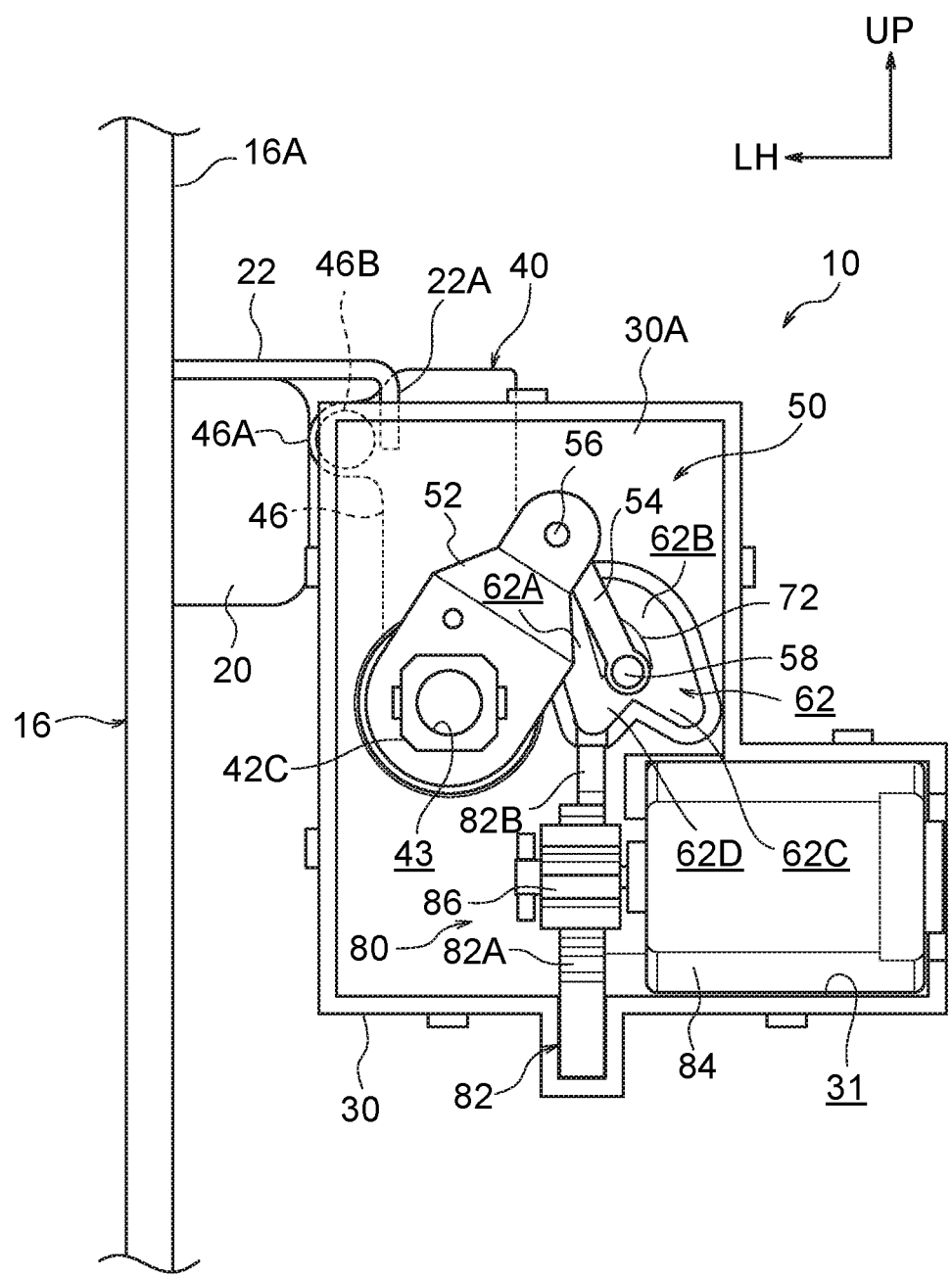

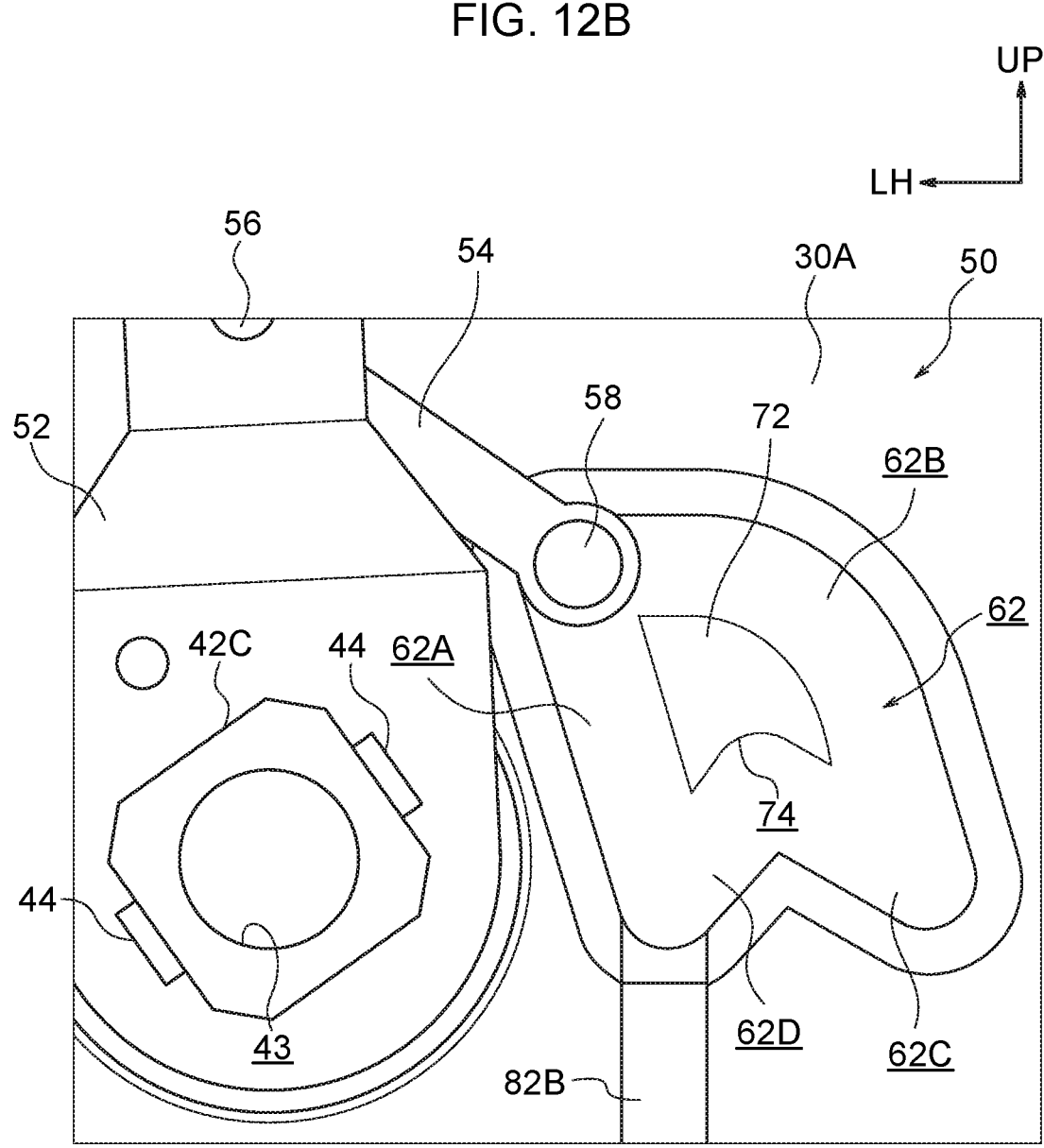

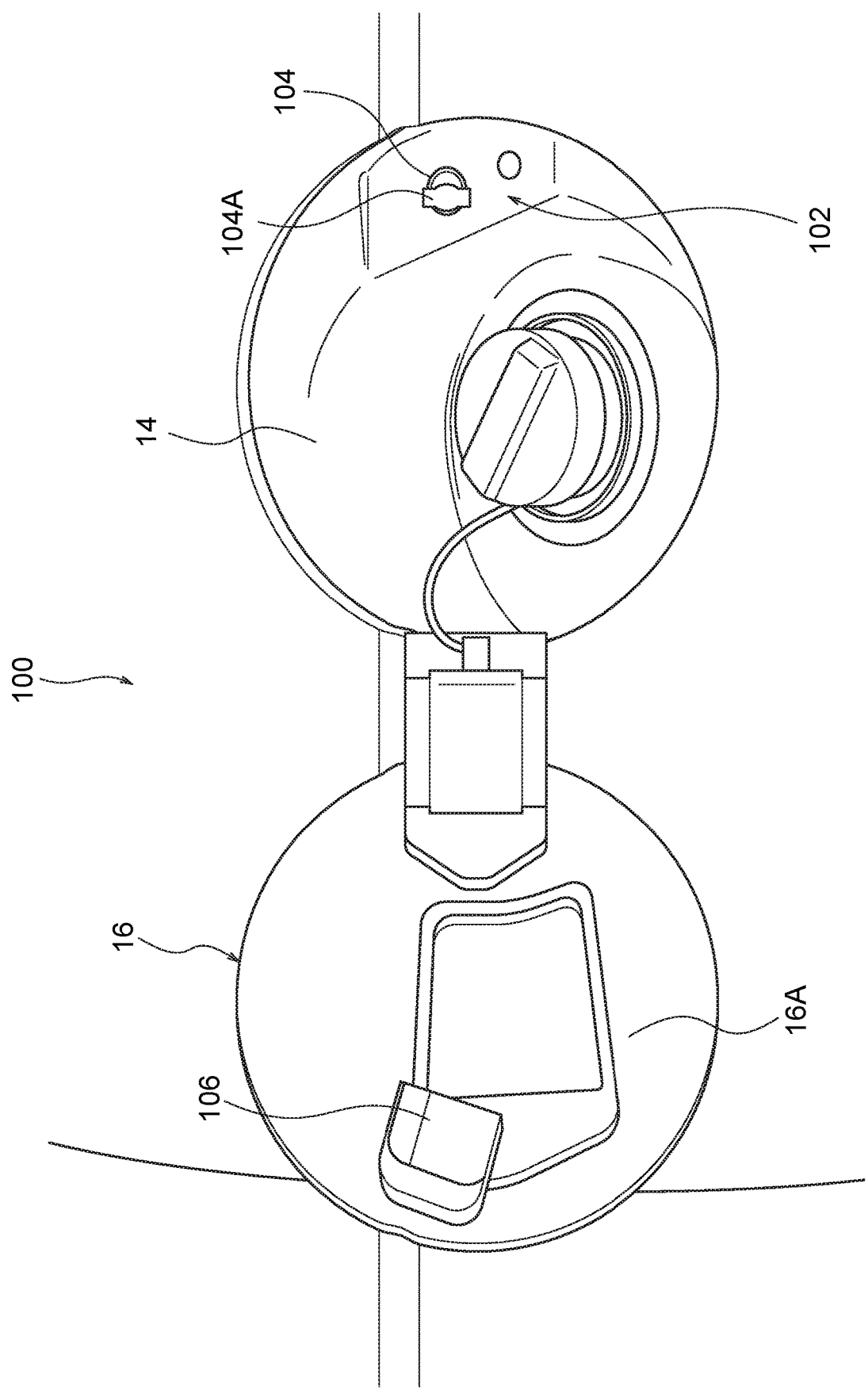

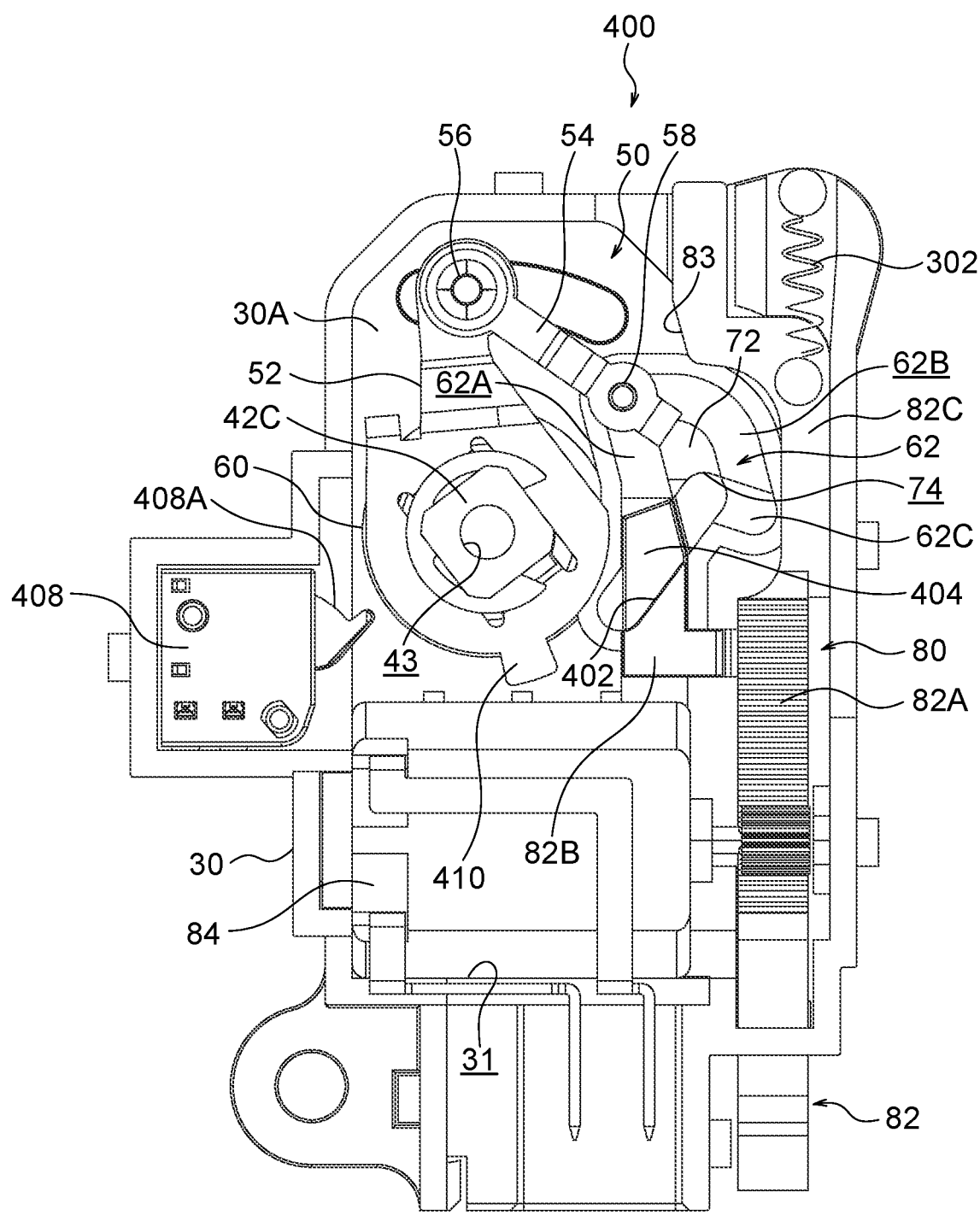

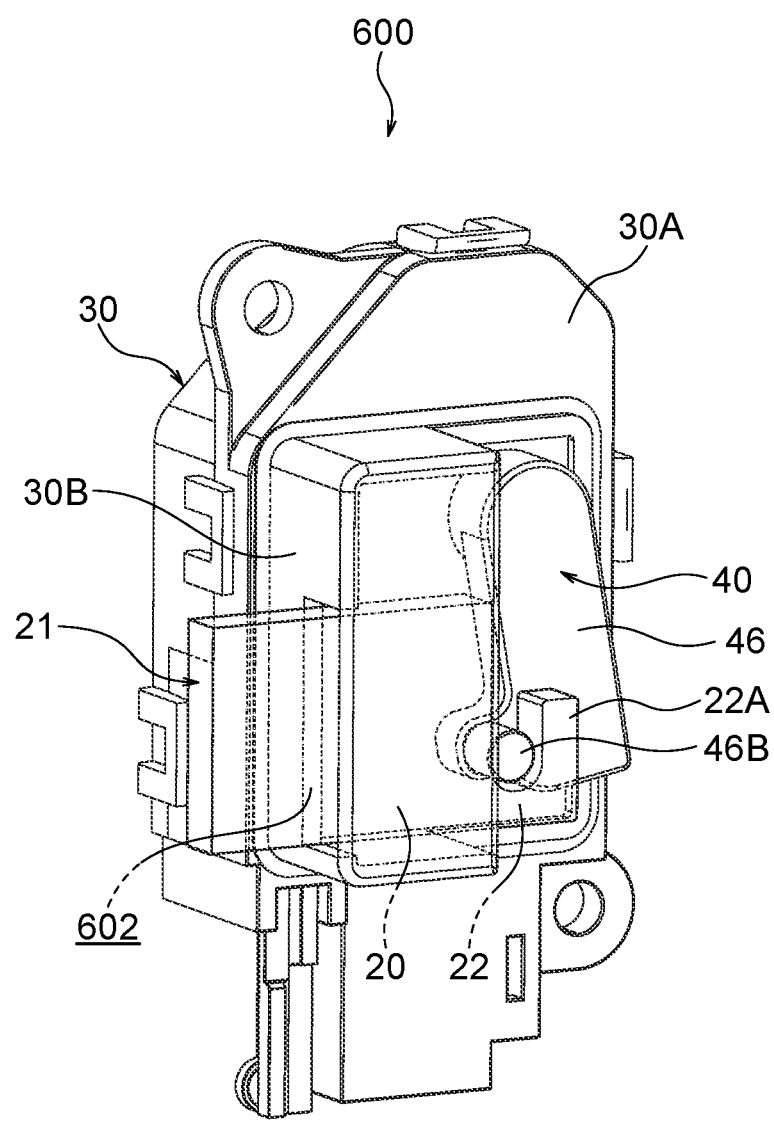

FUEL LID OPENER

TECHNICAL FIELD

The present invention relates to a fuel lid opener that pushes a fuel lid of a vehicle open.

BACKGROUND ART

The fuel supplying portion structure of a vehicle that is disclosed in Japanese Patent Application Laid-Open (JP-A) No. 2010-6114 has a fuel lid that can open and close a refueling opening of a vehicle body, and a fuel adapter (lid box) that runs from the refueling opening to a fuel supply port. A locking mechanism that locks the fuel lid, and a knock cam type push lifter that pushes the fuel lid open by a pushing operation, are separately mounted to the lid box.

On the other hand, the lid device disclosed in JP-A No. 2015-209689 is a structure that carries out locking and unlocking of a fuel lid by a push rod that a knock-cam-type push lifter has. In this lid device, the push rod is locked by an electric locking mechanism that is fixed to an opening portion housing (lid box) together with the push lifter. This push rod rotates forward by 90° around its axis while being displaced from a sunken-in position to a projecting position at the time when the fuel lid is pushed open. Due thereto, the engagement of the fuel lid and an anchor piece (head hammer), which is provided at the distal end portion of the push rod, is released, and the fuel lid is unlocked. Further, the push rod rotates reversely by 90° around its axis while being displaced from the projecting position to the sunken-in position at the time of closing the fuel lid. Due thereto, the aforementioned head hammer locks the fuel lid. Further, this is a structure in which, due to the electric locking mechanism locking the push rod in this state, the push rod is maintained in the locking state.

In the lid opening/closing device (fuel lid opener) disclosed in U.S. Patent Application Publication No. 2010/0045049, in the same way as in the lid device disclosed in JP-A No. 2015-209689, there is a structure in which locking and unlocking of a fuel lid is carried out by the push rod of a push lifter, and the push rod is locked by an electric locking mechanism that is made integral with the push lifter. In this lid opening/closing device, the push lifter is a heart cam type.

SUMMARY OF INVENTION

Technical Problem

By the way, as fuel lid openers, there are a type in which the fuel lid is opened by a push operation as in the prior art disclosed in above-described Patent Documents 1 through 3, and a type in which the fuel lid is opened due to a switch, which is provided within the passenger compartment, being operated, or a drive source such as a motor or the like being operated by the operation of a switch that senses push operation of the fuel lid. Because the structures of these two types of fuel lid openers differ greatly, the structures for mounting these fuel lid openers to a lid box cannot be standardized (used in common), and there are problems such as the design becomes complex and the like.

In view of the above-described circumstances, an object of the present invention is to provide a fuel lid opener in which, in a structure that can open a fuel lid by operation of a drive source, conversion to a structure in which the fuel lid is opened by a push operation is easy.

Solution to Problem

A fuel lid opener of a first aspect comprises: a case that is mounted to a lid box at which a fuel lid is pivotally supported so as to be able to open and close; a lifter that is supported so as to be able to advance or withdraw with respect to the case, and that contacts the fuel lid, which is in a closed state, from a reverse surface side; a push lifter mechanism that is provided within the case, and that is structured so as to cause the lifter to alternately repeat advancing-out and withdrawing, each time the lifter is push-operated via the fuel lid, and so as to push the fuel lid open due to advancing-out of the lifter; and a locking mechanism having a stopper, which is supported at the case so as to be movable between a locking position, at which the stopper restricts operation of the push lifter mechanism, and a lock releasing position, at which the stopper releases the restricting, and having a drive source that can move the stopper from the locking position to the lock releasing position, wherein, at a time when the stopper is moved to the lock releasing position, the stopper engages with the push lifter mechanism, operates the push lifter mechanism, and causes the lifter to advance-out.

In the first aspect, the case is mounted to the lid box at which the fuel lid is pivotally supported so as to be able to open and close. The lifter, which is supported so as to be able to advance and withdraw with respect to the case, contacts the fuel lid, which is in the closed state, from the reverse surface side. Further, the push lifter mechanism, which is provided within the above-described case, is structured so as to, each time the lifter is push-operated via the fuel lid, cause the lifter to alternately repeat advancing-out and withdrawing, and so as to push the fuel lid open due to the advancing-out of the lifter. Moreover, the locking mechanism has the stopper, which is supported at the above-described case so as to be able to move between a locking position of restricting operation of the push lifter mechanism and a lock releasing position of releasing this restricting, and a drive source that can move the stopper from the locking position to the lock releasing position. At the time when the stopper is moved to the lock releasing position by operation of the drive source, the stopper engages with the push lifter mechanism and operates the push lifter mechanism. Due thereto, the lifter advances-out, and the fuel lid is pushed open. In this way, this aspect is a structure that can open the fuel lid by operation of a drive source (there are cases in which this is called an "automatic opening type" hereinafter).

Moreover, because this aspect has the above-described push lifter mechanism, conversion to a structure in which the fuel lid is opened by a push operation (there are cases in which this is called a "manual opening type" hereinafter) is easy. Namely, the fuel lid opener can be changed to a manual opening type merely by changing the shape of the stopper and the like such that the stopper engages with the push lifter mechanism at the time of operation of the drive source. Therefore, conversion from an automatic opening type to a manual opening type is easy.

In a fuel lid opener of a second aspect, in the first aspect, the locking mechanism has an urging member that returns the stopper, which has been moved to the lock releasing position, to the locking position, and the push lifter mechanism is structured so as to permit withdrawing of the lifter at a time of closing the fuel lid in a state in which the stopper is positioned at the locking position.

In accordance with the second aspect, as described above, the stopper of the locking mechanism is moved from the locking position to the lock releasing position due to the drive source of the locking mechanism being operated. Due thereto, the restricting of operation of the push lifter mechanism is released, and the fuel lid is pushed open by the lifter. The stopper, which has been moved to the lock releasing position as described above, is returned to the locking position by the urging member of the locking mechanism. Even in a state in which the stopper is positioned at the locking position in this way, the push lifter mechanism permits withdrawing of the lifter at the time of closing the fuel lid, and therefore, the user can close the fuel lid. Further, when closing the fuel lid, the fuel lid enters into the locked state due to the locking mechanism at which the stopper is positioned at the locking position. Therefore, there is no need for a special operation for setting the fuel lid in the locked state.

In a fuel lid opener of a third aspect, in the first or second aspect, the lifter has an engaging portion that engages with an engaged portion provided at a reverse surface of the fuel lid, and that restrains the fuel lid in the closed state, engagement being released by advancing-out of the lifter at a time of pushing the fuel lid open.

In accordance with the third aspect, the lifter has the engaging portion that engages with the engaged portion provided at the reverse surface of the fuel lid, and that restrains the fuel lid in the closed state. Due thereto, it can be made such that the fuel lid that is in the closed state is not opened inadvertently. Further, the above-described engagement is released by the advancing-out of the lifter at the time of pushing the fuel lid open. Accordingly, there is no need for a special operation for releasing the above-described restraining.

In a fuel lid opener of a fourth aspect, in any one of the first through third aspects, the lifter has a rotating portion that rotates with respect to the case due to the lifter advancing or withdrawing with respect to the case, and the push lifter mechanism is a heart cam mechanism having: a cam groove that is formed in a heart shape as seen from a direction running along a rotation axis of the rotating portion; a first link that is mounted to the rotating portion; and a second link that is rotatably connected to the first link, and that has a guided portion that is inserted in the cam groove.

In accordance with the fourth aspect, the rotating portion of the lifter rotates due to the advancing/withdrawing of the lifter with respect to the case. The first link of the heart cam mechanism is mounted to this rotating portion. This heart cam mechanism has the second link that is rotatably connected to the first link, and the cam groove in which is inserted the guided portion that this second link has. When the above-described first link rotates together with the rotating portion, the second link that is connected to this first link rotates, and the guided portion of this second link is displaced within the cam groove. Because this cam groove is formed in a heart shape as seen from the direction running along the rotation axis of the above-described rotating portion, the heart cam mechanism (the push lifter mechanism) can be made to be thin in the direction running along the above-described rotation axis. As a result, the case, at whose interior the heart cam mechanism is provided, can be made to be thin in the direction running along the aforementioned rotation axis, and it is easy to ensure space for placement of the case.

In a fuel lid opener of a fifth aspect, in the fourth aspect, the stopper has: a stopper portion that is entered in the cam groove in a state in which the stopper is positioned at the locking position; and a mechanism operating portion that engages with the guided portion and operates the heart cam mechanism at a time when the stopper is moved to the lock releasing position.

In accordance with the fifth aspect, in the state in which the stopper is positioned at the locking position, the stopper portion that this stopper has is entered in the cam groove of the heart cam mechanism. Due thereto, displacement of the guided portion of the second link within the cam groove is restricted, and operation of the heart cam mechanism is restricted. Further, at the time when the stopper is moved to the lock releasing position by operation of the drive source, the mechanism operating portion that this stopper has engages with the above-described guided portion, and the heart cam mechanism operates. Because the fuel lid opener is structured this way, it suffices to omit the above-described mechanism operating portion from the above-described stopper at the time of changing from an automatic opening type to a manual opening type.

In a fuel lid opener of a sixth aspect, in the fourth or fifth aspect, the push lifter mechanism has a torsion spring, a spiral spring or a power spring, which is disposed coaxially with the rotation axis of the rotating portion of the lifter and that urges the lifter in an advancing-out direction.

In accordance with the sixth aspect, a torsion spring, spiral spring or power spring that the heart cam mechanism has urges the lifter in the advancing-out direction, and the fuel lid is pushed opened by the urging force of this spring. Because the aforementioned torsion spring, spiral spring or power spring is disposed (placed) coaxially with the rotation axis of the rotating portion that the lifter has, it is easy to ensure space for placement of the spring, as compared with a structure in which the rotating portion is urged by another type of spring (e.g., a coil spring).

Advantageous Effects of Invention

As described above, in accordance with the fuel lid opener relating to the present invention, in a structure that can open a fuel lid by operation of a drive source, conversion to a structure in which the fuel lid is opened by a push operation is easy.

BRIEF DESCRIPTION OF DRAWINGS

FIG. 10A is a side view in which the fuel lid that is in the closed state, and the fuel lid opener that is in the state in which the cover has been removed from the case, are seen from a vehicle rear side.

FIG. 12B is a side view showing a portion of FIG. 12A in an enlarged manner.

FIG. 14 is a side view showing structures at the periphery of a fuel lid at a vehicle to which a fuel lid opener relating to a Comparative Example is mounted.

FIG. 37 is a side view showing a state in which the cover has been removed from the case of a fuel lid opener relating to a fourth embodiment of the present invention.

FIG. 40 is a side view showing, in an enlarged manner, a portion of the structure shown in FIG. 37, and is a drawing for explaining the stroke of the second link pin at the time when a microswitch is turned on.

FIG. 45B is a perspective view showing a state in which the lifter is pushed-in further toward the vehicle transverse direction inner side than the withdrawn position, in the fuel lid opener relating to the sixth embodiment of the present invention.

DESCRIPTION OF EMBODIMENTS

First Embodiment

Figure 1:
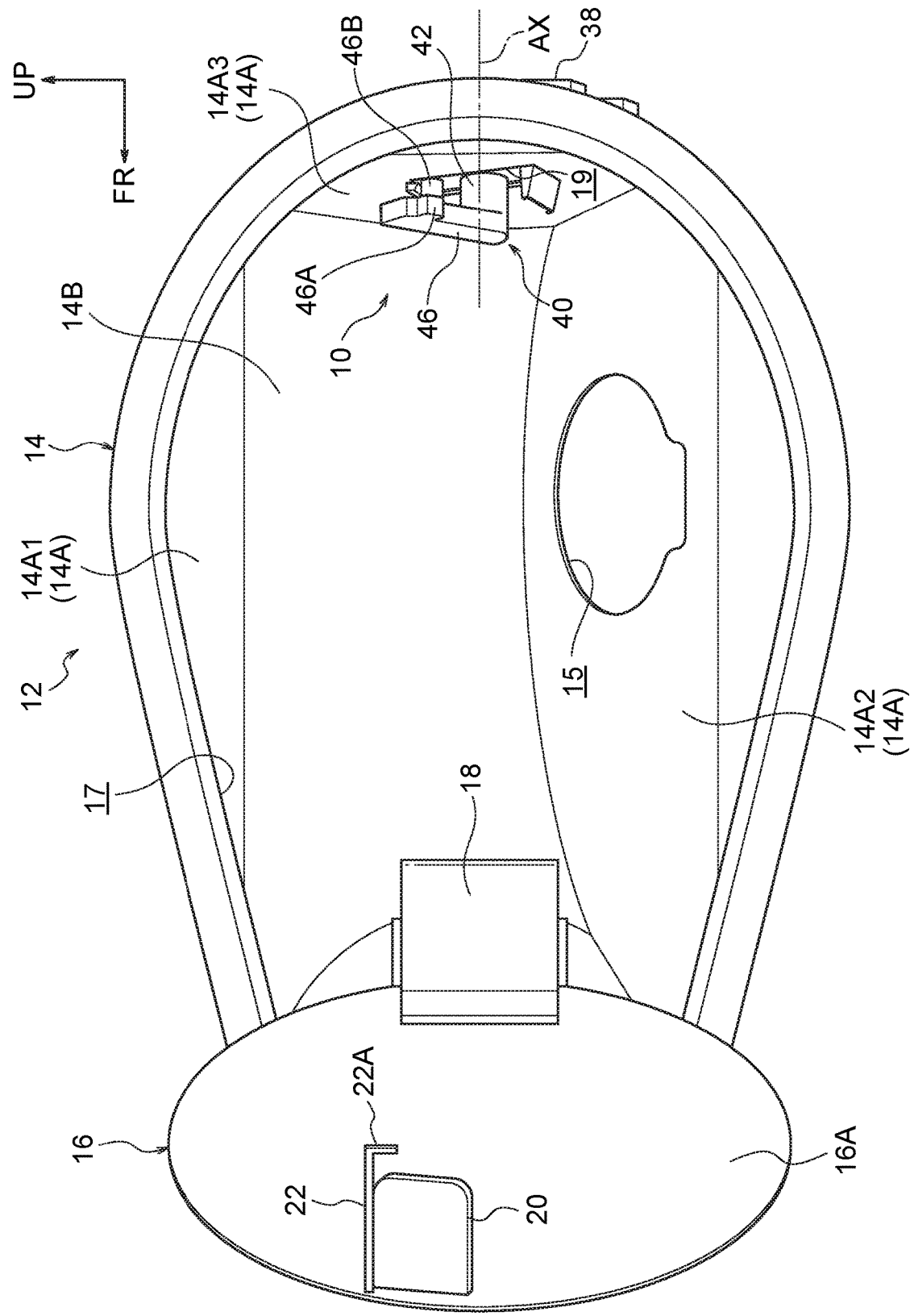
FIG. 1 is a front view showing a fuel lid assembly that is structured to include a fuel lid opener relating to a first embodiment of the present invention, and is a drawing showing an open state of a fuel lid.

A fuel lid opener 10 relating to a first embodiment of the present invention is described hereinafter by using FIG. 1 through FIG. 13B. Note that this first embodiment corresponds to the above-described "manual opening type", and is a reference example. The above-described "automatic opening type" is described in the third embodiment. Further, for convenience of explanation, arrows FR, UP, LH that are marked appropriately in FIG. 1 through FIG. 3 and in FIG. 8 through FIG. 13B respectively indicate the frontward, upward and leftward (inwardly in the vehicle transverse direction) of a vehicle at which the fuel lid opener 10 is provided. Hereinafter, when explanation is given by merely using longitudinal, left-right and vertical directions, they refer to the longitudinal of the vehicle longitudinal direction, the left and right of the vehicle left-right direction, and the vertical of the vehicle vertical direction, unless otherwise indicated. Further, in the respective drawings, there are cases in which some of the reference numerals are omitted in order to make the drawings easy to understand.

(Structure)

Figure 2:
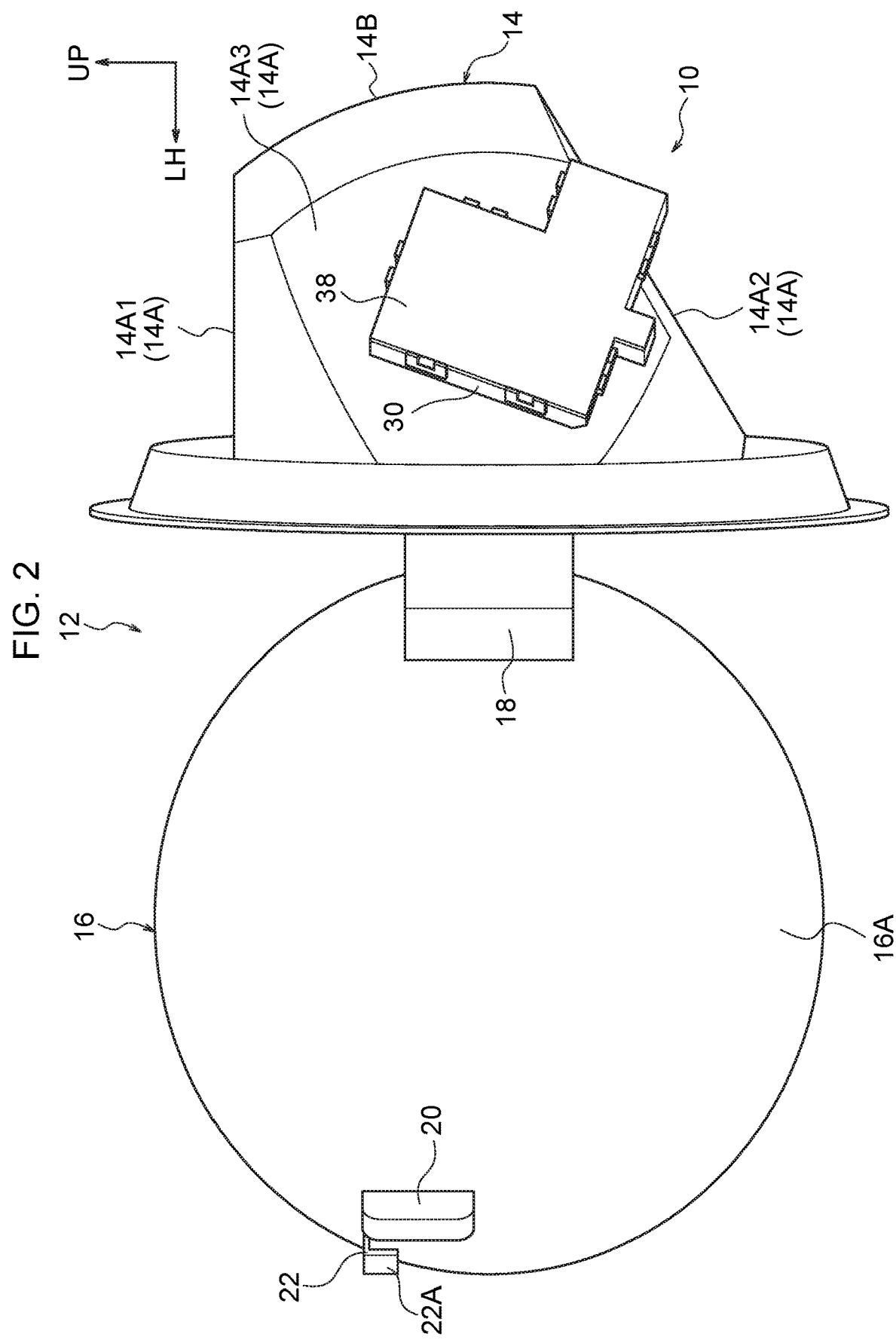
FIG. 2 is a side view of the fuel lid assembly shown in FIG. 1.
Figure 3:
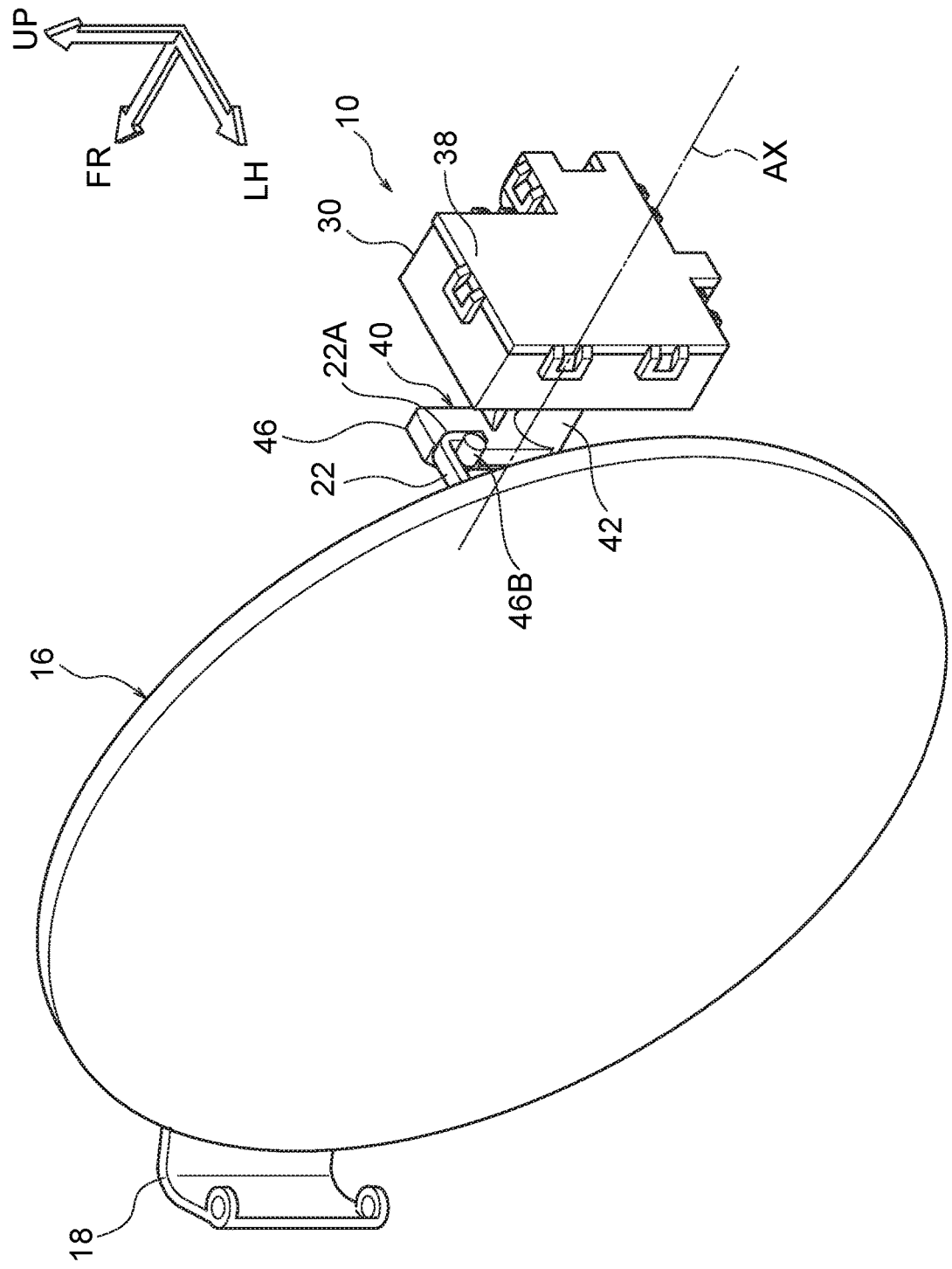
FIG. 3 is a perspective view showing the fuel lid in a closed state and the fuel lid opener.
Figure 4:
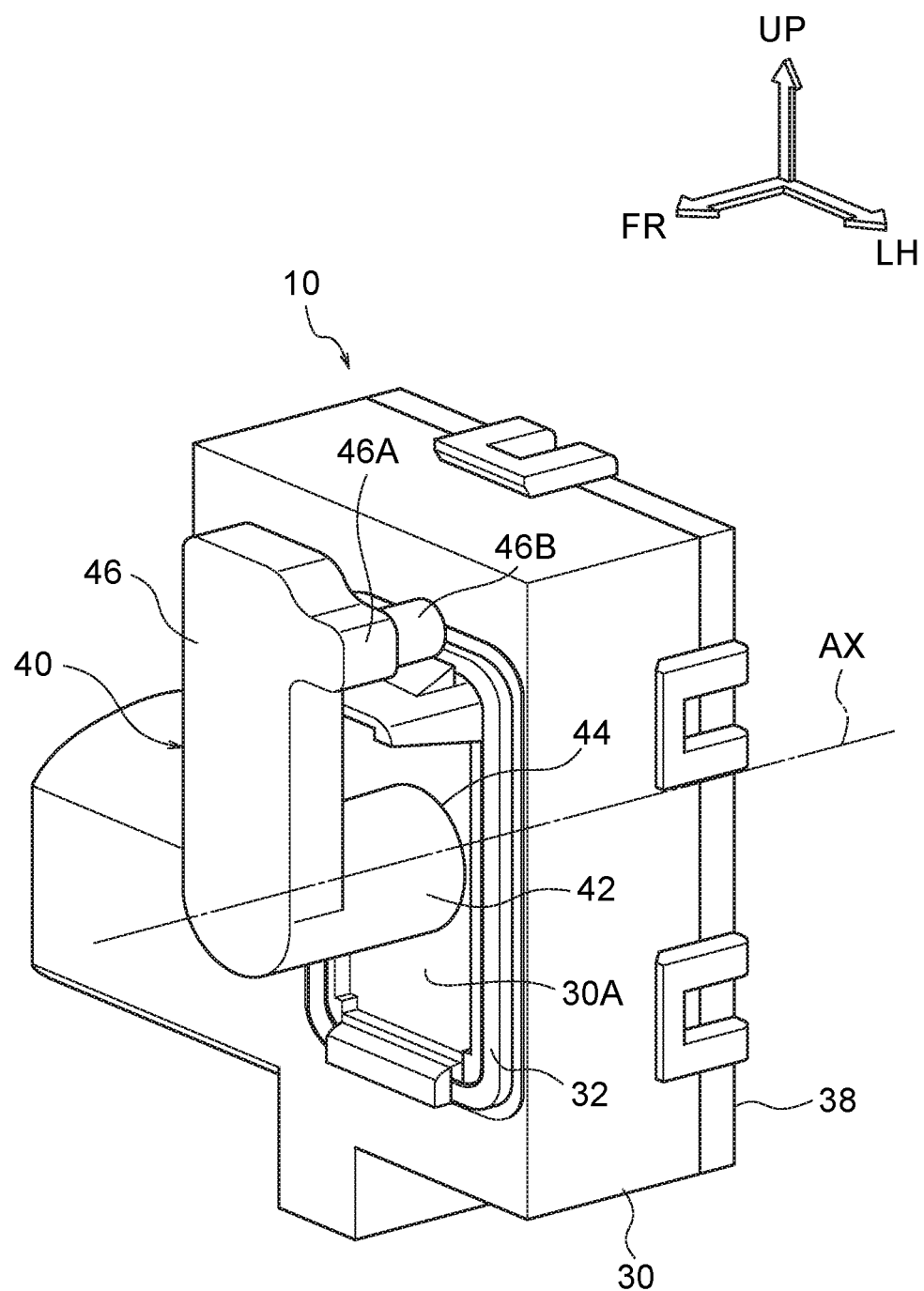
FIG. 4 is a perspective view of the fuel lid opener.

As shown in FIG. 1 and FIG. 2, the fuel lid opener 10 relating to the present embodiment is a structural component of a fuel lid assembly 12. This fuel lid assembly 12 is mounted to a left side portion (e.g., a quarter panel) of a vehicle such as an automobile or the like, and structures a portion of a fuel supplying section, and has a lid box 14, a fuel lid 16 which is pivotally-supported at the lid box 14 so as to be able to open and close, and the fuel lid opener 10 that is mounted to the lid box 14. Note that, in a case in which the fuel lid assembly 12 is mounted to a right side portion of the vehicle, the structure has left-right symmetry with respect to that of the present embodiment.

The lid box 14 is formed in the shape of an elongated box from a metal plate for example, and is disposed with the vehicle longitudinal direction being the length direction thereof. This lid box 14 is formed in the shape of a box whose vehicle transverse direction outer side (here, vehicle left side) is open, and has side walls 14A and a base wall 14B. The side walls 14A are structured by an upper wall 14A1, a lower wall 14A2, a rear wall 14A3, and an unillustrated front wall. A fuel supply port 15 is formed in the lower wall 14A2. This is a structure in which an unillustrated fuel supplying pipe is connected to the fuel supply port 15. Note that, although the vehicle relating to the present embodiment is a gasoline vehicle or a diesel vehicle, in a case in which the vehicle is a fuel cell vehicle, a hydrogen filling port is connected to the lid box 14, and, in a case in which the vehicle is an electric vehicle, a charging port is connected to the lid box 14.

The fuel lid 16 is formed in a disc shape and from a metal plate for example. A hinge portion 18 extends-out from a portion of the outer periphery of the fuel lid 16. This hinge portion 18 is pivotally supported at a length direction one end portion (the front end portion) of the lid box 14 via an unillustrated hinge shaft whose axial direction is the vehicle vertical direction. This fuel lid 16 can rotate with respect to the lid box 14 between an open position (the position shown in FIG. 1 and FIG. 2) at which the fuel lid 16 opens an opening portion 17 of the lid box 14, and a closed position (the position shown in FIG. 3) at which the fuel lid 16 closes the opening portion 17 of the lid box 14. Note that illustration of the lid box 14 is omitted in FIG. 3. This is a structure in which, in the state in which this fuel lid 16 is positioned at the closed position (a closed state), the above-described hinge portion 18 is disposed at the front end portion of the fuel lid 16.

Further, an unillustrated toggle spring for example is disposed between the fuel lid 16 and the lid box 14. This toggle spring is a structure that, in a state in which the fuel lid 16 is positioned further toward the closed position side than the central position between the closed position and the open position, urges the fuel lid 16 toward the closed position, and, on the other hand, in a state in which the fuel lid 16 is positioned further toward the open position side than the above-described central position, urges the fuel lid 16 toward the open position. Note that, in the case of a structure in which a drive source is operated and the fuel lid 16 is opened, there are also cases in which the fuel lid 16 is urged only in the opening direction.

A pushing portion 20 and an engaged portion 22 are provided at the end portion, which is at the side opposite the hinge portion 18, of the fuel lid 16, i.e., at the rear end portion of the fuel lid 16 that is in the closed state. The pushing portion 20 is formed in a rectangular parallelepiped shape of a metal plate for example, and is fixed to a reverse surface 16A of the fuel lid 16 by means such as welding or the like. This pushing portion 20 projects-out from the reverse surface 16A of the fuel lid 16 along the plate thickness direction of the fuel lid 16. The engaged portion 22 is formed in the shape of an L-shaped, elongated plate and by a metal plate for example, and a length direction one end portion thereof is fixed to the reverse surface 16A of the fuel lid 16 by means such as welding or the like. This engaged portion 22 projects-out from the reverse surface 16A of the fuel lid 16 along the plate thickness direction of the fuel lid 16, and the distal end portion thereof is a hooking portion 22A that is bent toward the lower side. The pushing portion 20 and the engaged portion 22 correspond to the fuel lid opener 10.

The fuel lid opener 10 is structured by a case 30, a cover 38, a lifter 40, a heart cam mechanism 50 that is the push lifter mechanism, and a locking mechanism 80. The case 30 is formed of resin for example, and is formed in the shape of a substantially rectangular box. This case 30 is fixed to the outer peripheral surface of the side wall 14A of the lid box 14 (here, the rear surface of the rear wall 14A3) by means such as fastening by screws or the like. This case 30 opens toward the vehicle rear side. This is a structure in which the opening portion of this case 30 is closed by the cover 38. This cover 38 is formed in the shape of a plate and of resin for example, and is mounted to the case 30 by means such as claw fitting or the like.

A base wall 30A of the case 30 is superposed on the rear surface of the rear wall 14A3 of the lid box 14. A through-hole 19 (see FIG. 1) that is rectangular is formed in this rear wall 14A3 at a position overlapping the base wall 30A. A sealing member 32, which is formed in the shape of a rectangular frame and of rubber for example, is sandwiched between the edge portion of this through-hole 19 and the base wall 30A. Further, a shaft receiving portion 34 that is formed in a cylindrical tubular shape is formed at the base wall 30A at a position overlapping the above-described through-hole 19. This shaft receiving portion 34 is disposed with substantially the vehicle longitudinal direction being the axial direction thereof, and there is a structure in which, in the closed state of the fuel lid 16, axis AX of the shaft receiving portion 34 runs along the plate surface direction of the fuel lid 16. Note that the plate surface direction of the fuel lid 16 is the direction that runs along the plate surface of the fuel lid 16. The inner side of this shaft receiving portion 34 is a shaft receiving hole (reference numeral omitted) that passes-through the base wall 30A. This shaft receiving portion 34 corresponds to the lifter 40.

As shown in FIG. 3 through FIG. 9, the lifter 40 is formed of resin for example, and has a shaft portion 42 that is formed in a solid cylindrical shape, and an arm portion 46 that extends in the radial direction of the shaft portion 42 from an axial direction one end portion of the shaft portion 42. A small-diameter portion 42A, whose diameter is smaller than the axial direction one end side of the shaft portion 42, is formed in the axial direction another end side of the shaft portion 42, and a step portion 42B is formed in a vicinity of the axial direction central portion of the shaft portion 42. The small-diameter portion 42A is inserted into the inner side of the shaft receiving portion 34 of the case 30 from the side opposite the cover 38 (from the vehicle front side), and is supported coaxially with and so as to be able to rotate relative to the shaft receiving portion 34. Due thereto, the lifter 40 is supported so as to be able to rotate around the axis AX of the shaft receiving portion 34 with respect to the case 30. Further, the step portion 42B of the shaft portion 42 abuts the base wall 30A of the case 30 from the vehicle front side, and displacement of the lifter 40 toward the vehicle rear side with respect to the case 30 is restricted. A link mounting portion 42C, which is formed in a substantially rectangular shape as seen from the direction running along the axis AX of the shaft portion 42, is formed at the axial direction another end portion of the shaft portion 42. A pair of anchor claws 44 that project-out toward the left and right both sides are formed at the left and right both side surfaces of the link mounting portion 42C. Further, a hole 43, which is circular and opens toward the vehicle rear side, is formed in the rear surface of the link mounting portion 42C. A projection 39 that is solid cylindrical and is formed at the cover 38 is fit in this hole 43 so as to be able to rotate relative thereto. Due thereto, this is a structure in which the shaft portion 42 of the lifter 40 is supported by the cover 38 as well.

The arm portion 46 extends in a rotation radial direction (here, toward the vehicle upper side) of the lifter 40 within the lid box 14, and is disposed so as to face the reverse surface 16A of the fuel lid 16, which is in the closed state, from the vehicle transverse direction inner side. When the lifter 40 rotates in one direction (the arrow A direction in FIG. 5) around the axis AX, the distal end portion (upper end portion) of this arm portion 46 is displaced (withdrawn) toward the vehicle transverse direction inner side, and, when the lifter 40 rotates in another direction (the arrow B direction in FIG. 5) around the axis AX, the distal end portion is displaced (advanced-out) toward the vehicle transverse direction outer side. Namely, in the present embodiment, there is a structure in which, due to the lifter rotating around the above-described axis AX, the arm portion 46 of the lifter 40 is displaced (advanced/withdrawn) in the vehicle transverse direction with respect to the case 30. Further, in the present embodiment, there is a structure in which the entire lifter 40 rotates due to the advancing/withdrawing of the arm portion 46 with respect to the case 30, and the entire lifter 40 is the "rotating portion".

A pushed portion 46A (see FIG. 8 and FIG. 9), which projects-out toward the vehicle transverse direction outer side (here, the vehicle left side), is provided at the distal end portion of this arm portion 46 of the lifter 40. The distal end surface (the vehicle transverse direction outer side surface) of this pushed portion 46A is an arc-shaped surface that is curved in the shape of an arc as seen from the vehicle longitudinal direction. Further, an engaging portion 46B (see FIG. 8 and FIG. 9) that is solid cylindrical is formed at the rear surface of this pushed portion 46A so as to project-out therefrom. This engaging portion 46B is disposed with the axial direction thereof being the direction running along the rotation axis AX of the lifter 40, and projects-out from the pushed portion 46A (the distal end portion of the arm portion 46) toward one side in the direction running along the above-described axis AX (here, toward the vehicle rear side). This engaging portion 46B and the pushed portion 46A are disposed so as to be lined-up in the direction running along the axis AX. The lifter 40 that has the above-described structure corresponds to the heart cam mechanism 50 that is provided within the case 30.

Figure 5:
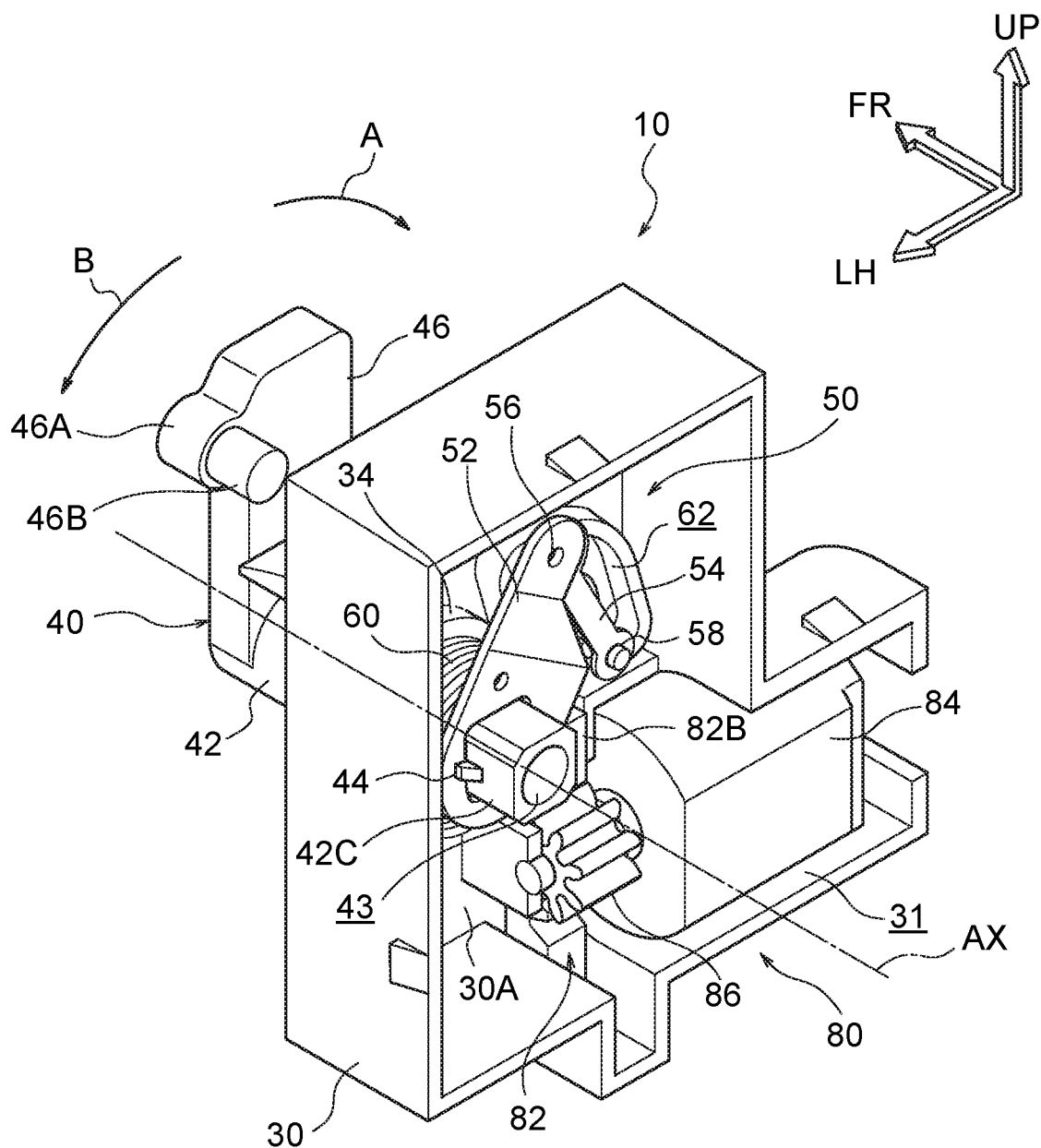
FIG. 5 is a perspective view showing a state in which a cover has been removed from a case of the fuel lid opener.
Figure 6:
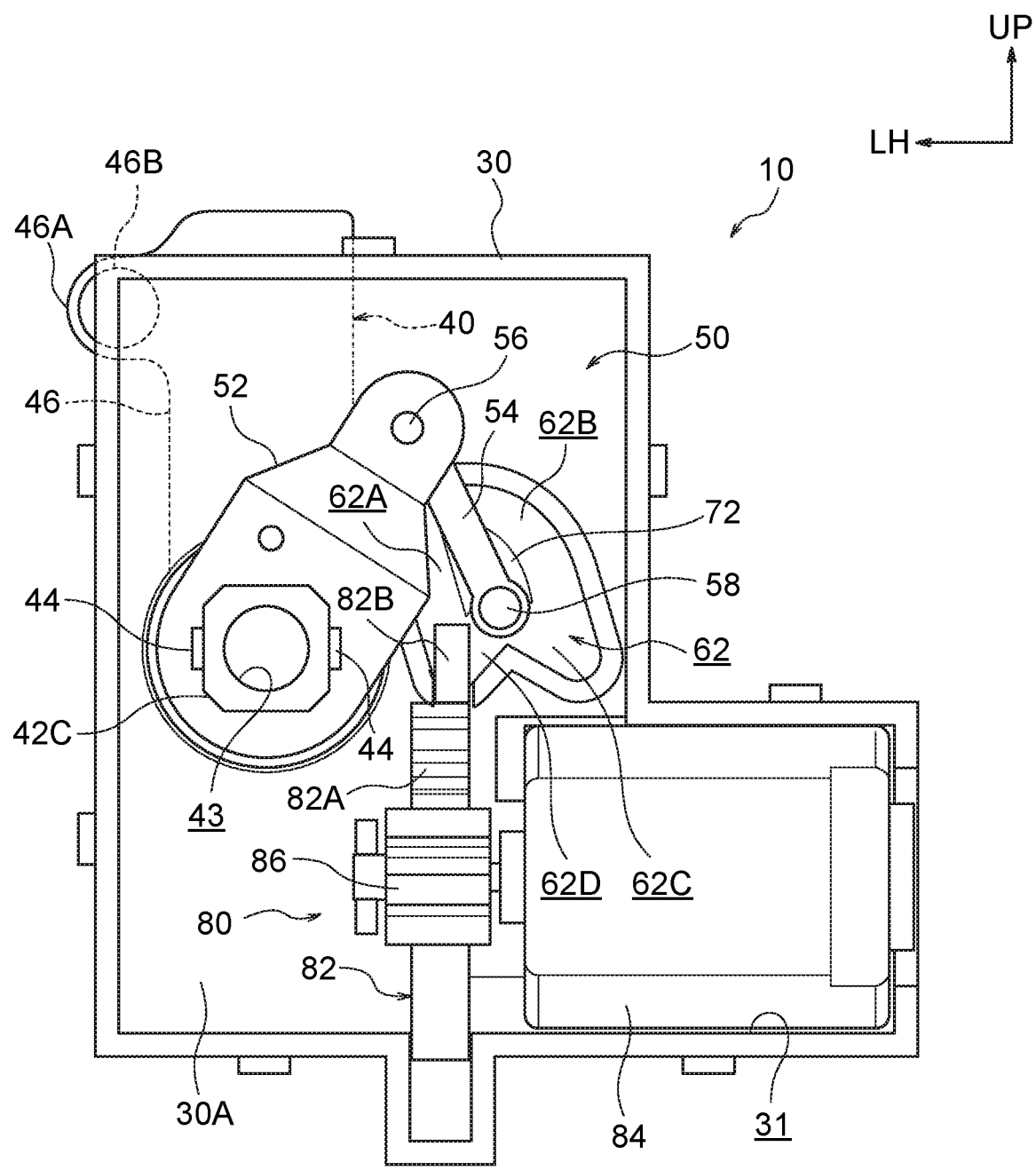
FIG. 6 is a side view showing the state in which the cover has been removed from the case of the fuel lid opener.
Figure 7:
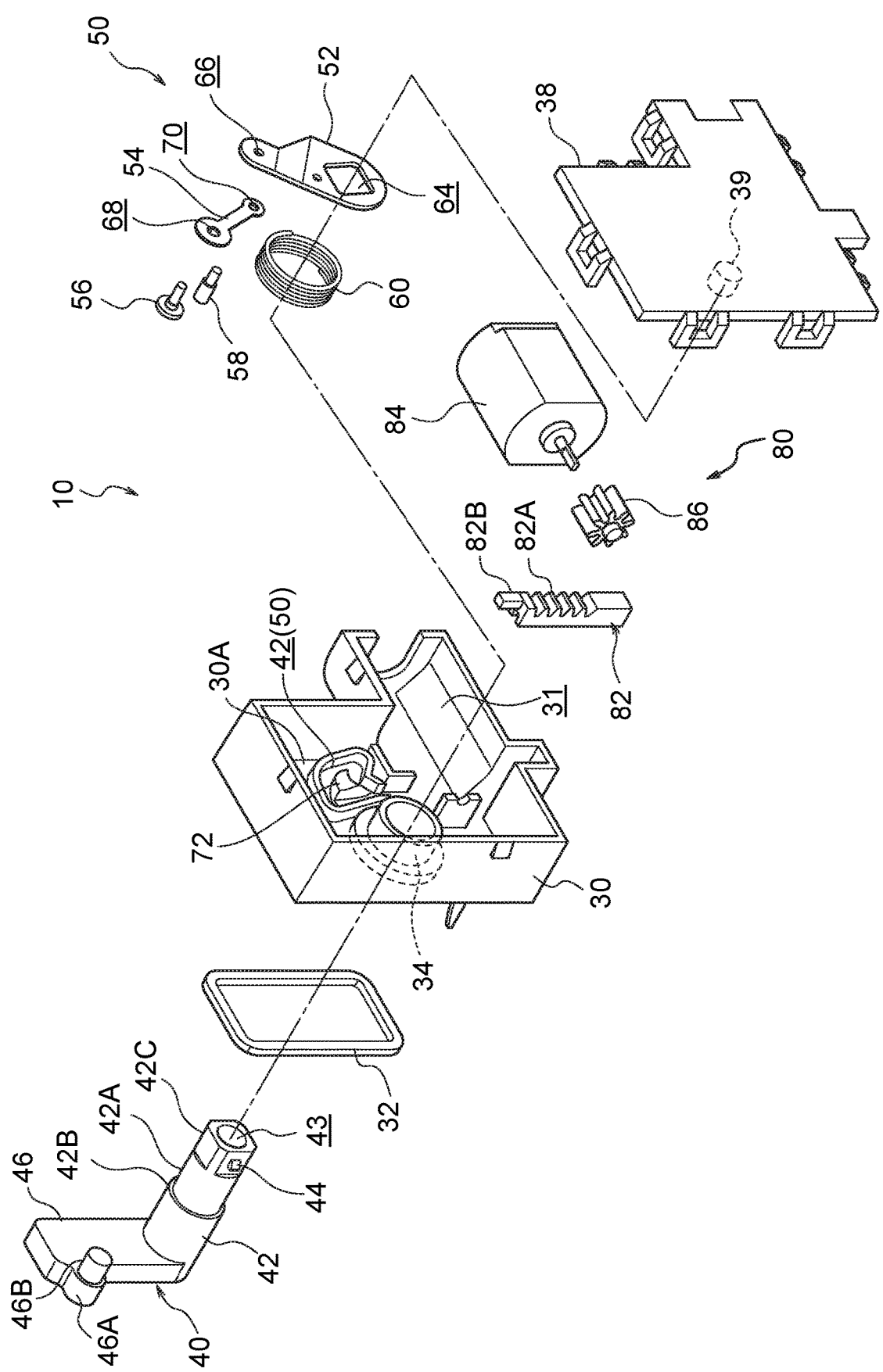
FIG. 7 is an exploded perspective view of the fuel lid opener.
Figure 8:
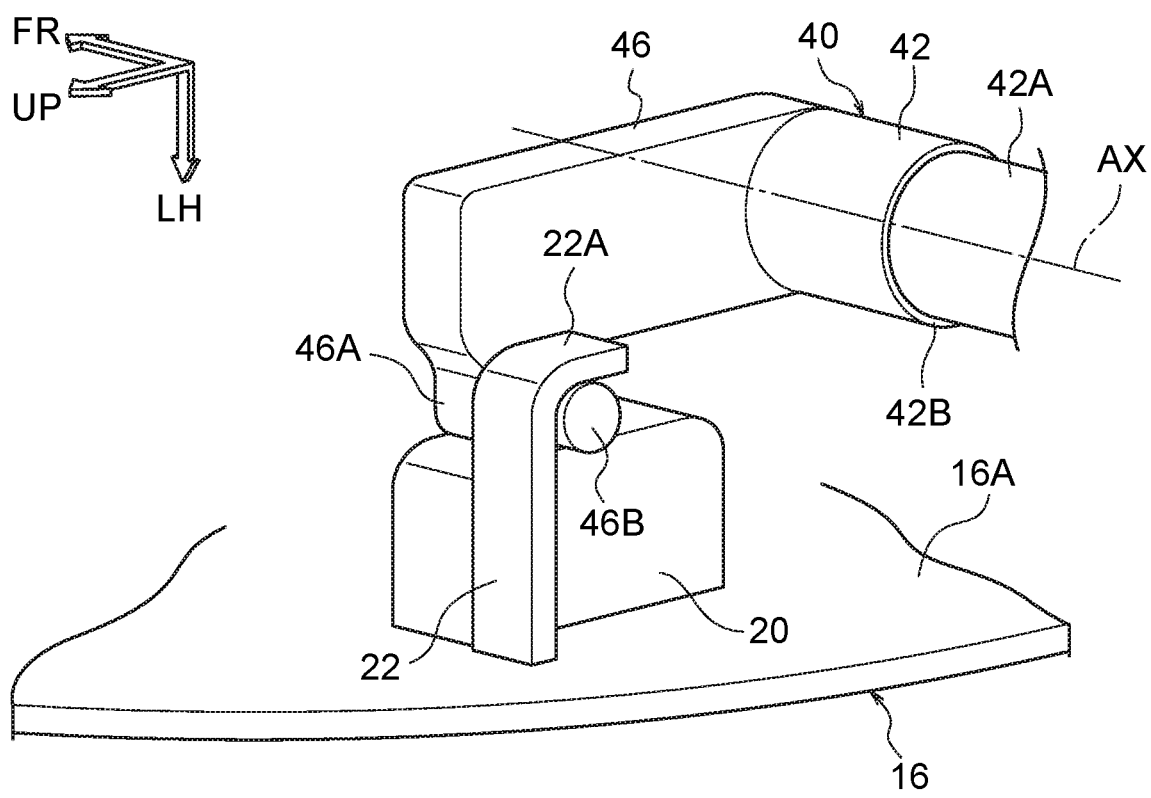
FIG. 8 is a perspective view showing a portion of engagement between a lifter of the fuel lid opener and the fuel lid.
Figure 9:
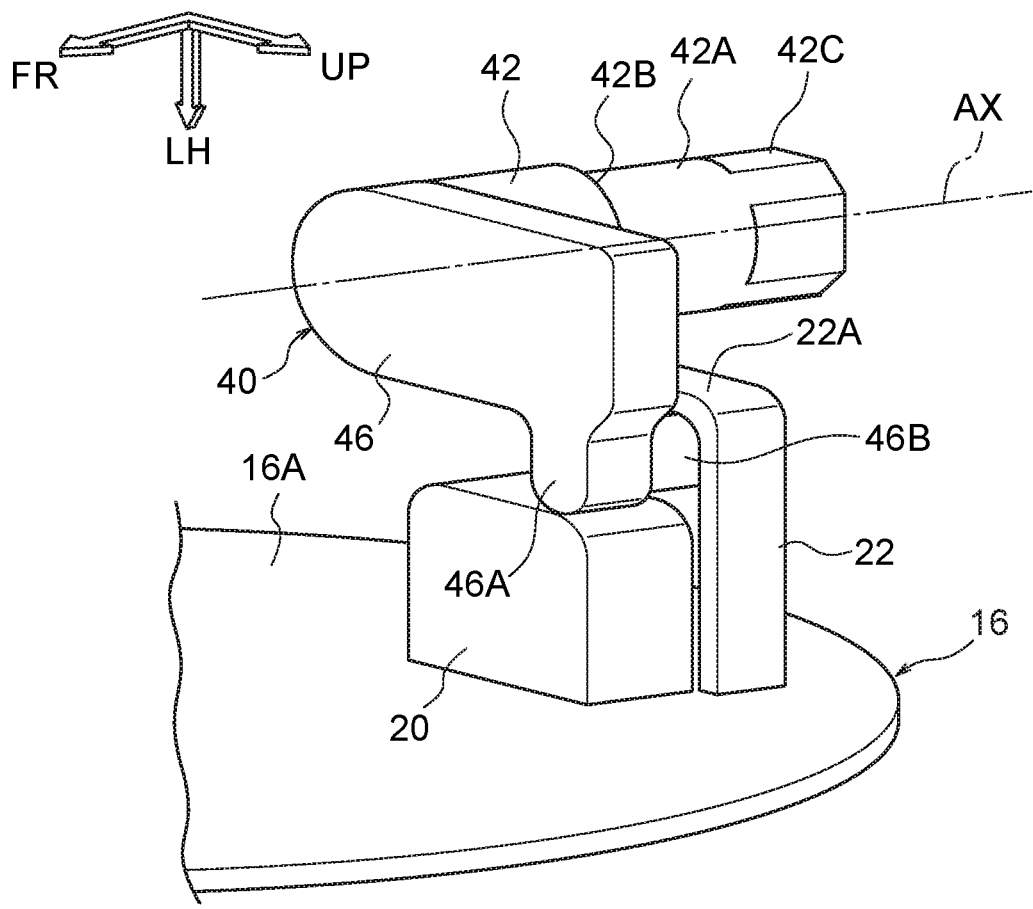
FIG. 9 is a perspective view in which the structure shown in FIG. 8 is seen from an angle different than in FIG. 8.

As shown in FIG. 5 through FIG. 7, the heart cam mechanism 50 is structured by a first link 52, a second link 54, a first link pin 56, a second link pin 58, a torsion spring 60 that serves as an urging member, and a cam groove 62 that is formed at the base wall 30A of the case 30. The first link 52 is formed by, for example, a metal plate being press molded, and is shaped as a plate whose cross-section is bent substantially in the shape of a crank. A through-hole 64 that is rectangular is formed in one end side of the first link 52. The link mounting portion 42C of the lifter 40 is fit in this through-hole 64, and the pair of anchor claws 44 hook on the edge portion of the through-hole 64. Due thereto, the first link 52 is mounted to the lifter 40, and displacement of the lifter 40 toward the vehicle front side with respect to the case 30 is restricted by the first link 52.

The torsion spring 60 spans between the first link 52 and the case 30. This torsion spring 60 is placed on the outer side of the outer periphery of the shaft receiving portion 34, and is disposed coaxially with the rotation axis AX of the lifter

40. This torsion spring 60 urges the lifter 40 in the another direction (the arrow B direction in FIG. 5; the advancing-out direction) around the axis AX. Note that a spiral spring or a power spring may be used instead of the torsion spring 60.

The second link 54 is formed in an elongated shape and from a metal plate for example. One end portion of this second link 54 is superposed on another end portion of the first link 52. Through-holes 66, 68 that are circular are formed in the another end portion of the first link 52 and in the one end portion of the second link 54, respectively. The first link pin 56 is inserted in these through-holes 66, 68. The first link pin 56 is a crimp pin that is made of metal for example, and is disposed with the axial direction thereof being a direction that is parallel to the rotation axis AX of the lifter 40. The first link 52 and the second link 54 are connected by this first link pin 56 so as to be able to rotate relatively.

A through-hole 70 that is circular is formed in another end portion of the second link 54. This through-hole 70 corresponds to the second link pin 58 that serves as the guided portion. The second link pin 58 is formed in the shaped of a stepped cylinder and of metal. The small-diameter portion of this second link pin 58 is inserted in the above-described through-hole 70, and the distal end portion thereof is crimped. Due thereto, the second link pin 58 is fixed to the another end portion of the second link 54. This second link pin 58 is disposed with the axial direction thereof being a direction that is parallel to the rotation axis AX of the lifter 40, and corresponds to the cam groove 62 that is formed in the base wall 30A of the case 30.

The cam groove 62 is formed in a heart shape (here, an upside-down heart shape) as seen from the direction running along the rotation axis AX of the lifter 40, and opens toward the vehicle rear side. This cam groove 62 has a first groove portion 62A that extends substantially in the vehicle vertical direction, and a second groove portion 62B that extends toward the vehicle transverse direction inner side from the upper end portion of the first groove portion 62A, and thereafter, extends toward the vehicle lower side. An island portion 72 that projects-out toward the vehicle rear side is formed between the first groove portion 62A and the second groove portion 62B. A concave portion 74 (see FIG. 11A through FIG. 13B) that is concave toward the vehicle upper side is formed in the lower surface of this island portion 72. Further, the above-described cam groove 62 has a third groove portion 62C that extends toward the concave portion 74 from the lower end portion of the second groove portion 62B, and a fourth groove portion 62D that extends toward the lower end portion of the first groove portion 62A from the concave portion 74. The previously-mentioned second link pin 58 is inserted within this cam groove 62. The distal end portion of this second link pin 58 is pushed against the bottom surface of the cam groove 62 by the spring property of the second link 54 for example. At this cam groove 62, an inclined surface is formed at the bottom surface of the first groove portion 62A, and steps are formed respectively between the bottom surface of the first groove portion 62A and the bottom surface of the second groove portion 62B, and between the bottom surface of the second groove portion 62B and the bottom surface of the third groove portion 62C, and between the bottom surface of the third groove portion 62C and the bottom surface of the fourth groove portion 62D. Due thereto, the displacement of the second link pin 58 along the cam groove 62 is limited to the direction of the first groove portion 62A→the second groove portion 62B→the third groove portion 62C→the fourth groove portion 62D. The locking mechanism 80 is disposed at the lower side of this cam groove 62.

The locking mechanism 80 has a stopper 82 that is disposed beneath the first cam groove 62, and a motor 84 that serves as the drive source and is disposed at the vehicle transverse direction inner side with respect to the stopper 82. The motor 84 is fit within a motor housing portion 31 that is formed at the lower portion of the case 30, and is supported at the case 30. A pinion 86 is mounted to the output shaft of the motor 84.

The stopper 82 is formed in an elongated shape and of resin for example, and is supported by the case 30 so as to be able to move vertically. Rack teeth 82A are formed at the rear surface of this stopper 82 so as to be lined-up vertically. The aforementioned pinion 86 meshes with these rack teeth 82A. Due to the motor 84 rotating forward, this stopper 82 is moved from the lock releasing position shown in FIG. 10A to the locking position shown in FIG. 6. Further, due to the motor 84 rotating reversely, this stopper 82 is moved from the aforementioned locking position to the aforementioned lock releasing position. This is a structure in which the motor 84 is rotated forward and reversely by the operation of a central door lock button (not illustrated) that is provided in a vicinity of the driver's seat of the vehicle for example.

A stopper portion 82B that projects-out toward the upper side is formed at the upper end portion of the stopper 82. This is a structure in which, in the state in which the stopper 82 is positioned at the aforementioned lock releasing position, this stopper portion 82B is disposed beneath the first groove portion 62A, and, in a state in which the stopper 82 is positioned at the aforementioned locking position, this stopper portion 82B is inserted in the lower end portion of the first groove portion 62A (within the cam groove 62; in detail, within the connected portion of the first groove portion 62A and the fourth groove portion 62D).

This is a structure in which, each time the arm portion 46 of the lifter 40 is push-operated in the one direction (the arrow A direction in FIG. 5) around the axis AX via the fuel lid 16, the heart cam mechanism (push lifter mechanism) 50 of the above-described structure causes the lifter 40 to alternately repeat rotation in the one direction and in the another direction around the axis (advancing-out and withdrawing of the arm portion 46), and, due to the aforementioned rotation of the lifter 40 in the another direction (the advancing-out of the arm portion 46), the fuel lid 16 is pushed open. Concrete description is given hereinafter.

Figure 10B:
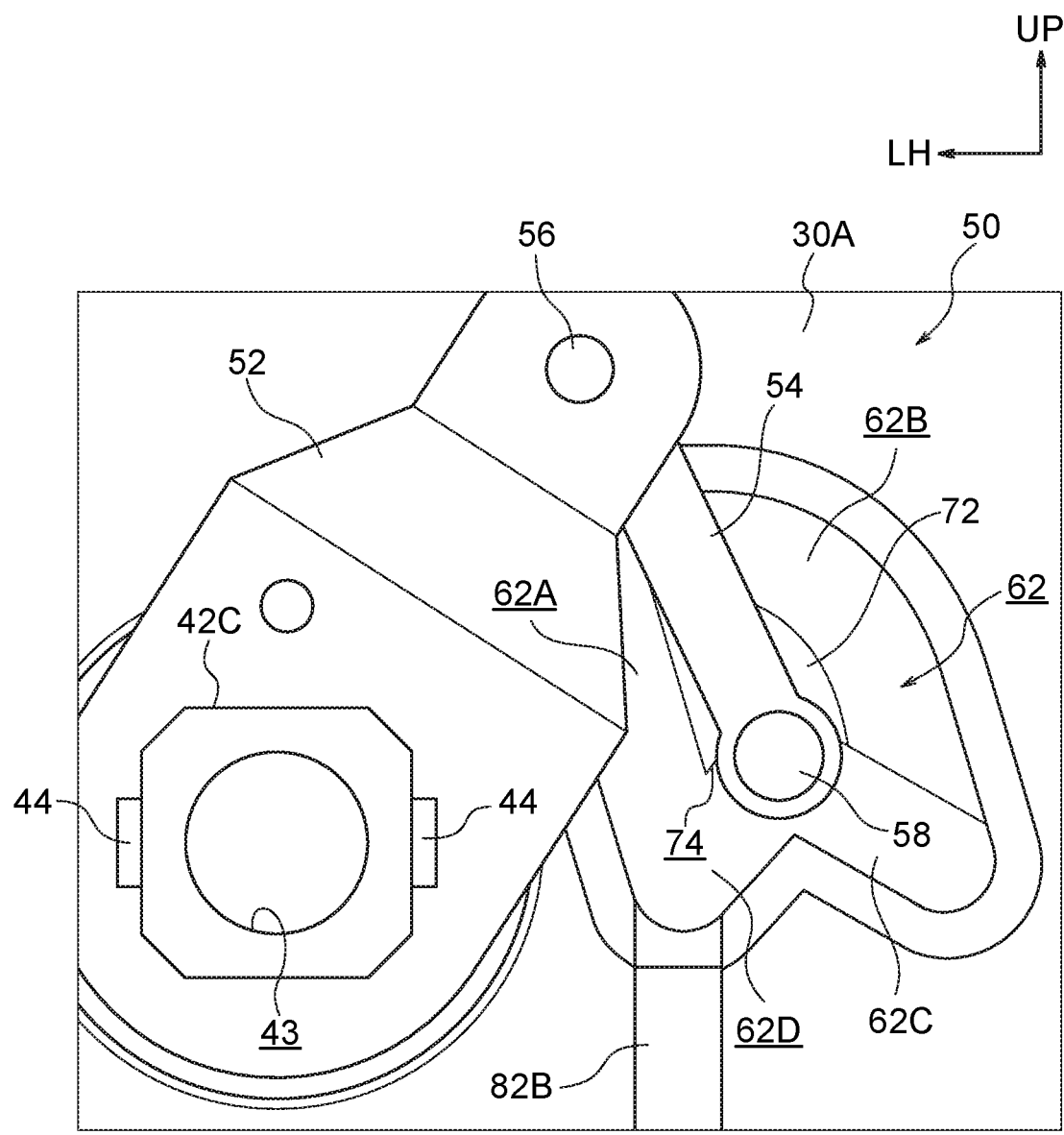
FIG. 10B is a side view showing a portion of FIG. 10A in an enlarged manner.

As shown in FIG. 3 and FIG. 8 through FIG. 10B, there is a structure in which, in the closed state of the fuel lid 16 (hereinafter, there are cases in which this is simply called "the closed state"), the lifter 40 is held at a withdrawn position by the heart cam mechanism 50, and the distal end portion of the arm portion 46 of the lifter 40 engages with the fuel lid 16 from the reverse surface 16A side. Concretely, in the closed state, the pushing portion 20 that is provided at the reverse surface 16A of the fuel lid 16 contacts the pushed portion 46A of the lifter 40 from the vehicle transverse direction outer side, and the hooking portion 22A of the engaged portion 22, which is provided at the reverse surface 16A of the fuel lid 16, hooks on the engaging portion 46B of the lifter 40 from the vehicle transverse direction inner side. Due thereto, there is a structure in which the fuel lid 16 is restrained (held) at the closed position. Further, this is a structure in which, in the closed state, as shown in FIG. 10A and FIG. 10B, the second link pin 58 of the heart cam mechanism 50 hooks on (is fit into) the concave portion 74 of the island portion 72 that is provided at the central portion of the cam groove 62.

Figure 11A:
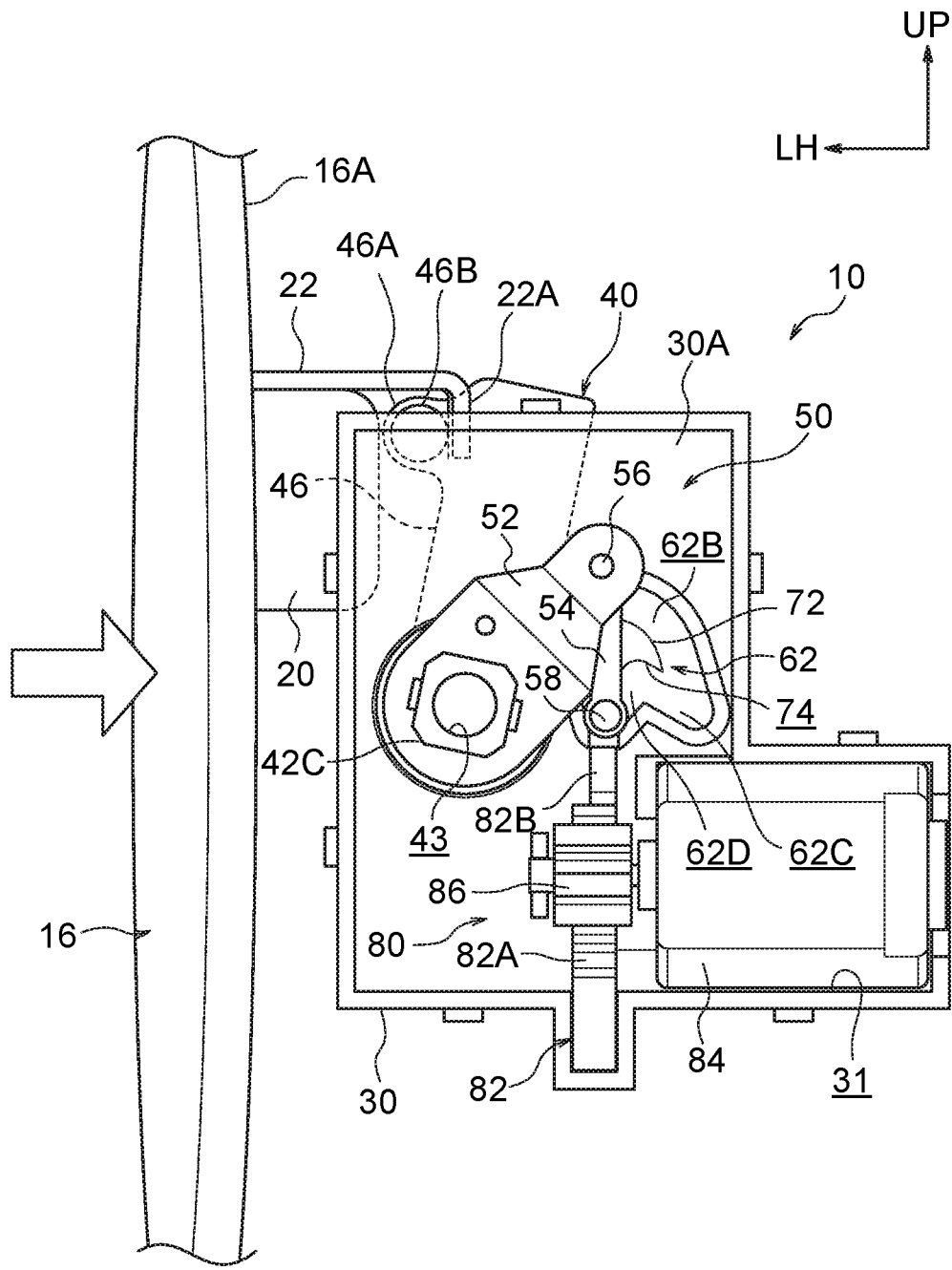
FIG. 11A is a side view that corresponds to FIG. 10A and shows a state in which the fuel lid is push-operated at a time of opening the fuel lid.
Figure 11B:
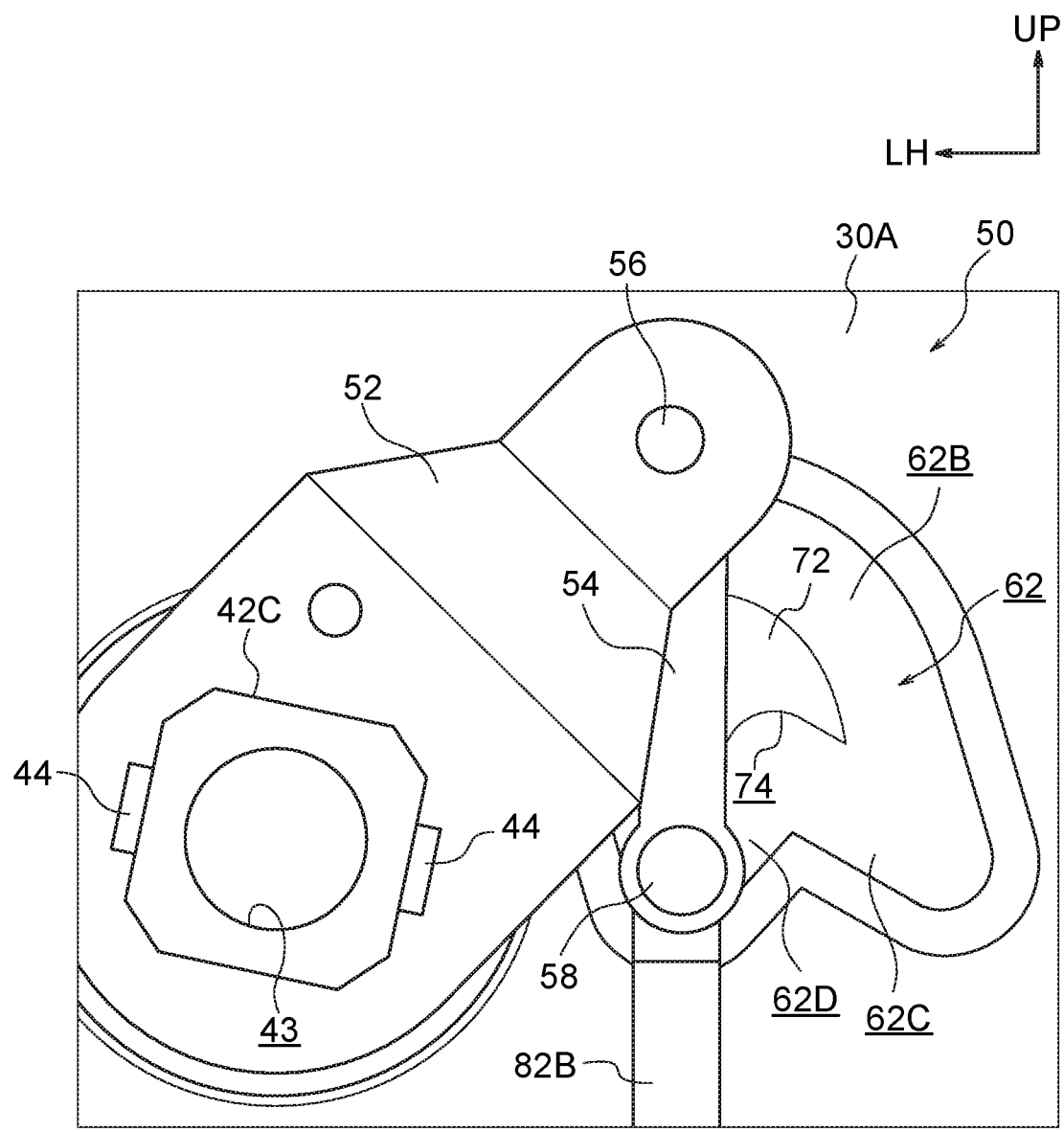
FIG. 11B is a side view showing a portion of FIG. 11A in an enlarged manner.

At the time of opening the fuel lid 16, as shown in FIG. 11A and FIG. 11B, the rear end portion of the fuel lid 16 (the end portion at the side opposite the hinge portion 18) is pushed-in from the vehicle outer side toward the vehicle transverse direction inner side. At this time, due to the pushed portion 46A of the lifter 40 being pushed toward the vehicle transverse direction inner side by the pushing portion 20 of the fuel lid 16, the lifter 40 is rotated in the one direction (the arrow A direction in FIG. 5) around the axis AX. Due thereto, the first link 52 and the second link 54 are rotated together with the lifter 40 in the one direction around the axis AX, and the second link pin 58 is displaced through the fourth groove portion 62D to the lower end portion of the first groove portion 62A.

Figure 12A:
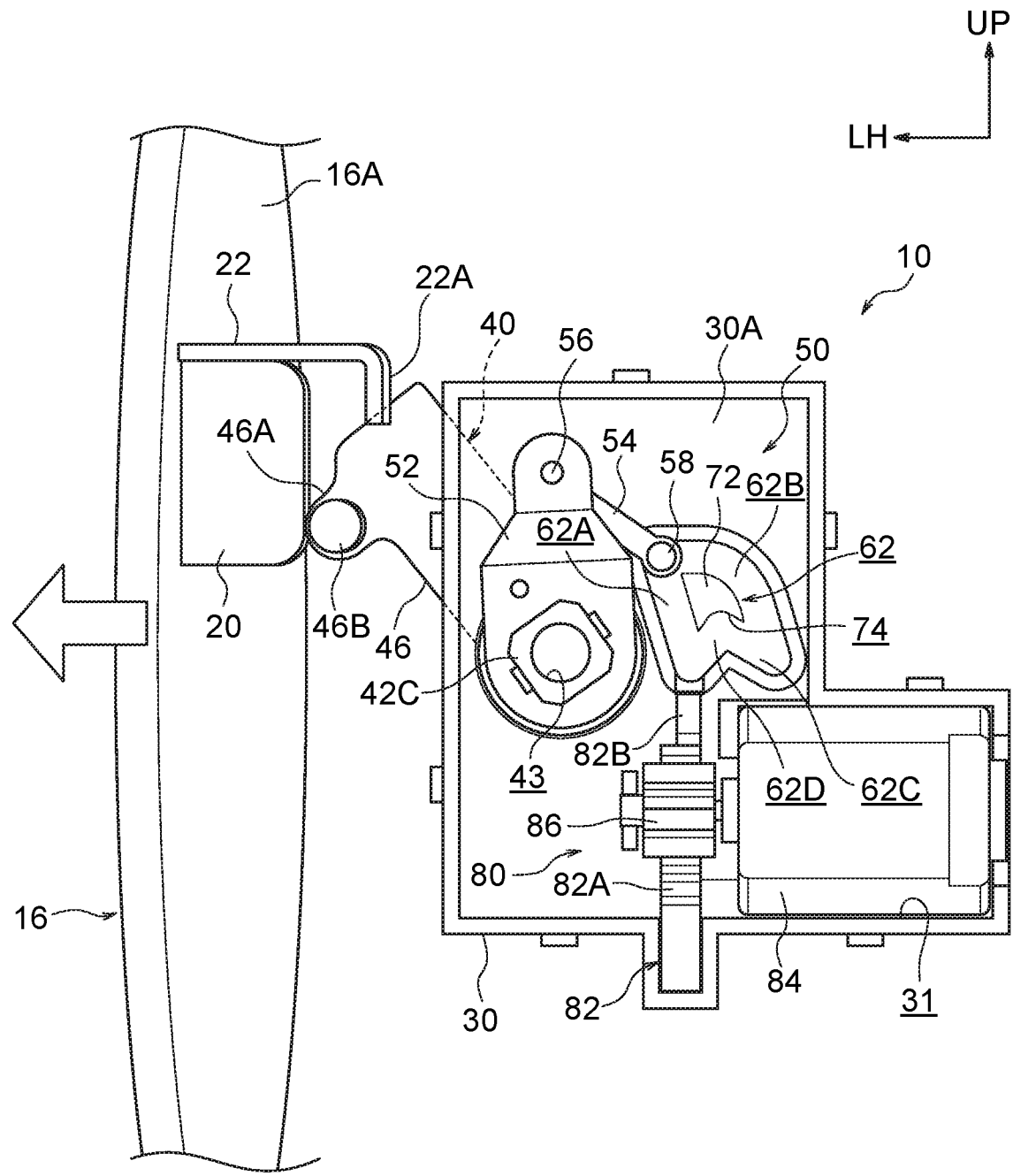
FIG. 12A is a side view that corresponds to FIG. 10A and shows a state in which the fuel lid is pushed-open by the lifter of the fuel lid opener.

In this state, when the above-described pushing-in (pushing operation) is released, as shown in FIG. 12A and FIG. 12B, due to the urging force of the torsion spring 60 that is applied to the lifter 40, the lifter 40, the first link 52 and the second link 54 rotate in the another direction around the axis AX, and the second link pin 58 is displaced to the upper end portion of the first groove portion 62A. In the state in which the second link pin 58 is displaced to the upper end portion of the first groove portion 62A, the lifter 40 is disposed at an advanced-out position (see FIG. 12A). Further, at the time when the lifter 40 is rotated in the another direction around the axis AX as described above (at the time when the arm portion 46 is advanced-out), the pushed portion 46A of the fuel lid 16 is pushed by the pushing portion 20 of the lifter 40 from the vehicle transverse direction inner side. Due thereto, the fuel lid 16 is pushed open toward the vehicle transverse direction outer side, and the fuel lid 16 is half-opened. Further, at this time, the state in which the engaging portion 46B of the lifter 40 is hooked on the engaged portion 22 of the fuel lid 16 is released. This is a structure in which, thereafter, a finger or the like is hooked in the gap between the fuel lid 16 that is half-open and the lid box 14, and the fuel lid 16 is completely opened.

Figure 13A:
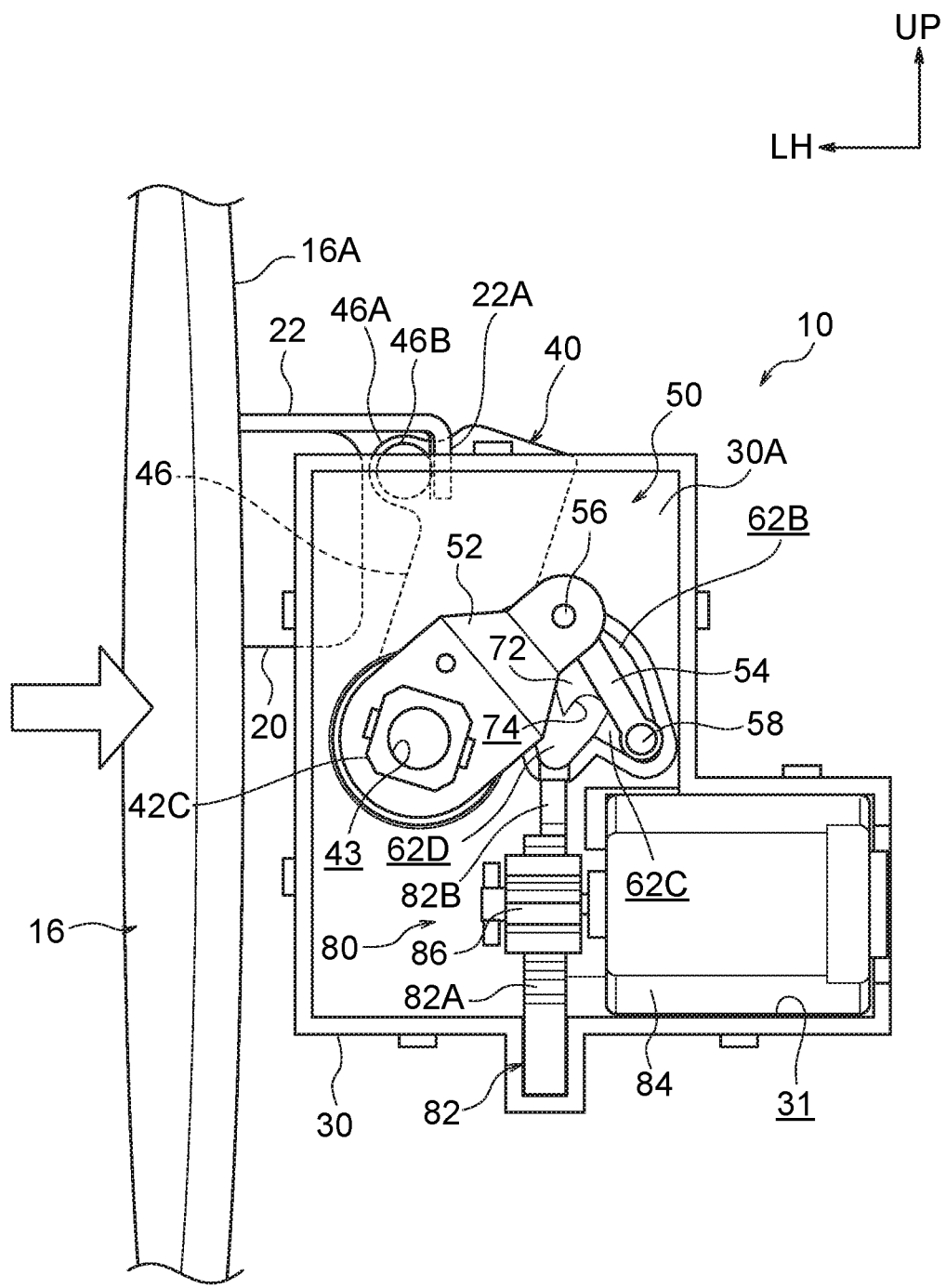
FIG. 13A is a side view that corresponds to FIG. 10A and shows a state in which the fuel lid is push-operated at a time of closing the fuel lid opener.
Figure 13B:
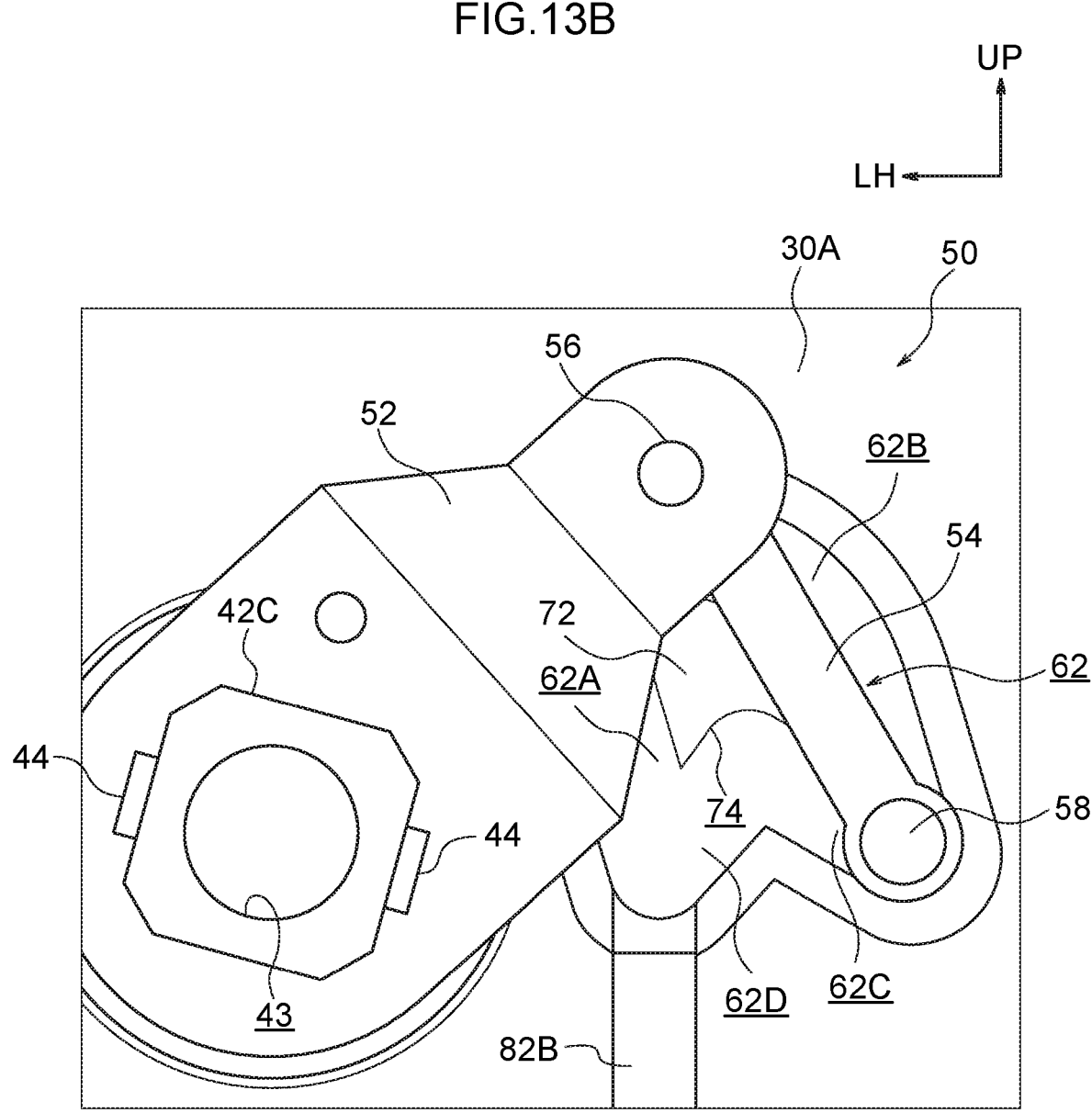
FIG. 13B is a side view showing a portion of FIG. 13A in an enlarged manner.

On the other hand, at the time of closing the fuel lid 16, as shown in FIG. 13A and FIG. 13B, the fuel lid 16 is pushed-in further toward the vehicle transverse direction inner side than the closed position. At this time, due to the pushed portion 46A of the lifter 40 being pushed toward the vehicle transverse direction inner side by the pushing portion 20 of the fuel lid 16, the lifter 40 is rotated in the one direction (the arrow A direction in FIG. 5) around the axis AX. Due thereto, the first link 52 and the second link 54 are rotated in the one direction around the axis AX together with the lifter 40, and the second link pin 58 is displaced through the second groove portion 62B to the lower end portion of the second groove portion 62B.

In this state, when the above-described pushing-in (pushing operation) is released, due to the urging force of the torsion spring 60 that is applied to the lifter 40, the lifter 40, the first link 52 and the second link 54 rotate in the another direction around the axis AX, and the second link pin 58 is displaced to the upper end portion of the third groove portion 62C. Due thereto, the second link pin 58 again hooks on the concave portion 74 of the island portion 72, and there becomes the closed state that is shown in FIG. 10A and FIG. 10B.

In the above-described closed state, when the motor 84 is rotated forward due to the operation of the unillustrated central door lock button, the stopper 82 is moved from the lock releasing position to the locking position, and the stopper portion 82B enters into the lower end portion of the first groove portion 62A (see FIG. 6). Due thereto, the fuel lid 16 enters into the locked state. In this state, due to the stopper portion 82B engaging with the second link pin 58, rotation of the second link 54, the first link 52 and the lifter 40 is restricted, and operation of the heart cam mechanism 50 is restricted. Due thereto, there is a structure in which the engaged state of the engaging portion 46B of the lifter 40 and the engaged portion 22 of the fuel lid 16 is maintained, and the fuel lid 16 is restrained in the closed state. Further, when the motor 84 is rotated reversely due to operation of the unillustrated central door lock button, the stopper 82 is moved from the locking position to the lock releasing position, and the stopper portion 82B is displaced to beneath the first groove portion 62A. Due thereto, there is a structure in which the above-described restricting of rotation is released.

Note that, in the state in which the fuel lid 16 is open (see FIG. 12A and FIG. 12B), even if the stopper 82 is moved to the locking position, at the time of closing the fuel lid 16, the second link pin 58 is moved through the second groove portion 62B and the third groove portion 62C to the concave portion 74, and therefore, there is a structure in which movement of the second link pin 58 is not impeded by the stopper 82. Thus, even in a case such as described above, the fuel lid 16 can be closed normally, and the fuel lid 16 that has been closed can be restrained in its closed state.

(Operation and Effects)

Operation and effects of the present embodiment are described next.

In the fuel lid opener 10 of the above-described structure, the case 30 is mounted to the rear surface of the rear wall 14A3 of the lid box 14 at which the fuel lid 16 is pivotally supported so as to be able to open and close, i.e., to the outer side of the lid box 14. The lifter 40 is supported at this case 30. The lifter 40 is rotated around the axis AX that runs along the plate surface direction of the fuel lid 16 that is in the closed state, and has the arm portion 46 that extends in the rotation radial direction within the lid box 14. The distal end portion of this arm portion 46 engages, from the reverse surface 16A side, with the fuel lid 16 that is in the closed state. Further, the heart cam mechanism 50 is provided with the case 30. Each time the arm portion 46 of the lifter 40 is push-operated in the one direction around the axis AX via the fuel lid 16, the heart cam mechanism 50 causes the lifter 40 to alternately repeat rotation in the one direction and in the another direction around the axis AX, and, due to the above-described rotation of the lifter 40 (the arm portion 46) in the another direction, the fuel lid 16 is pushed open.

In this embodiment, as described above, the case 30 is mounted to the outer side of the lid box 14, and the arm portion 46 of the lifter 40, which is rotatably supported at the case 30, extends in the rotation radial direction of the lifter 40 within the lid box 14, and the heart cam mechanism 50 is provided within the case 30. Namely, mainly the arm portion 46 of the lifter 40 is disposed within the lid box 14, and the case 30 and the heart cam mechanism 50 are disposed at the outer side of the lid box 14. Due thereto, it is easy to ensure the space at the interior of the lid box 14 even without making the lid box 14 large.

The above-described effect is described additionally by using a Comparative Example 100 shown in FIG. 14. Note that, in FIG. 14, structures that are basically similar to those of the present embodiment are denoted by the same reference numerals as in the present embodiment. In this Comparative Example 100, in the same way as the prior art disclosed in Patent Documents 2 and 3 that were described in the Related Art section, locking and unlocking of the fuel lid 16 are carried out by a push rod 104 of a fuel lid opener 102, and there is a structure in which the push rod 104 is locked by an electric locking mechanism (not illustrated) that is made integral with the push lifter. In this Comparative Example 100, the fuel lid opener 102 must be placed within the lid box 14 at a position of perpendicularly facing the fuel lid 16 that is in the closed state. Therefore, either the space within the lid box 14 becomes small, or the lid box 14 is enlarged when an attempt is made to ensure the breadth of the space within the lid box 14. As a result, there are cases in which it is difficult to ensure space for placement of the lid box 14 at the rear portion of the vehicle. However, this can be avoided in the present embodiment.

Further, in the present embodiment, the torsion spring 60 that the heart cam mechanism 50 (the push lifter mechanism) has urges the lifter 40 in the another direction around the axis, and the fuel lid 16 is pushed open by the urging force of this torsion spring 60. Because the torsion spring 60 is disposed (placed) coaxially with the rotation axis AX of the lifter 40, it is easy to ensure space for placement of the spring, as compared with a structure in which the lifter 40 is urged by another type of spring (e.g., a coil spring).

Moreover, in the present embodiment, the heart cam mechanism 50, which has the cam groove 62 that is formed in a heart shape as seen from the direction running along the rotation axis AX of the lifter 40, is the push lifter mechanism. Due thereto, the space for placement of the heart cam mechanism 50 (the push lifter mechanism) in the direction running along the rotation axis AX of the lifter 40, i.e., in the direction running along the reverse surface 16A of the fuel lid 16 that is in the closed state, can be set to be small. As a result, the case 30, at whose interior the heart cam mechanism 50 is provided, can be made to be thin in the aforementioned axis AX direction, and it is easy to ensure space for placement of the case 30.

Further, in the present embodiment, the engaging portion 46B, which engages with the engaged portion 22 provided at the reverse surface 16A of the fuel lid 16 and restrains the fuel lid 16 in the closed state, is provided at the distal end portion of the arm portion 46 of the lifter 40. Due thereto, it can be made such that the fuel lid 16 that is in the closed state is not opened inadvertently. Further, the above-described engagement is released by rotation of the lifter 40 at the time when the heart cam mechanism 50 pushes the fuel lid 16 open by the lifter 40, i.e., by the rotation of the lifter 40 that accompanies the push-operation of the fuel lid 16. Accordingly, there is no need for a special operation for releasing the above-described restraining.

Moreover, in the present embodiment, rotation of the lifter 40 can be restricted by the locking mechanism 80, in the state in which the engaging portion 46B, which is provided at the distal end portion of the arm portion 46 of the lifter 40, is engaged with the engaged portion 22 that is provided at the reverse surface 16A of the fuel lid 16, i.e., in the state in which the fuel lid 16 is restrained in the closed state. Due thereto, the above-described restraining can be maintained as desired.

Further, in the present embodiment, the engaging portion 46B, which is provided at the distal end portion of the arm portion 46 of the lifter 40 and engages with the engaged portion 22 provided at the reverse surface 16A of the fuel lid 16, projects-out from the distal end portion of the arm portion 46 of the lifter 40 toward one side (the vehicle rear side) in the direction running along the rotation axis AX of the lifter 40. Due to the engaging portion 46B being provided in this way, the above-described engaged portion 22 can be made into a simple shape (an L-shape) as in the present embodiment. As a result, the engaged portion 22 can be manufactured by press molding a metal plate, and manufacturing of the fuel lid 16 that includes the engaged portion 22 is easy.

Note that, in the Comparative Example 100 that is shown in FIG. 14, an engaged portion 106, whose interior is hollow and into which a head hammer 104A of the push rod 104 enters, must be provided at the reverse surface 16A side of the fuel lid 16. Because the shape of this engaged portion 106 is complex, the engaged portion 106 must be manufactured of resin. Therefore, in a case in which the fuel lid 16 is made of metal, the engaged portion 106 (a separate part) that is made of resin is mounted to the fuel lid 16, but because this mounting cannot be carried out by welding, the degrees of freedom in the design of the fuel lid 16 are low. With regard to this point, in the present embodiment, because the engaged portion 22, which is formed from a metal plate and in a simple shape, can be mounted by welding to the fuel lid 16 that is made from a metal plate, the degrees of freedom in the design of the fuel lid 16 are high.

Further, in the present embodiment, at the distal end portion of the arm portion 46 of the lifter 40, the pushed portion 46A, which is pushed by the pushing portion 20 of the fuel lid 16, and the engaging portion 46B, which engages with the engaged portion 22 of the fuel lid 16, are disposed so as to be lined-up in the direction running along the rotation axis AX of the lifter 40, i.e., in the plate surface direction of the fuel lid 16 that is in the closed state. Due thereto, it is easy to cause the pushed portion 46A and the engaging portion 46B to engage with the fuel lid 16.

Further, in the present embodiment, the lifter 40 can be disposed such that the arm portion 46 of the lifter 40 does not project-out toward the vehicle outer side from the opening portion 17 of the lid box 14 in the open state of the fuel lid 16 (the lifter 40 can be disposed so as to be set back toward the base wall 30A side). Due thereto, damage to the lifter 40 caused by the fueling operator inadvertently hooking their clothes or the like on the arm portion 46 of the lifter 40 can be prevented or suppressed, and the fueling operator wrongly pushing the arm portion 46 of the lifter 40 in can be prevented or suppressed.

Namely, in the Comparative Example 100 shown in FIG. 14, at the time of opening the fuel lid 16, the push rod 104 projects-out toward the vehicle outer side. Therefore, due to the fueling operator inadvertently hooking their clothes or the like on the push rod 104, there is the possibility that the push rod 104 will be damaged, and there is the possibility that the push rod 104 will be pushed-in wrongly. However, this can be avoided in the present embodiment.

Figure 15:
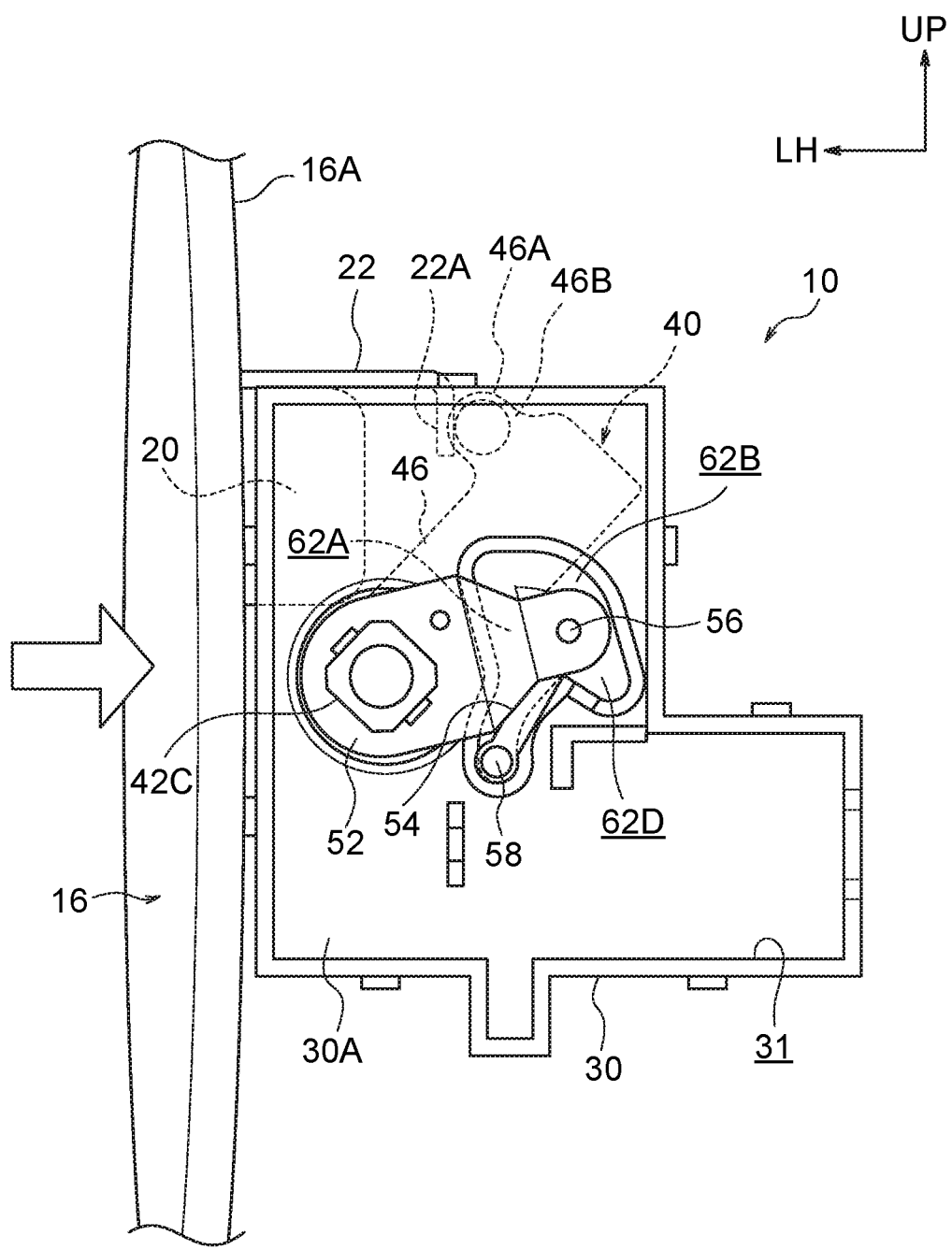
FIG. 15 is a side view that corresponds to a portion of FIG. 11A and shows a modified example of the fuel lid opener relating to the first embodiment of the present invention.

Note that, in the above-described first embodiment, in a case in which the arm portion 46 of the lifter 40 is wrongly pushed-in at the time of refueling, the fuel lid opener 10 enters into the state shown in FIG. 10A and FIG. 10B while the fuel lid 16 remains open. In this state, when closing the fuel lid 16, the arm portion 46 of the lifter 40 is strongly pushed toward the vehicle transverse direction inner side by the hooking portion 22A of the engaged portion 22. In this case, due to the second link pin 58 engaging with the lower surface of the first groove portion 62A, rotation of the lifter 40 is restricted, and the fuel lid 16 cannot be closed completely. In order to prevent this, as in the modified example shown in FIG. 15, it suffices to extend the first groove portion 62A toward the lower side. Due thereto, the above-described restricting of rotation is avoided, and the arm portion 46 of the lifter 40 can be rotated greatly toward the vehicle transverse direction inner side (see FIG. 15).

Thereafter, when the pushing-in of the fuel lid 16 is released, the fuel lid opener 10 enters into the state shown in FIG. 12A and FIG. 12B. Due to the fuel lid 16 being closed again in this state, the fuel lid 16 goes through the state shown in FIG. 13A and FIG. 13B and enters into its usual closed state (the state shown in FIG. 10A and FIG. 10B) normally. Note that illustration of the stopper 82, the motor 84 and the pinion 86 is omitted from FIG. 15.

Further, in the above-described first embodiment, there is a structure in which the pushing portion 20 and the engaged portion 22 that are separate parts are provided at the reverse surface 16A of the fuel lid 16, but the present disclosure is not limited to this. Namely, as in the modified example shown in FIG. 16 and FIG. 17, there may be a structure in which a lifter engaging portion 21, which is a single part structured such that the pushing portion 20 and the engaged portion 22 are made integral, is provided at the reverse surface 16A of the fuel lid 16. This lifter engaging portion 21 is formed by, for example, a metal plate being press molded, and is fixed to the reverse surface 16A of the fuel lid 16 by means such as welding or the like. This lifter engaging portion 21 integrally has the pushing portion 20, whose cross-section is substantially U-shaped as seen from the plate surface direction of the fuel lid 16, and the engaged portion 22 that extends in an L-shape from one end portion of the pushing portion 20. By forming the pushing portion 20 and the engaged portion 22 integrally in this way, the structure of the fuel lid 16 can be made to be even more simple. Note that, in the modified example shown in FIG. 16 and FIG. 17, there is a structure in which, at the time of the push-operation of the fuel lid 16, the engaging portion 46B of the lifter 40 is pushed by the pushing portion 20, and this engaging portion 46B also is used as the pushed portion.

Other embodiments of the present invention are described hereinafter. Note that structures and operations that are basically the same as those of the embodiments described previously are denoted by the same reference numerals as in the previously-described embodiments, and description thereof is omitted.

Second Embodiment

First, a fuel lid opener 200 relating to a second embodiment of the present invention is described by using FIG. 18 through FIG. 28B. In the same way as the first embodiment, this second embodiment corresponds to the above-described "manual opening type", and is a reference example. Note that illustration of the motor 84 is omitted from FIG. 20 and FIG. 21.

As shown in FIG. 18 through FIG. 21, in the fuel lid opener 200 relating to the second embodiment, the shapes of the case 30 and the stopper 82 differ slightly from the shapes of the case 30 and the stopper 82 relating to the first embodiment. Further, in this fuel lid opener 200, the structure of the lifter 40 differs from the structure of the lifter 40 relating to the first embodiment. Further, in this embodiment, the fuel lid assembly 12 that includes the above-described fuel lid opener 200 (the lid box 14 and the fuel lid 16 are not illustrated in FIG. 18 through FIG. 28B) is mounted to the right side portion of a vehicle such as an automobile or the like, and is structured so as to have left-right symmetry with respect to the first embodiment. Moreover, a lifter engaging portion 202 (see FIG. 22 and FIG. 23A), which is structured such that the pushing portion 20 and the engaged portion 22 are made integral, is provided at the reverse surface 16A of the fuel lid 16 in correspondence with the above-described lifter 40.

This lifter engaging portion 202 is molded of resin for example, and is fixed to the reverse surface 16A of the fuel lid 16 by means such as fastening by screws or the like. This lifter engaging portion 202 has the pushing portion 20 that is formed in a rectangular parallelepiped shape and projects-out from the reverse surface 16A of the fuel lid 16 along the plate thickness direction of the fuel lid 16, and the engaged portion 22 that extends toward the vehicle transverse direction inner side from the lower portion of the distal end portion of the pushing portion 20. The engaged portion 22 is structured by a vertical wall portion 204 that is plate-shaped and is formed in the same plane as the reverse surface of the pushing portion 20 (the surface that faces the vehicle rear side in the closed state of the fuel lid 16), lower wall portions 206, 208 that extend toward the hinge portion 18 side of the fuel lid 16 from lower end portion of the vertical wall portion 204, and a hooking portion 210 that extends toward the hinge portion 18 side of the fuel lid 16 from the upper end portion of the distal end portion of the vertical wall portion 204. Opening portions 212, 214 that are slit-shaped are formed between the lower wall portions 206, 208, and between the lower wall portions 206, 208 and the hooking portion 210, respectively. Further, the hooking portion 210 is formed in a substantially triangular shape as seen from the plate thickness direction of the vertical wall portion 204 (the vehicle longitudinal direction in the closed state of the fuel lid 16). The surface of the hooking portion 210 that faces toward the vehicle transverse direction inner side in the closed state of the fuel lid 16 is a guide surface (inclined surface) 216 that is inclined toward the pushing portion 20 side while heading toward the lower side.

The lifter 40 that corresponds to the above-described lifter engaging portion 202 has the shaft portion 42 and the arm portion 46, in the same way as the lifter 40 relating to the first embodiment. However, a link arm 220 that serves as an engaging portion is provided at the distal end portion of the arm portion 46 so as to be able to be displaced. This link arm 220 is formed, for example, of resin and in an elongated shape. One end portion 220A of the link arm 220 is connected to the distal end portion of the arm portion 46 so as to be able to rotate around an axis that extends parallel to the axis AX (not shown in FIG. 18 through FIG. 21).

A pin portion 222, which projects-out toward the side opposite the case 30 (here, the vehicle front side), is formed at another end portion 220B of the link arm 220. This pin portion 222 is formed in a substantially cylindrical shape as seen from the vehicle longitudinal direction. Further, an unillustrated, cylindrical convex portion that projects-out toward the case 30 side is formed at the another end portion 220B of the link arm 220. This convex portion is inserted in a guide grove 224 that is formed in the base wall 30A of the case 30. Due thereto, the another end portion 220B of the link arm 220 is supported at the case 30 so as to be able to be displaced along the guide groove 224. The aforementioned guide groove 224 is structured by a vertically extending portion (perpendicular portion) 224A that extends in the vehicle vertical direction, and a laterally extending portion 224B that extends toward the vehicle transverse direction outer side from the upper end portion of the vertically extending portion 224A. The guide groove 224 is exposed at the interior of the lid box 14 via the through-hole 19 (see FIG. 1) that is formed in the rear wall 14A3 of the lid box 14. The vertically extending portion 224A of the guide groove 224 extends in a direction perpendicular to the moving direction of the engaged portion 22 at the time of opening/closing the fuel lid 16.

Figure 23A:
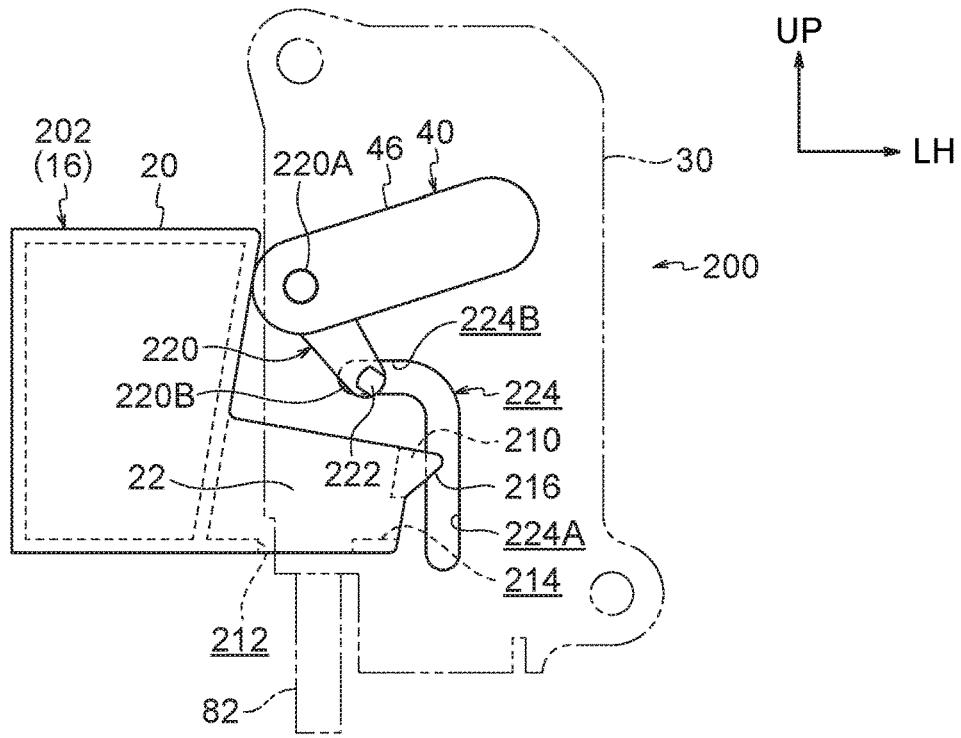
FIG. 23A is a side view showing a state in which the pushing portion abuts the lifter at a time of closing the fuel lid.

As shown in FIG. 23A through FIG. 26B, at the time of opening/closing the fuel lid 16, the fuel lid opener 200 of the above-described structure operates basically similarly to the fuel lid opener 10 relating to the first embodiment. Concretely, in the state in which the fuel lid 16 is opened, the lifter 40 is disposed at the advanced-out position shown in FIG. 23A. In this state, as shown in FIG. 23A, the another end portion 220B of the link arm 220 is disposed at the vehicle transverse direction outer side end portion (here, the vehicle right side end portion) at the laterally extending portion 224B of the guide groove 224. Further, in this state, as shown in FIG. 23B, the second link pin 58 is disposed at the upper end portion of the first groove portion 62A. Note that, in this embodiment, the second link pin 58 is mounted to the second link 54 so as to be able to move relatively in its own axial direction. The distal end portion of the second link pin 58 is pushed to abut the bottom surface of the cam groove 62 by the urging force of a spring (as an example, refer to a compression coil spring 59 shown in FIG. 39) that is provided between the second link pin 58 and the second link 54.

Figure 24A:
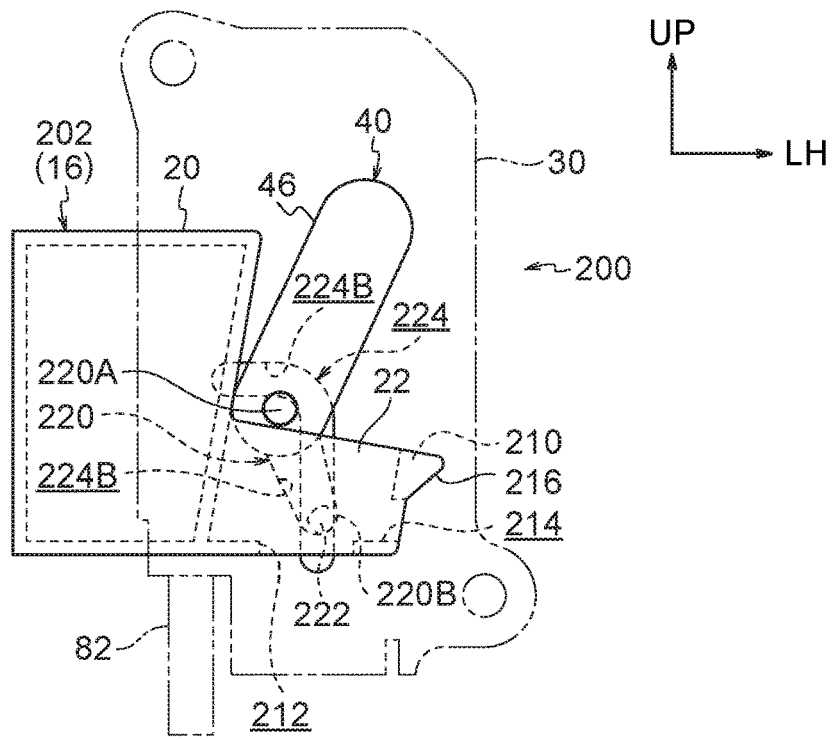
FIG. 24A is a side view showing a state in which the fuel lid is pushed-in further toward the vehicle transverse direction inner side than a closed position.
Figure 24B:
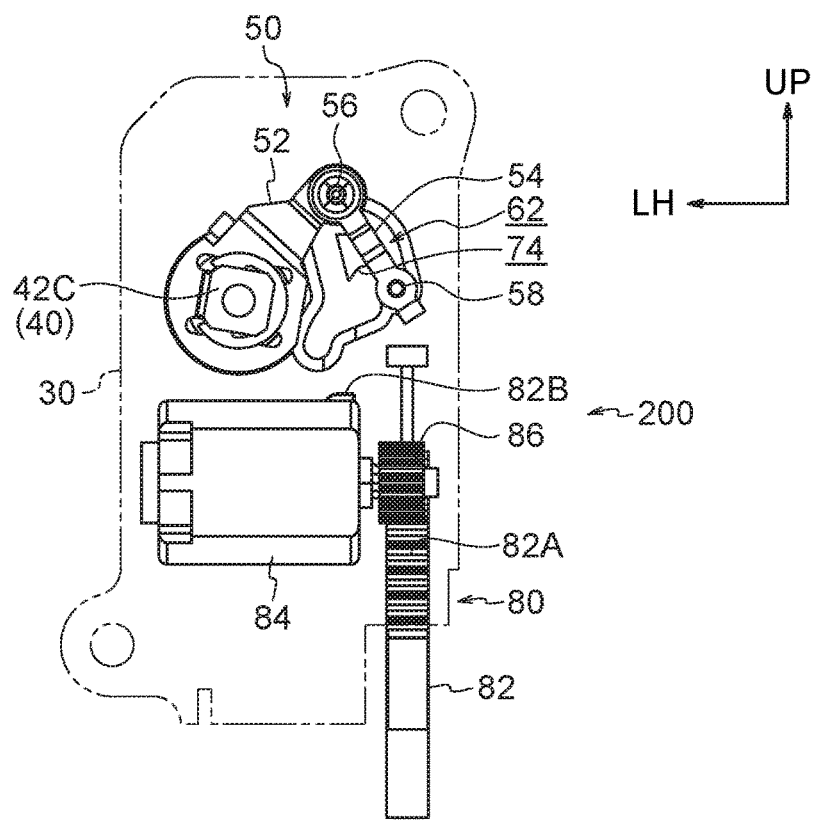
FIG. 24B is a side view showing the states of the heart cam mechanism and the locking mechanism, which correspond to the state shown in FIG. 24A.

At the time of closing the fuel lid 16, the fuel lid 16 is pushed-in further toward the vehicle transverse direction inner side than the closed position of the fuel lid 16. At this time, as shown in FIG. 24A, due to the distal end portion of the arm portion 46 of the lifter 40 being pushed toward the vehicle transverse direction inner side by the pushing portion 20 of the lifter engaging portion 202, the lifter 40 is rotated in one direction around the axis AX. Due thereto, as shown in FIG. 24B, the first link 52 and the second link 54 are rotated together with the lifter 40 in the one direction around the axis AX, and the second link pin 58 is displaced through the second groove portion 62B to the lower end portion of the second groove portion 62B. In this state, as shown in FIG. 24A, the another end portion 220B of the link arm 220 is disposed at the lower portion side at the vertically extending portion 224A of the guide groove 224.

In this state, when the above-described pushing-in (pushing operation) is released, due to the urging force of the torsion spring 60 that is applied to the lifter 40, the lifter 40, the first link 52 and the second link 54 rotate in another direction around the axis AX, and the second link pin 58 is displaced to the upper end portion of the third groove portion 62C. Due thereto, the second link pin 58 hooks on the concave portion 74 of the island portion 72, and there becomes the closed state shown in FIG. 25A and FIG. 25B. In this state, the pin portion 222 that is formed at the another end portion 220B of the link arm 220 faces (is engaged with) the hooking portion 210 of the lifter engaging portion 202 from the vehicle transverse direction outer side. The fuel lid 16 is thereby restrained (held) at the closed position. In this state, when the motor 84 is rotated forward due to operation of the unillustrated central unlock button, the stopper 82 is moved from the lock releasing position to the locking position, and the stopper portion 82B enters into the lower end portion of the first groove portion 62A (see FIG. 21). Due thereto, the fuel lid 16 enters into a locked state.

Figure 26A:
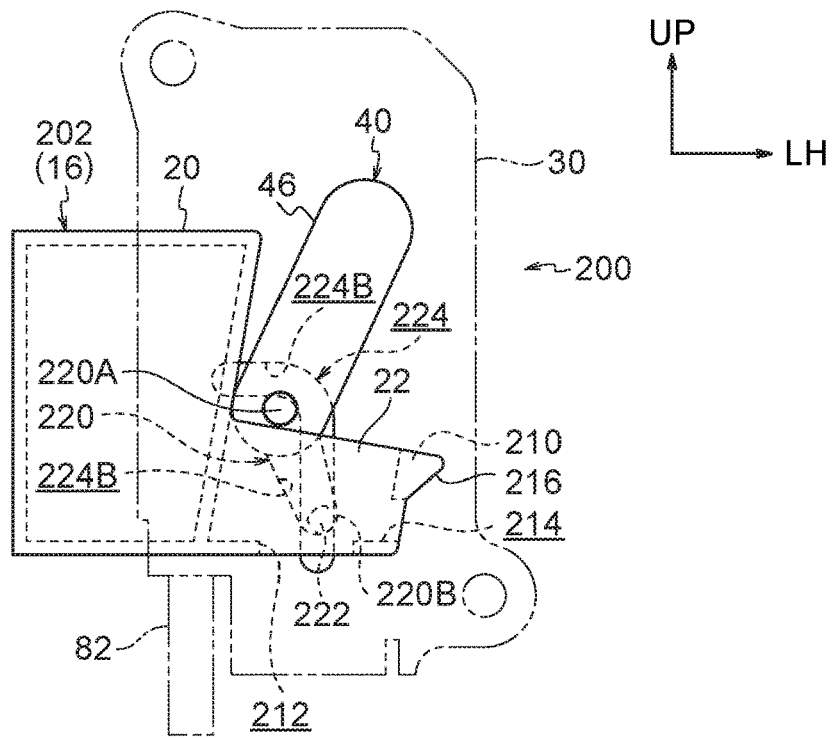
FIG. 26A is a side view showing a state in which the fuel lid is push-operated.
Figure 26B:
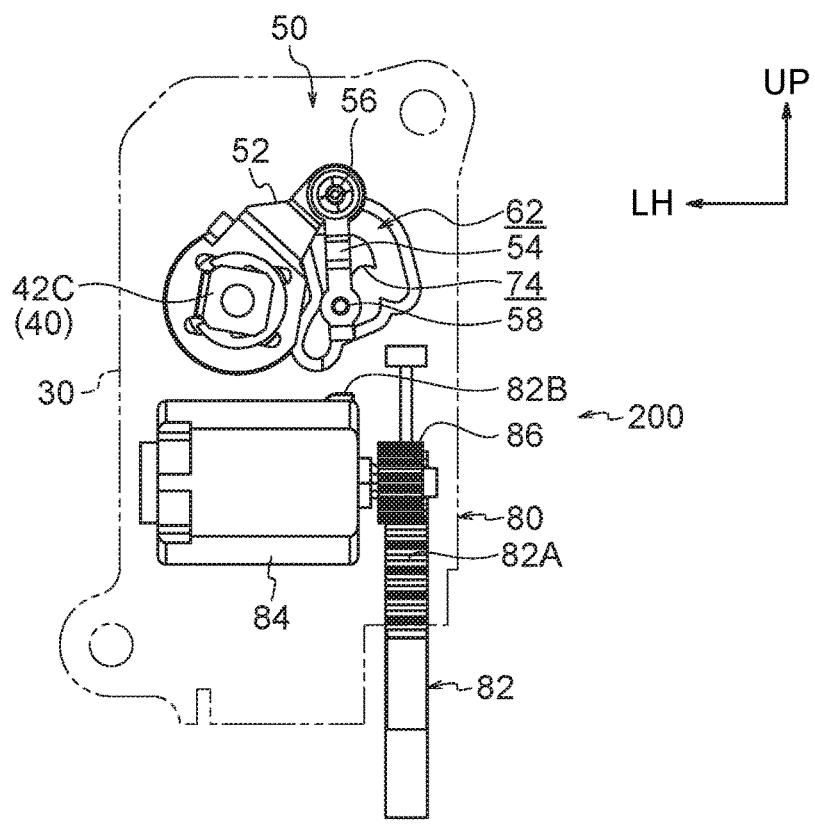
FIG. 26B is a side view showing the states of the heart cam mechanism and the locking mechanism, which correspond to the state shown in FIG. 26A.

At the time of opening the fuel lid 16, due to the rear end portion of the fuel lid 16 (the end portion at the side opposite the hinge portion 18) being pushed in from the vehicle outer side toward the vehicle transverse direction inner side, as shown in FIG. 26A, the distal end portion of the arm portion 46 of the lifter 40 is pushed toward the vehicle transverse direction inner side by the pushing portion 20 of the lifter engaging portion 202. Due thereto, as shown in FIG. 26B, the lifter 40, the first link 52 and the second link 54 are rotated in the one direction around the axis AX, and the second link pin 58 is displaced through the fourth groove portion 62D to the lower end portion of the first groove portion 62A.

Figure 23B:
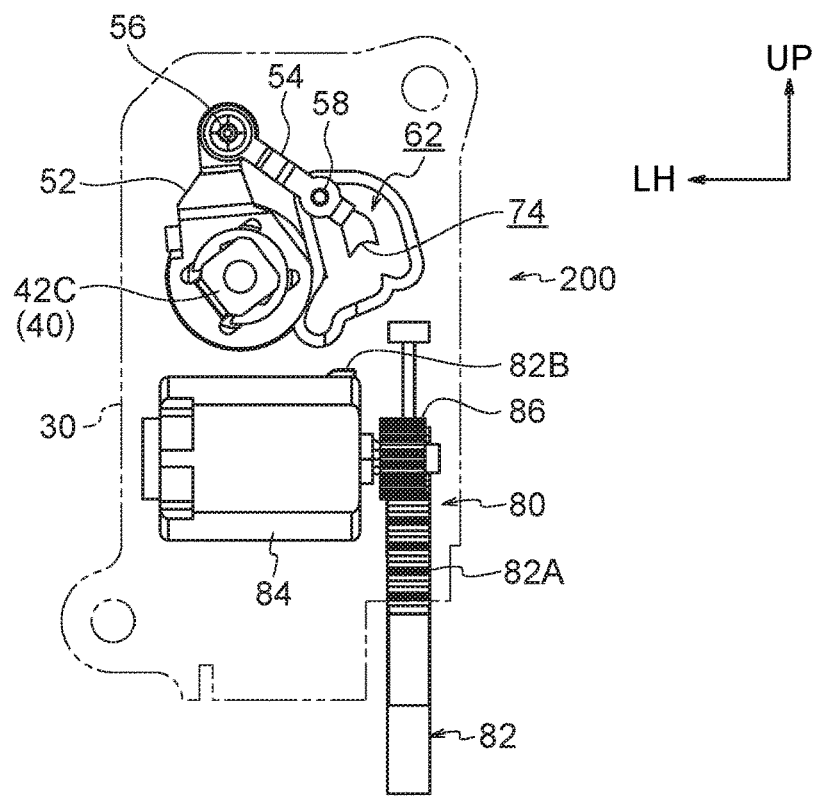
FIG. 23B is a side view showing the states of a heart cam mechanism and a locking mechanism, which correspond to the state shown in FIG. 23A.

In this state, when the above-described pushing-in (pushing operation) is released, due to the urging force of the torsion spring 60 that is applied to the lifter 40, the lifter 40, the first link 52 and the second link 54 are rotated in the another direction around the axis AX, and the second link pin 58 is displaced to the upper end portion of the first groove portion 62A (returns to the state shown in FIG. 23A and FIG. 23B). At this time, the pushing portion 20 of the lifter engaging portion 202 is pushed from the vehicle transverse direction inner side by the distal end portion of the arm portion 46 of the lifter 40. Due thereto, the fuel lid 16 is pushed open toward the vehicle transverse direction outer side, and the fuel lid 16 is half-opened.

Further, at the fuel lid opener 200 relating to the present embodiment, there is a structure in which, in the state in which the fuel lid 16 is open, even in a case in which the lifter 40 is held at the withdrawn position by the heart cam mechanism 50, due to the user wrongly pushing the lifter 40 in to the withdrawn position for example, the user can close the fuel lid 16 normally. This structure is described hereinafter by using FIG. 27A through FIG. 28B.

Figure 27A:
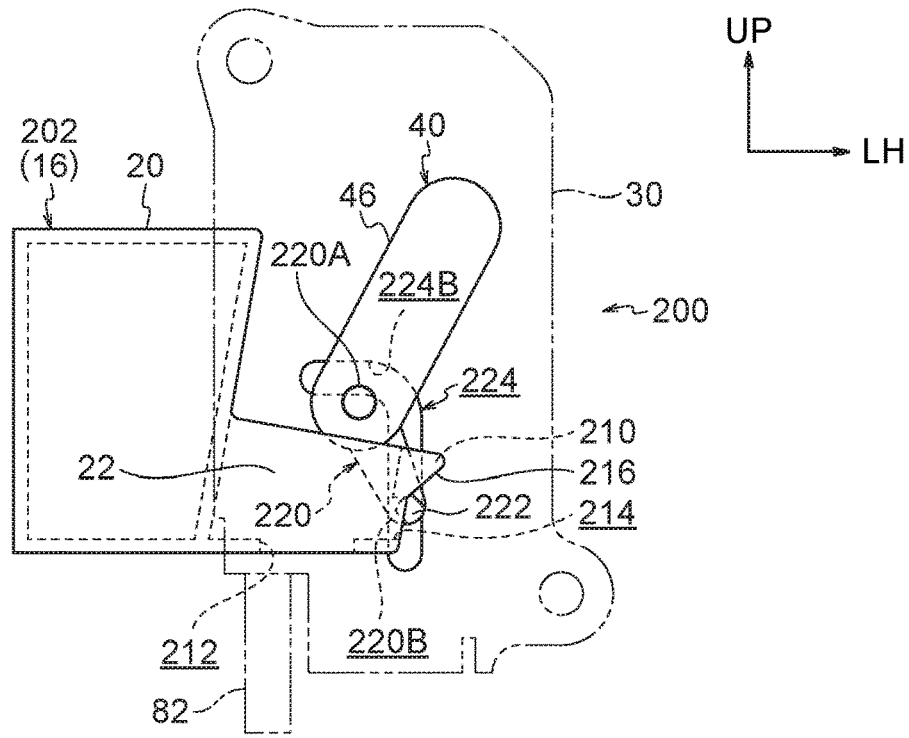
FIG. 27A is a side view showing a state in which a guide surface of the engaged portion abuts a pin portion of the lifter, due to the fuel lid being closed in a state in which the lifter is positioned at the withdrawn position.
Figure 27B:
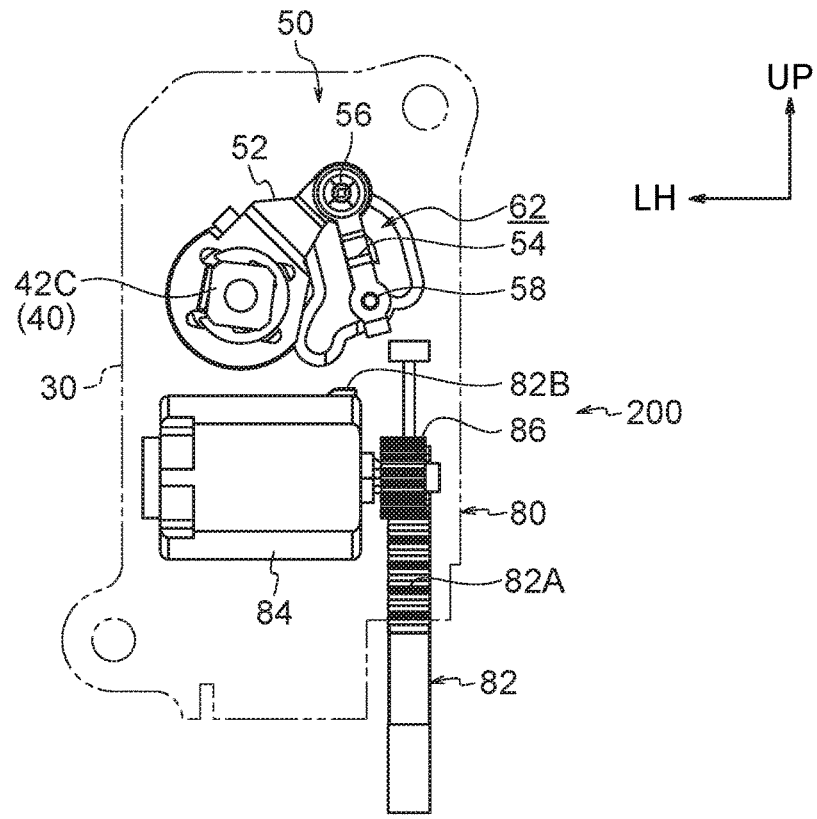
FIG. 27B is a side view showing the states of the heart cam mechanism and the locking mechanism, which correspond to the state shown in FIG. 27A.
Figure 28A:
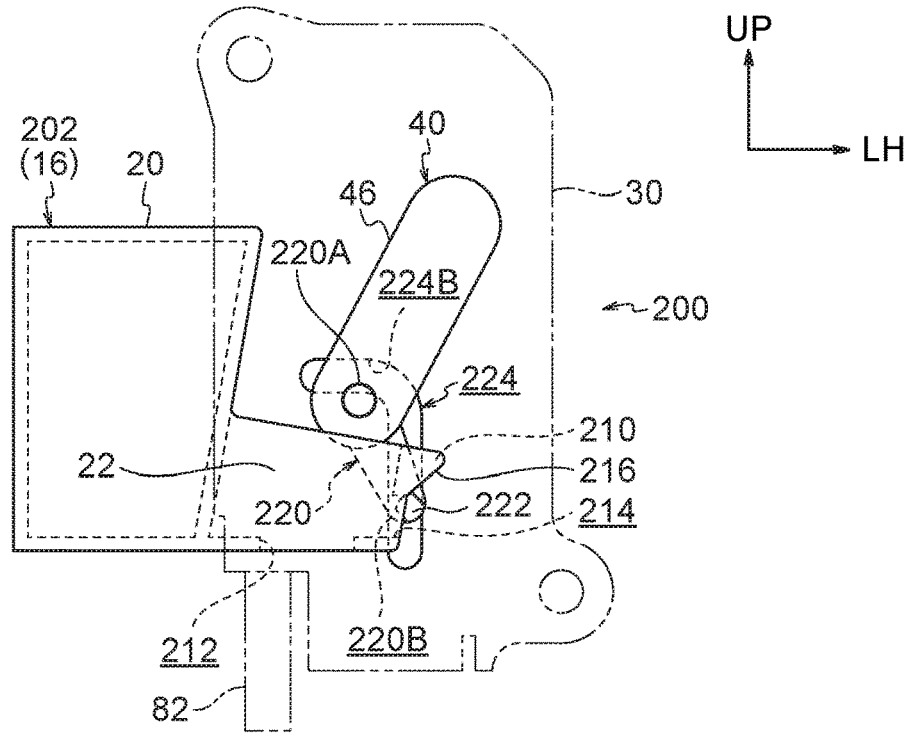
FIG. 28A is a side view showing a state in which the pin portion of the lifter is pushed by the guide surface of the engaged portion, and is displaced toward the vehicle transverse direction outer side.
Figure 28B:
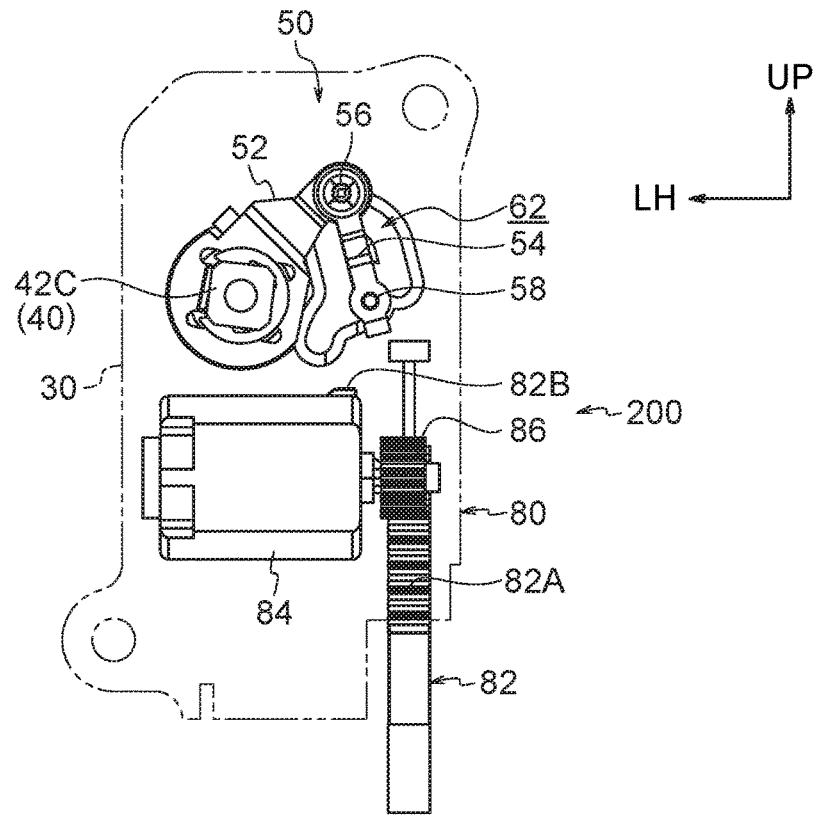
FIG. 28B is a side view showing the states of the heart cam mechanism and the locking mechanism, which correspond to the state shown in FIG. 28A.

As shown in FIG. 27A and FIG. 28B, when closing the fuel lid 16 in the state in which the lifter 40 is held at the withdrawn position by the heart cam mechanism 50, the guide surface 216 of the hooking portion 210 of the lifter engaging portion 202 abuts, from the vehicle transverse direction outer side, the pin portion 222 that is formed at the another end portion 220B of the link arm 220. In this state, when the fuel lid 16 is pushed further in the closing direction, as shown in FIG. 28A, due to the pin portion 222 slidingly-contacting the guide surface 216, the another end portion 220B of the link arm 220 is displaced along the vertically extending portion 224A toward the lower side. At this time, due to the lifter 40, at which the one end portion 220A of the link arm 220 is connected to the arm portion 46, rotating, as shown in FIG. 28B, the second link pin 58 (the guided portion) that is provided at the second link 54 of the heart cam mechanism 50 starts to come out toward the lower side from the concave portion 74 that is formed in the cam groove 62, and this cam groove 62 is formed so as to permit temporary coming-out of the second link pin 58 from the concave portion 74. Namely, this cam groove 62 is formed such that the second link pin 58 that has come-out from the concave portion 74 can again fit into the concave portion 74.

Figure 25A:
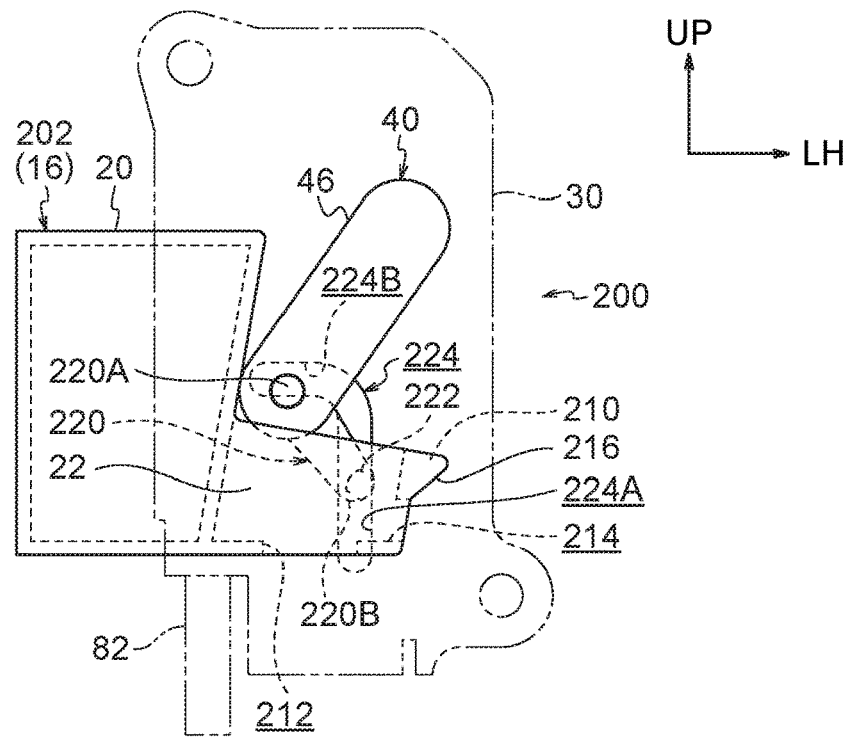
FIG. 25A is a side view showing a state in which the fuel lid has returned to the closed position and is locked.
Figure 25B:
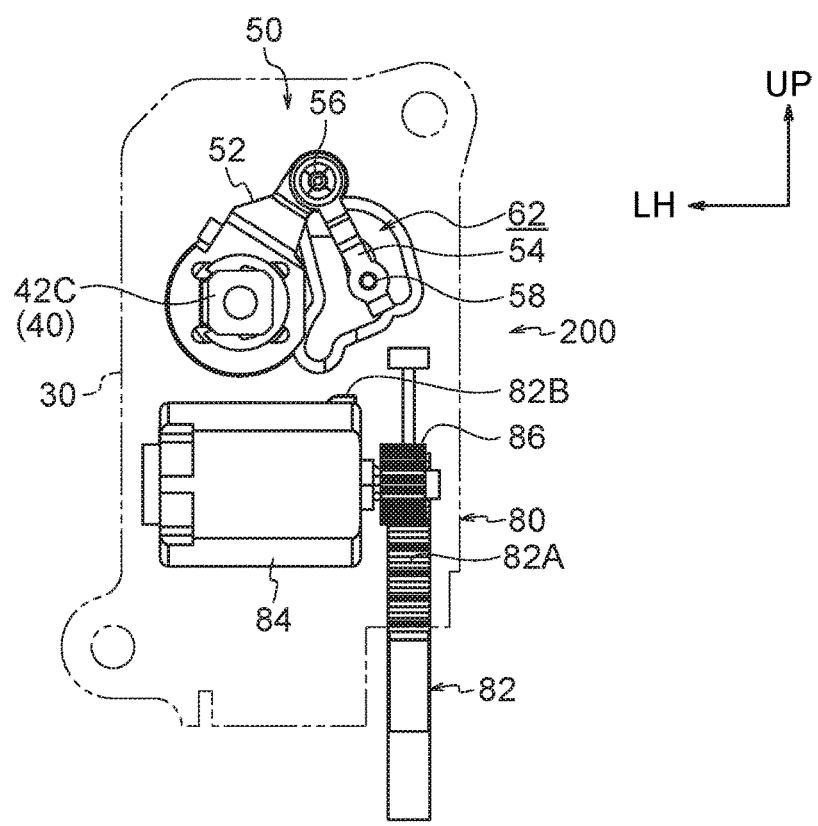
FIG. 25B is a side view showing the states of the heart cam mechanism and the locking mechanism, which correspond to the state shown in FIG. 25A.

Further, when the pin portion 222 comes-out through the opening portion 214 of the lifter engaging portion 202 to the vehicle transverse direction outer side of the hooking portion 210, due to the urging force of the torsion spring 60 that is applied to the lifter 40, the lifter 40 is rotated to the withdrawn position, and the link arm 220 returns to the position before the above-described displacement. Due thereto, there becomes the state that is shown in FIG. 25A and FIG. 25B, i.e., the normal closed state of the fuel lid 16. In this state, the pin portion 222 faces (engages with) the hooking portion 210 from the vehicle transverse direction outer side, and restrains the fuel lid 16 at the closed position. Because the fuel lid opener 200 is structured in this way, even in a case in which there is an incorrect operation such as that described above, the fuel lid 16 can be returned to its usual state without a special operation being carried out.

The structures of this embodiment, other than those described above, are similar to those of the first embodiment. Therefore, in this embodiment as well, effects that are similar to those of the first embodiment (it is easy to ensure space within the lid box 14 even if the lid box 14 is not made to be large) can be obtained. Moreover, in this embodiment, at the link arm 220 that engages with the hooking portion 210 of the lifter engaging portion 202, the one end portion 220A is rotatably connected to the distal end portion of the arm portion 46 of the lifter 40, and the another end portion 220B is supported at the case 30 so as to be able to be displaced along the guide groove 224 that is formed in the case 30. Due thereto, the link arm 220 is supported at both the arm portion 46 of the lifter 40 and at the case 30, and therefore, it is easy to prevent damage to the link arm 220 in a case in which load is applied to the link arm 220 from the fuel lid 16.

Further, in this embodiment, as described above, the cam groove 62 is formed so as to permit temporary coming-out of the second link pin 58 from the concave portion 74 at the time when the another end portion 220B of the link arm 220 is displaced along the vertically extending portion 224A toward the lower side due to the sliding contact of the pin portion 222 and the guide surface 216. Due thereto, the above-described structure that employs the link arm 220 can be formed while ensuring the effect that is due to usage of the heart cam mechanism 50 (the ability to make the case 30 thin in the axis AX direction).

Moreover, in the present embodiment, the vertically extending portion 224A (the perpendicular portion) of the guide groove 224 extends in a direction that is perpendicular to the moving direction of the engaged portion 22 (the hooking portion 210) at the time when the fuel lid 16 is opened/closed. Therefore, in a case in which load is applied from the fuel lid 16 to the another end portion 220B of the link arm 220 via the engaged portion 22 and the pin portion 222, it can be made such that the another end portion 220B of the link arm 220 is not inadvertently displaced along the vertically extending portion 224A (i.e., the guide groove 224).

Third Embodiment

Next, a fuel lid opener 300 relating to a third embodiment of the present invention is described by using FIG. 29 through FIG. 36B. This third embodiment corresponds to the above-described "automatic opening type". Note that illustration of the motor 84 is omitted from FIG. 29 through FIG. 31.

This embodiment is a structure that is basically similar to the second embodiment, but the structure of the stopper 82 is different from the second embodiment. The stopper 82 relating to this embodiment has a mechanism operating portion 82C that projects-out further toward the upper side than the stopper portion 82B. A tension coil spring 302 that serves as the urging member spans between the upper portion of this mechanism operating portion 82C and the upper end portion of the case 30. This tension coil spring 302 urges the stopper 82 toward the locking position, and is a structure by which, in the non-operated state of the motor 84, the stopper 82 is held at the locking position. Note that the urging member may be a type of spring other than the tension coil spring 302.

Further, this embodiment is not a structure in which the motor 84 is rotated forward and reversely by operation of a central door lock switch as in the above-described respective embodiments, and is a structure in which the motor 84 is rotated forward for a predetermined time period due to operation of an in-cabin switch that is provided in a vicinity of the driver's seat of the vehicle. When the motor 84 is rotated forward for a predetermined time period, the stopper 82 is moved from the locking position to the lock releasing position. This is a structure in which, thereafter, when operation of the motor 84 is stopped, the stopper 82 that has been moved to the lock releasing position is returned to the locking position by the tension coil spring 302.

Further, an engaging surface 83, which is inclined toward the vehicle transverse direction outer side (here, the vehicle right side) while heading toward the lower side, is formed at the upper portion of the mechanism operating portion 82C. In the state in which the stopper 82 is positioned at the locking position (see FIG. 29 and FIG. 30), this engaging surface 83 is disposed above the cam groove 62, and, in the state in which the stopper 82 is positioned at the lock releasing position (see FIG. 31), this engaging surface 83 is disposed in a vicinity of the concave portion 74 of the cam groove 62.

At usual times, the stopper 82 at which the above-described mechanism operating portion 82C is provided is held at the locking position by the tension coil spring 302. This is a structure in which, even in this state, the heart cam mechanism 50 permits rotation of the lifter 40 in the one direction around the axis AX at the time of closing the fuel lid 16. Namely, even in the state in which the stopper 82 is positioned at the locking position, the second link pin 58 can be displaced from the upper end portion of the first groove portion 62A through the second groove portion 62B and the third groove portion 62C to the concave portion 74. Therefore, rotation of the lifter 40 from the advanced-out position to the withdrawn position, i.e., withdrawing of the lifter 40, is permitted (see FIG. 29 and FIG. 30).

Figure 30:
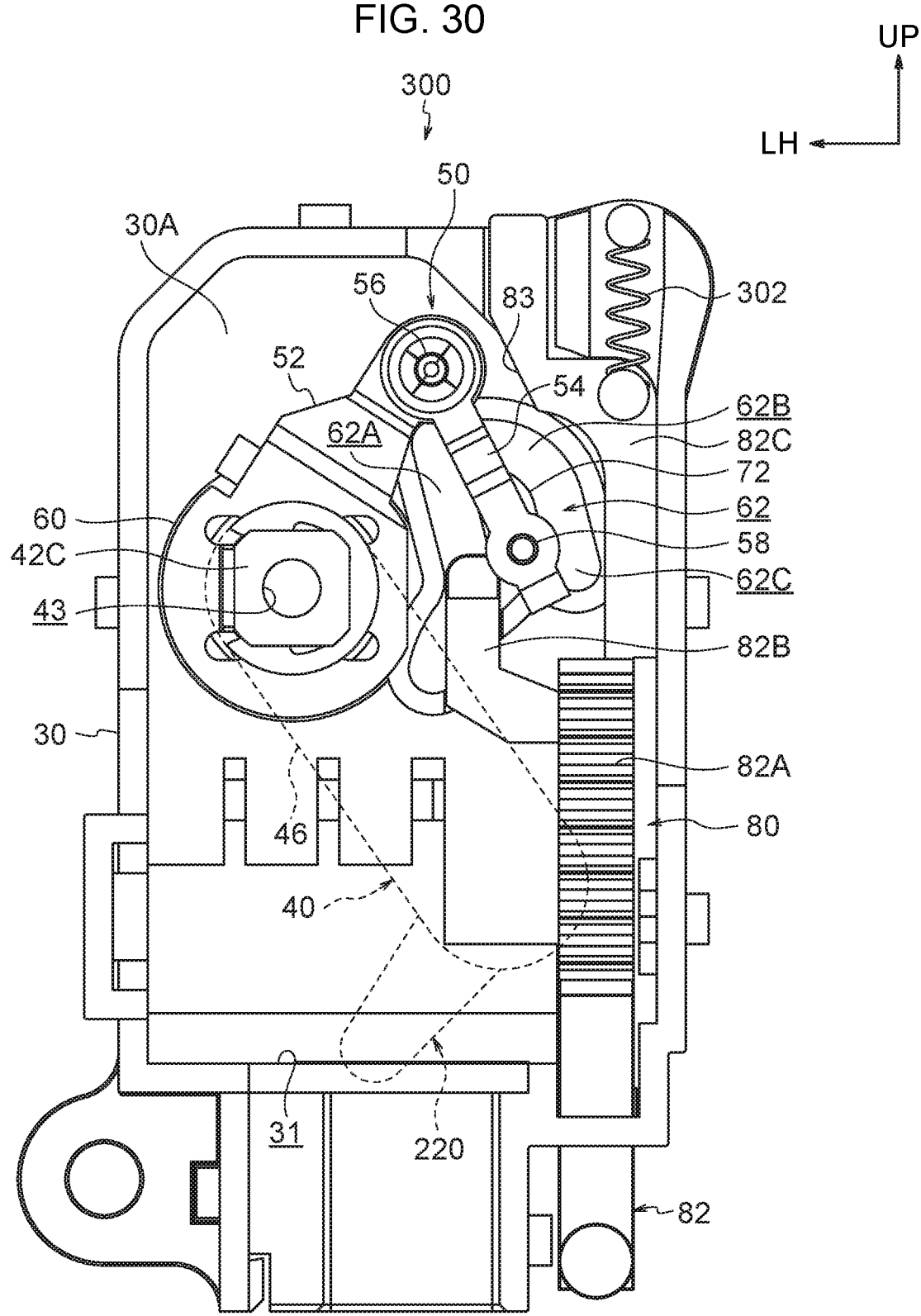
FIG. 30 is a side view that corresponds to FIG. 29 and shows a state in which the lifter is positioned at the withdrawn position.
Figure 31:
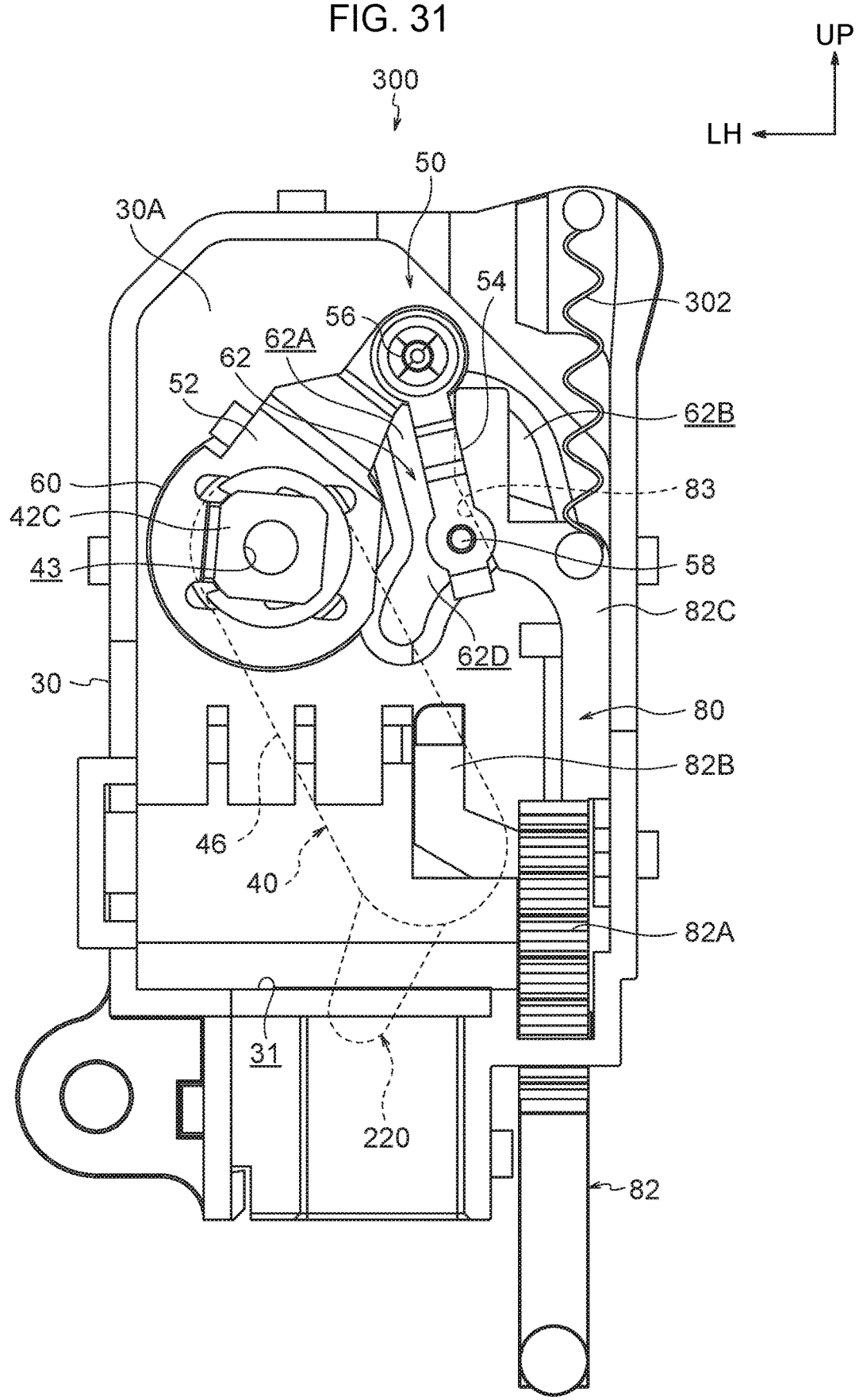
FIG. 31 is a side view that corresponds to FIG. 30 and shows a state in which the stopper has been moved to the lock releasing position, and a mechanism operating portion of the stopper abuts a second link pin (a guided portion) of a heart cam mechanism.
Figure 32A:
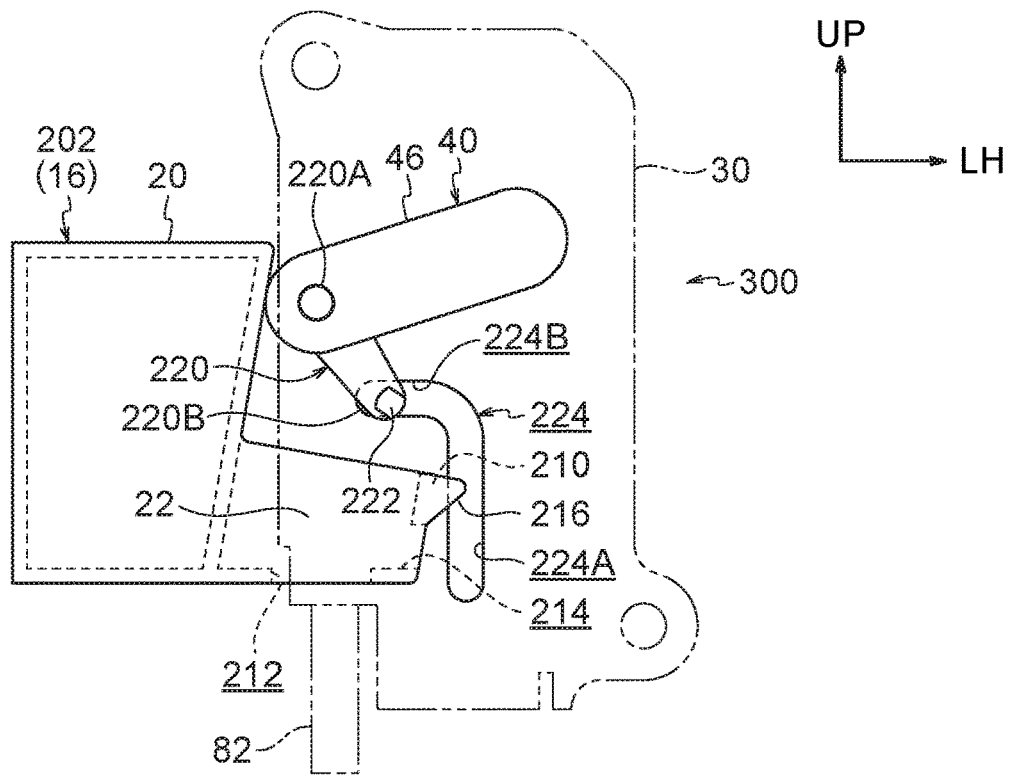
FIG. 32A is a side view showing a state in which the pushing portion abuts the lifter at a time of closing the fuel lid.
Figure 32B:
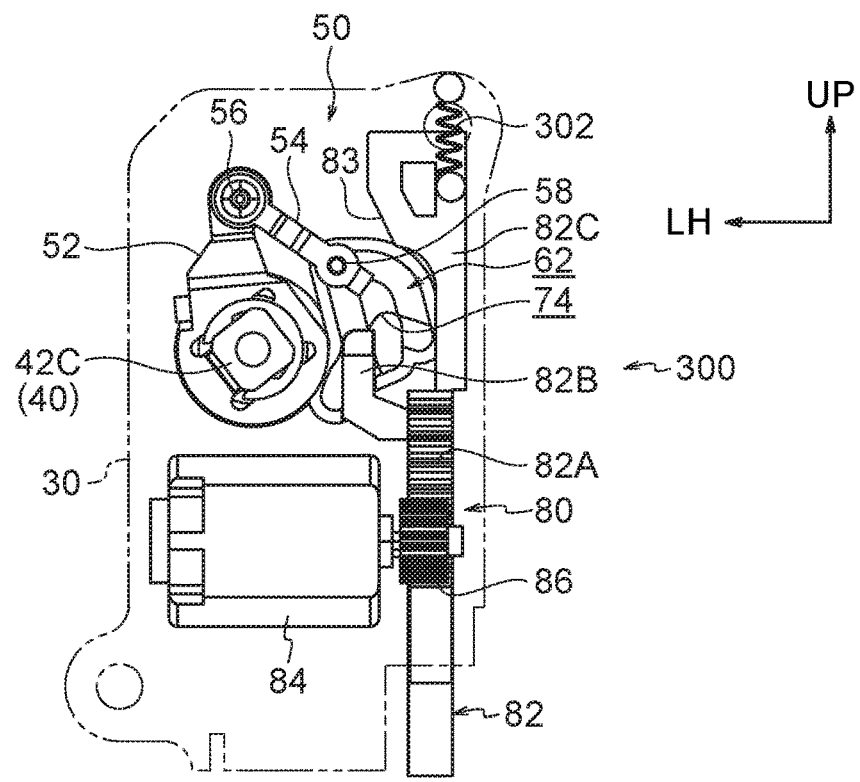
FIG. 32B is a side view showing the states of the heart cam mechanism and the locking mechanism, which correspond to the state shown in FIG. 32A.
Figure 33A:
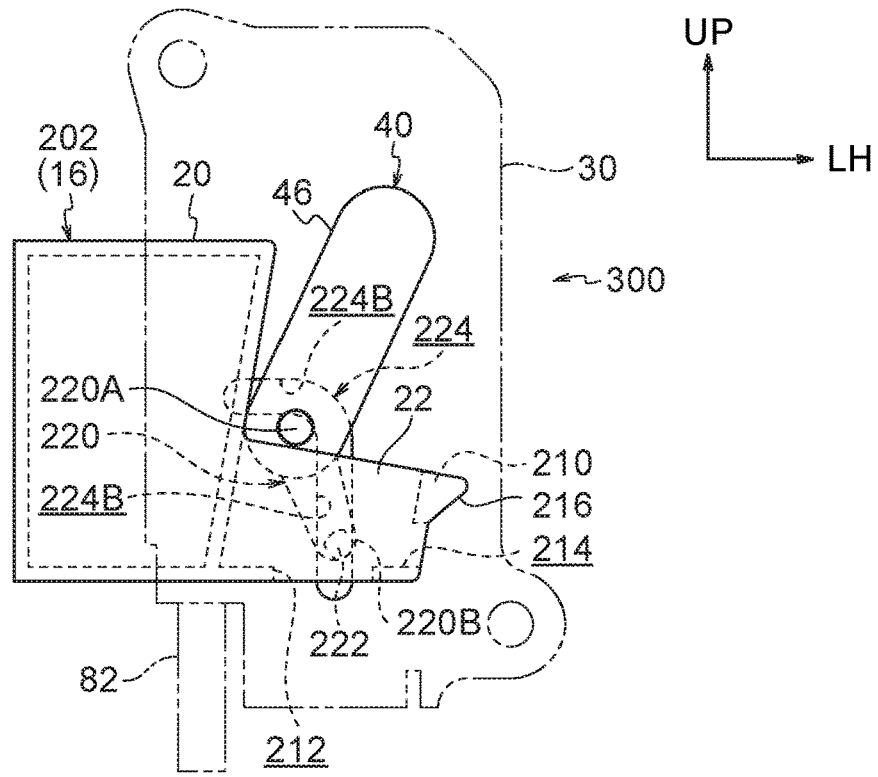
FIG. 33A is a side view showing a state in which the fuel lid is pushed-in further toward the vehicle transverse direction inner side than the closed position.
Figure 33B:
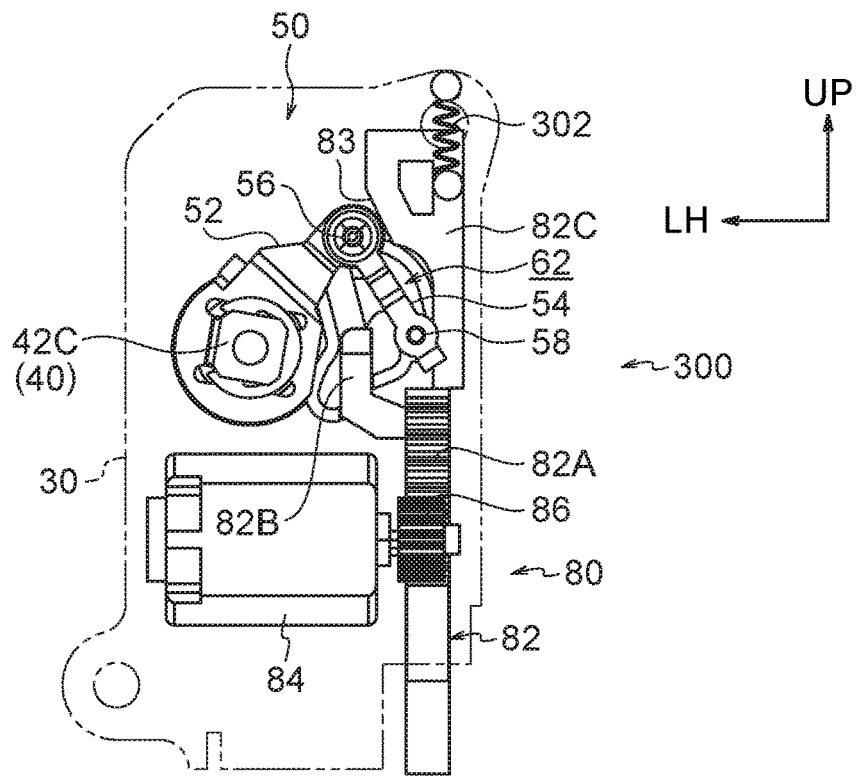
FIG. 33B is a side view showing the states of the heart cam mechanism and the locking mechanism, which correspond to the state shown in FIG. 33A.
Figure 34A:
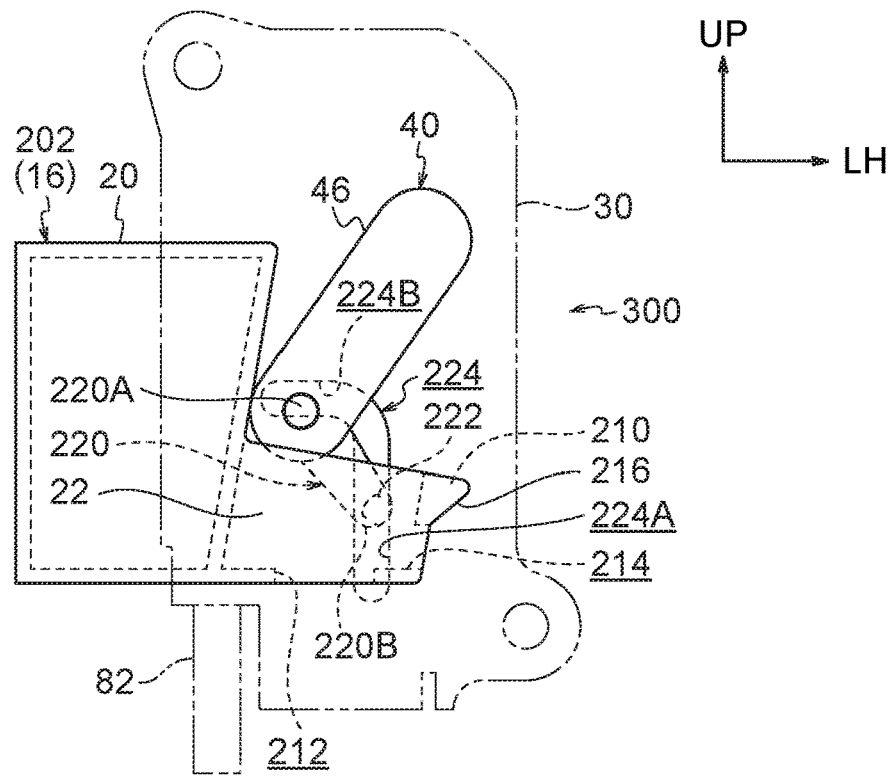
FIG. 34A is a side view showing a state in which the fuel lid has returned to the closed position and is locked.
Figure 34B:
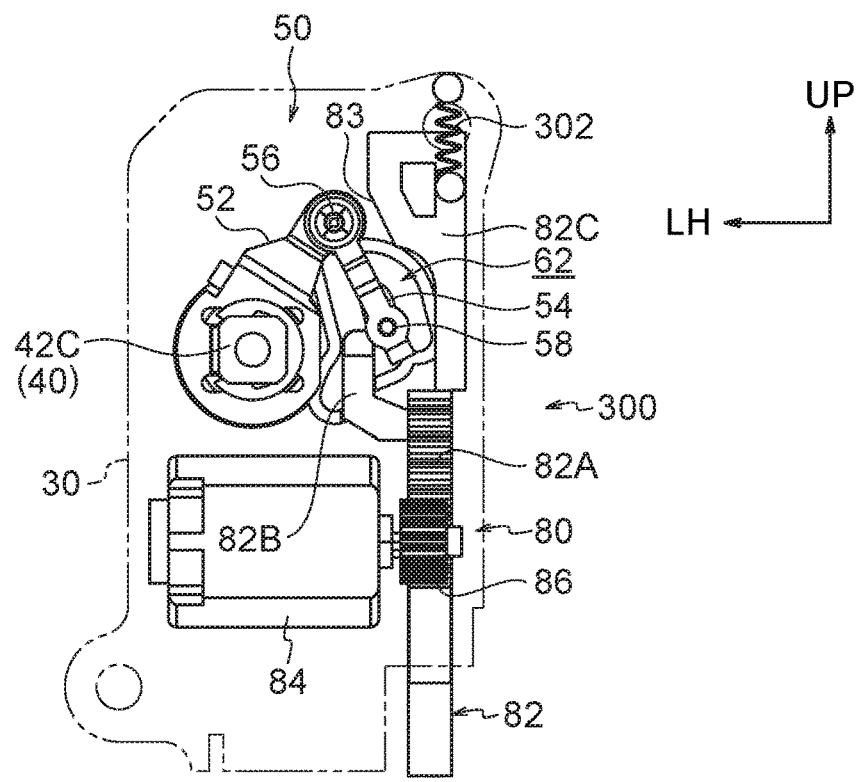
FIG. 34B is a side view showing the states of the heart cam mechanism and the locking mechanism, which correspond to the state shown in FIG. 34A.
Figure 35A:
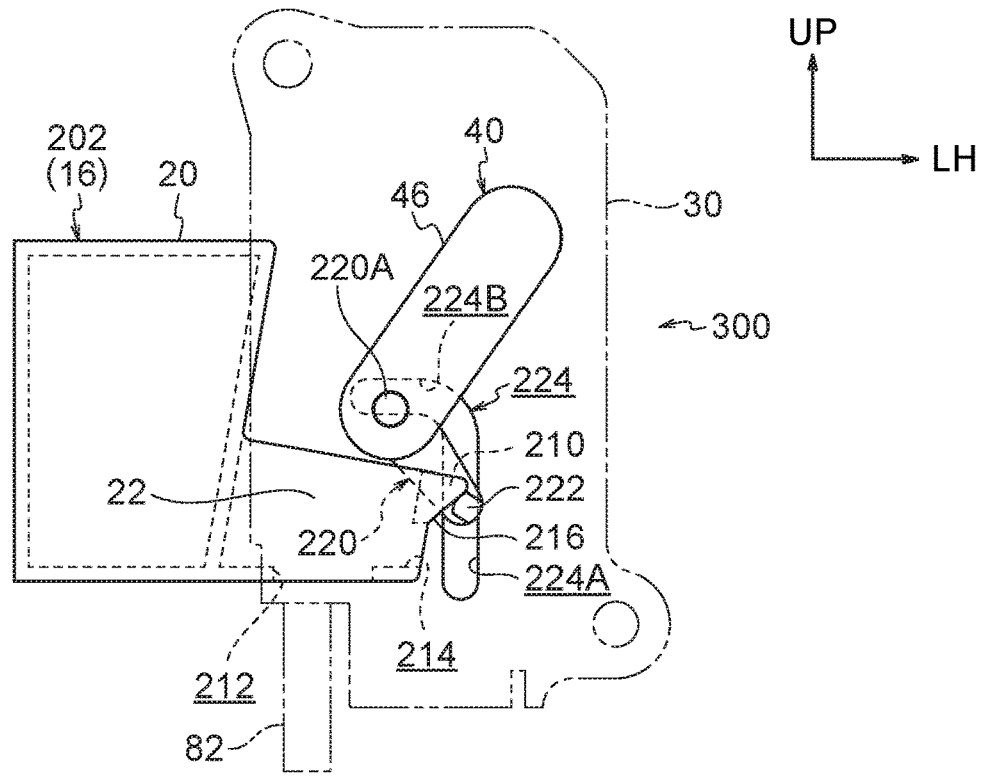
FIG. 35A is a side view showing a state in which a guide surface of the engaged portion abuts a pin portion of the lifter, due to the fuel lid being closed in a state in which the lifter is positioned at the withdrawn position.
Figure 35B:
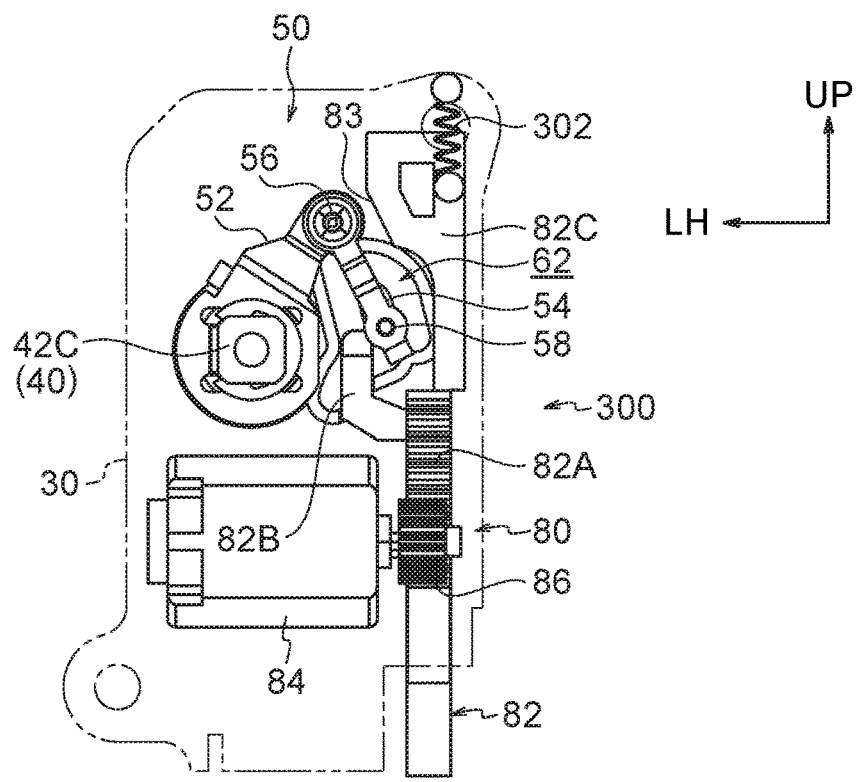
FIG. 35B is a side view showing the states of the heart cam mechanism and the locking mechanism, which correspond to the state shown in FIG. 35A.
Figure 36A:
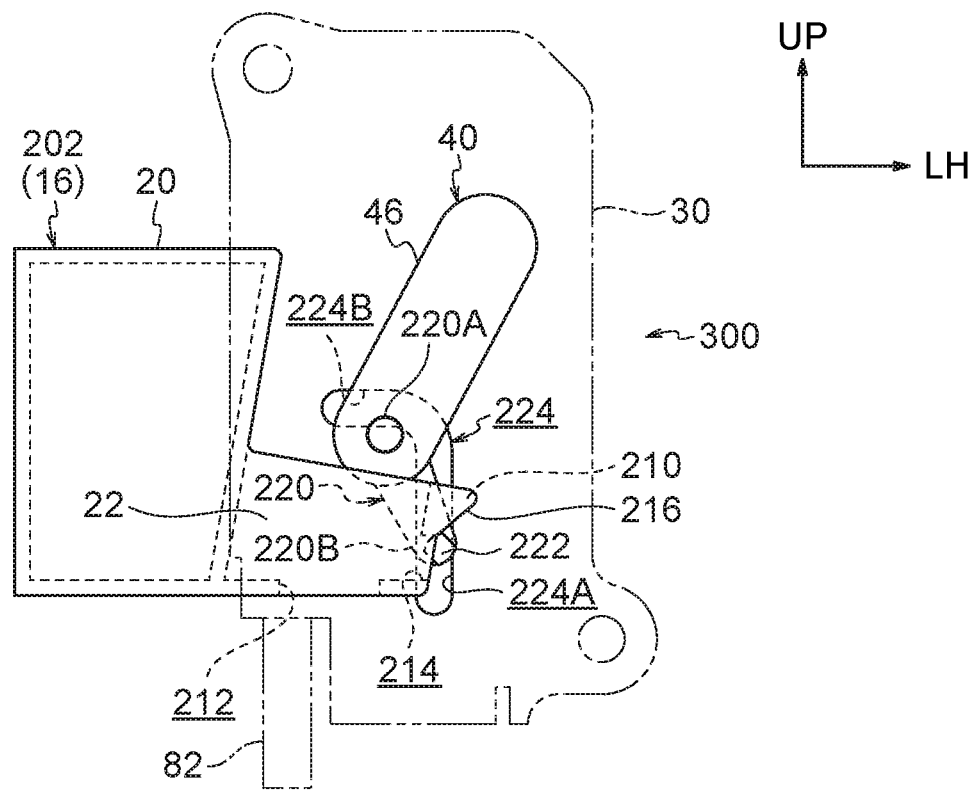
FIG. 36A is a side view showing a state in which the pin portion of the lifter is pushed by the guide surface of the engaged portion, and is displaced toward the vehicle transverse direction outer side.
Figure 36B:
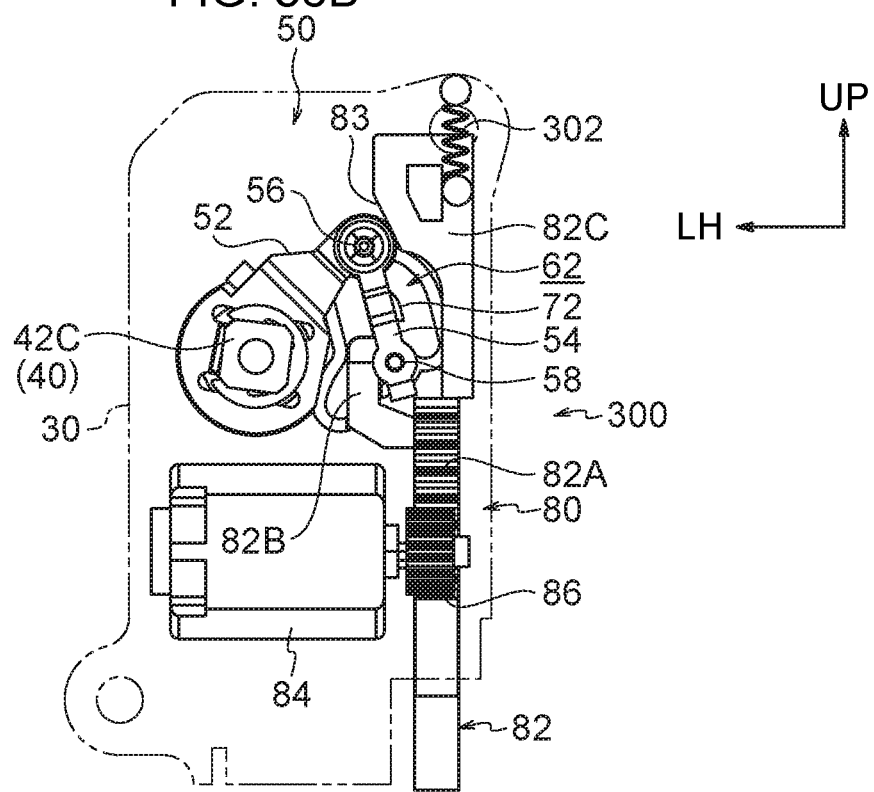
FIG. 36B is a side view showing the states of the heart cam mechanism and the locking mechanism, which correspond to the state shown in FIG. 36A.

This is a structure in which, in the state in which the lifter 40 is positioned at the withdrawn position, i.e., in the state in which the second link pin 58 is hooked on (fit in) the concave portion 74, as shown in FIG. 30, the engaging surface 83 of the mechanism operating portion 82C of the stopper 82 is disposed above the second link pin 58. Further, this is a structure in which, at the time when the stopper 82 is moved to the lock releasing position by operation of the motor 84 (i.e., operation of the in-cabin switch), due to the engaging surface 83 of the mechanism operating portion 82C slidingly-contacting the second link pin 58, the second link pin 58 comes-out of the concave portion 74 and is displaced to the lower end portion of the first groove portion 62A. Further, in the present embodiment, there is a structure in which, during the operation of the motor 84, as shown in FIG. 31, the upper end portion of the second groove portion 62B of the cam groove 62 is blocked by the upper end portion of the mechanism operating portion 82C of the stopper 82. Due thereto, during operation of the motor 84, the user wrongly pushing the fuel lid 16, and the lifter 40 being rotated, are prevented.

Figure 29:
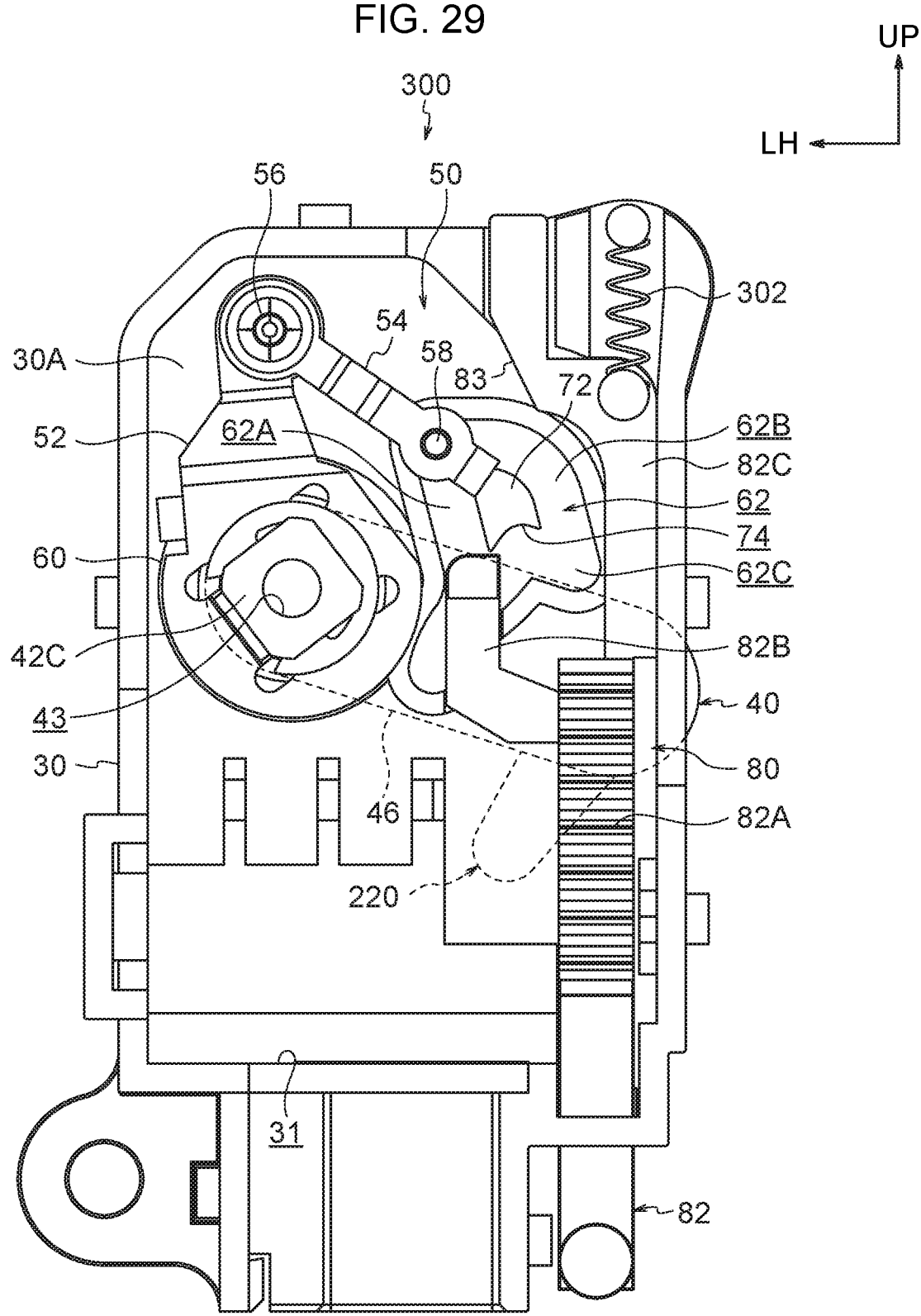
FIG. 29 is a side view showing a state in which the cover has been removed from the case of a fuel lid opener relating to a third embodiment of the present invention, and is a drawing showing a state in which the lifter is positioned at an advanced-out position and the stopper is positioned at a locking position.

When the second link pin 58 is displaced to the lower end portion of the first groove portion 62A as described above, due to the urging force of the torsion spring 60 that is applied to the lifter 40, the lifter 40, the first link 52 and the second link 54 rotate in the another direction around the axis AX, and the second link pin 58 is displaced to the upper end portion of the first groove portion 62A (enters into the state shown in FIG. 29). At this time, the pushing portion 20 of the lifter engaging portion 202 is pushed from the vehicle transverse direction inner side by the distal end portion of the arm portion 46 of the lifter 40. Due thereto, the fuel lid 16 is pushed open toward the vehicle transverse direction outer side, and the fuel lid 16 is half-opened or completely opened.

Namely, in the present embodiment, there is a structure in which, due to the stopper 82 engaging with the heart cam mechanism 50 (the push lifter mechanism) and operating the heart cam mechanism 50 at the time when the stopper 82 is moved from the locking position to the lock releasing position, the lifter 40 is rotated in the another direction around the axis AX, and the fuel lid 16 can be opened by operation of the in-cabin switch.

The structures, other than those described above, of the fuel lid opener 300 that is structured as described above are structures that are similar to those of the fuel lid opener 200 relating to the second embodiment, and, as shown in FIG. 32A through FIG. 34B, at the time of closing the fuel lid 16, operations that are similar to those of the fuel lid opener 200 relating to the second embodiment are carried out. Further, in this embodiment as well, in the same way as in the second embodiment, there is a structure in which, in a case in which the lifter 40 is wrongly held at the withdrawn position in the state in which the fuel lid 16 is open, the fuel lid 16 can be closed normally (see FIG. 35A through FIG. 36B). Accordingly, in this embodiment as well, effects that are similar to those of the second embodiment can be obtained.

Moreover, in this embodiment, when the motor 84 of the locking mechanism 80 is operated by operation of the in-cabin switch, the stopper 82 of the locking mechanism 80 is moved from the locking position to the lock releasing position, and restricting of operation of the heart cam mechanism 50 is released. Further, at the time when the stopper 82 is moved from the locking position to the lock releasing position as described above, the mechanism operating portion 82C that is provided at the stopper 82 engages with the heart cam mechanism 50. Due thereto, the heart cam mechanism 50 is operated, the lifter 40 is rotated in the another direction around the axis AX, and the fuel lid 16 is pushed open by the lifter 40. Thereafter, when operation of the motor 84 is stopped, the stopper 82 that has been moved to the lock releasing position is returned to the locking position by the tension coil spring 302.

Even in the state in which the stopper 82 has been returned to the locking position as described above, the heart cam mechanism 50 permits rotation of the lifter 40 in the one direction around the axis AX at the time of closing the fuel lid 16. Therefore, the user can close the fuel lid 16. Further, when closing the fuel lid 16, the fuel lid 16 enters into the locked state by the locking mechanism 80 at which the stopper 82 is positioned at the locking position. Therefore, there is no need for a special operation in order to set the fuel lid 16 in the locked state.

This embodiment is a type (an automatic opening type) in which the fuel lid 16 cannot be opened unless the in-cabin switch is operated. Therefore, the problems of a type (a manual releasing type) in which the fuel lid 16 can be opened arbitrarily interlockingly with the central door lock as in the fuel lid openers 10, 200 relating to the first and second embodiments, can be eliminated. Namely, at automobiles having a high frequency of refueling of gasoline, it is difficult for vaporized gasoline to collect within the fuel tank. However, at automobiles having a low frequency of refueling such as hybrid vehicles or plug-in hybrid vehicles, a large amount of vaporized gasoline collects within the tank, and, at the time of refueling, evaporated gas being released into the atmosphere is problematic. Therefore, for example, "evaporated gas emission standards" are implemented in the United States, and methods of opening the refueling port after decreasing the pressure of the fuel tank interior are adopted. With regard to this point, the fuel lid openers 10, 200 that are interlocked with a central door lock are not suited to the above-described methods because the fuel lid 16 can be opened irrespective of lowering of the pressure of the fuel tank interior. In contrast, because the fuel lid opener 300 relating to the present embodiment is structured such that the pressure of the fuel tank interior is reduced interlockingly with operation of the in-cabin switch, the fuel lid opener 300 can use the aforementioned methods.

Further, the fuel lid opener 300 relating to the present embodiment is an automatic opening type (electric opening type), which can open the fuel lid 16 by operation of the motor 84 that is the drive source, and has the heart cam mechanism 50 that serves as the push lifter mechanism. Therefore, it is easy to convert to a manual opening type (the fuel lid opener 200 relating to the second embodiment) in which the fuel lid 16 is opened by a push operation. Namely, the fuel lid opener can be changed to a manual opening type merely by changing the shape of the stopper 82 and the like such that, at the time of operation of the motor 84, the stopper 82 does not engage with the second link pin 54 of the heart cam mechanism 50 (merely by omitting the mechanism operating portion 82C of the stopper 82 and the tension coil spring 302). Therefore, conversion from an automatic opening type to a manual opening type is easy.

Moreover, the fuel lid opener 300 relating to the present embodiment and the fuel lid opener 200 relating to the second embodiment differ only with regard to the existence of the mechanism operating portion 82C at the stopper 82 and the existence of the tension coil spring 302. Therefore, at the fuel lid opener 200 and the fuel lid opener 300, many of the parts can be used in common, and the structures for mounting to the lid box 14 can be used in common. Thus, the design of the aforementioned mounting structure can be standardized among hybrid vehicles, plug-in hybrid vehicles and gasoline vehicles, and waste can be eliminated.

Fourth Embodiment

Next, a fuel lid opener 400 relating to a fourth embodiment of the present invention is described by using FIG. 37 through FIG. 40. This fuel lid opener 400 is structured such that, in the fuel lid opener 300 relating to the third embodiment, a step portion 402 is formed at the stopper portion 82B of the stopper 82, and a guiding projection 406 is formed at the reverse surface of the cover 38. Further, this fuel lid opener 400 is a structure in which a microswitch 408 is added to the fuel lid opener 300 relating to the third embodiment.

At the stopper portion 82B of the stopper 82, the distal end side is thin due to the aforementioned step portion 402 being formed. A pin sliding surface 404 is formed at the distal end side of this stopper portion 82B. In the state in which the stopper 82 is positioned at the locking position (the state shown in FIG. 38 and FIG. 40), this pin sliding surface 404 is disposed in the same plane as the bottom surface of the third groove portion 62C. Further, the guiding projection 406 of the cover 38 is formed at a position facing the cam groove 62, and extends in the direction running along the fourth groove portion 62D.

Figure 38:
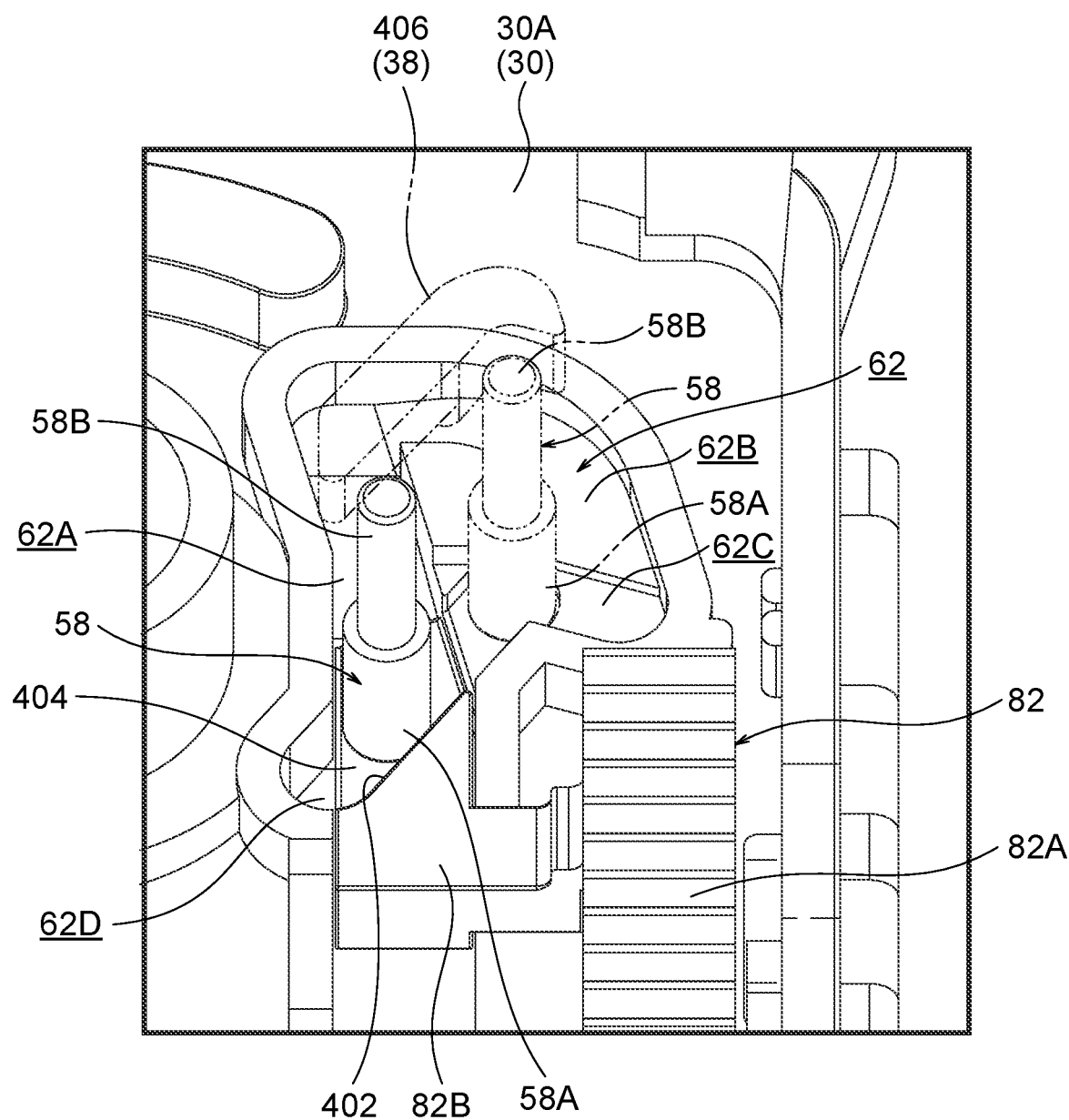
FIG. 38 is a perspective view showing, in an enlarged manner, a portion of the structure shown in FIG. 37.

In this embodiment, in the state in which the fuel lid 16 is disposed at the closed position, and the second link pin 58 is hooked on the concave portion 74, and the stopper 82 is disposed at the locking position, the aforementioned guiding projection 406 contacts a proximal end portion 58B of the second link pin 58 from the vehicle upper side (refer to the second link pin 58 that is shown by the two-dot chain line in FIG. 38). Note that illustration of the second link 54 and the like is omitted from FIG. 38.

Further, in the above-described state, the pin sliding surface 404 of the stopper portion 82B is disposed in the same plane as the bottom surface of the third groove portion 62C. In this state, when the fuel lid 16 is pushed in further toward the vehicle transverse direction inner side than the closed position, the second link pin 58 is displaced toward the fourth groove portion 62D side while the contact of the proximal end portion 58B with the guiding projection 406 is maintained as is. At this time, the proximal end portion 58B of the second link pin 58 slides on the guiding projection 406, and a distal end portion 58A of the second link pin 58 slides on the bottom surface of the third groove portion 62C and the pin sliding surface 404 of the stopper portion 82B. Due thereto, displacement of the second link pin 58 toward the first groove portion 62A side, i.e., operation of the heart cam mechanism 50, is restricted. Namely, in the present embodiment, even in the state in which operation of the heart cam mechanism 50 is restricted by the locking mechanism 80 (the state in which the stopper 82 is positioned at the locking position), the fuel lid 16 can be pushed-in further toward the vehicle transverse direction inner side than the closed position. Further, at the time of this pushing-in, because the second link pin 58 is prevented from being pushed to abut the stopper portion 82B in the radial direction, damage to the second link pin 58 and the stopper 82 can be prevented.

When the above-described pushing-in is released, the second link pin 58 is displaced toward the concave portion 74 side and again hooks on the concave portion 74 while contact of the proximal end portion 58B with the guiding projection 406 is maintained as is. Due thereto, the fuel lid 16 is again disposed at the closed position. At the time of this displacement as well, the proximal end portion 58B of the second link pin 58 slides on the guiding projection 406, and the distal end portion 58A of the second link pin 58 slides on the bottom surface of the third groove portion 62C and the pin sliding surface 404.

Figure 39:
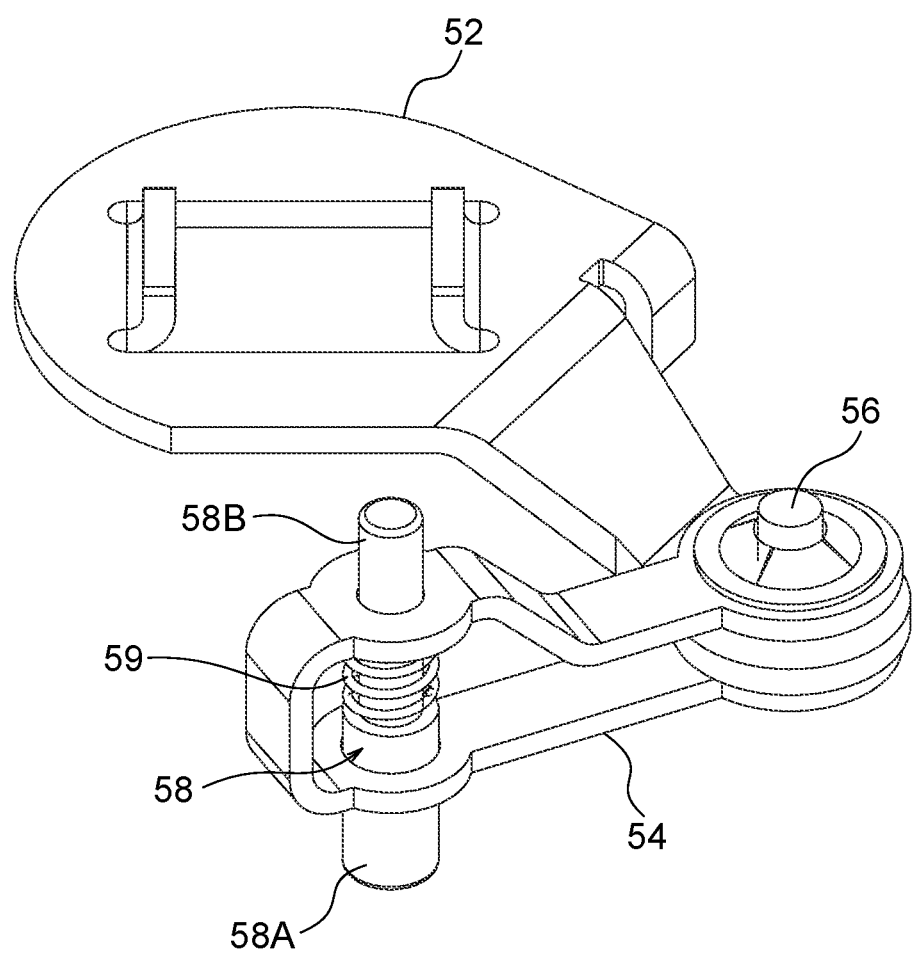
FIG. 39 is a perspective view showing a second link pin and structures of peripheral members thereof.
Figure 40:
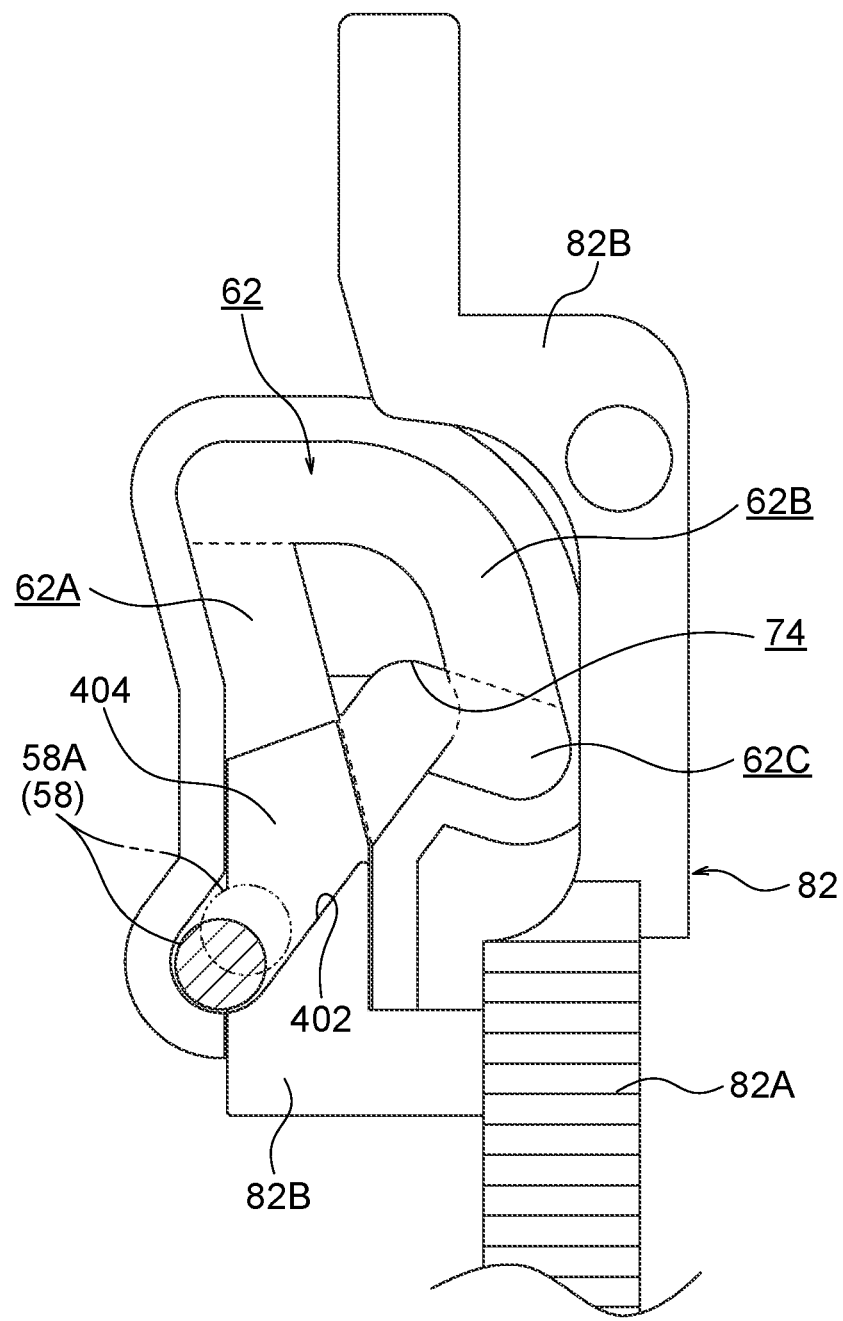

On the other hand, in the state in which the fuel lid 16 is pushed-in further toward the vehicle transverse direction inner side than the closed position as described above, when the motor 84 is rotated reversely and the stopper 82 is moved to the lock releasing position, the stopper portion 82B is displaced to beneath the cam groove 62, and the second link pin 58 is displaced to the bottom surface side of the fourth groove portion 62D by the urging force of the compression coil spring 59 (see FIG. 39). As a result, the engagement of the proximal end portion 58B of the second link pin 58 and the guiding projection 406 is released, and displacement of the second link pin 58 from the fourth groove portion 62D side toward the first groove portion 62A side is permitted. Due thereto, the heart cam mechanism 50 operates. Namely, in this embodiment as well, there is a structure in which, in the state in which the stopper 82 has been moved to the lock releasing position, operation of the heart cam mechanism 50 is permitted.

Further, the fuel lid opener 400 relating to this embodiment has the microswitch 408 that serves as a switch that is mounted to the case 30. This microswitch 408 is disposed so as to face one end side of the first link 52. A convex portion 410, which projects-out toward the radial direction outer side of the shaft portion 42 of the lifter 40, is formed at the one end side of the first link 52. This convex portion 410 is formed so as to push an actuator portion 408A of the microswitch 408 due to rotation of the lifter 40 at the time when the fuel lid 16 is pushed in further toward the vehicle transverse direction inner side than the closed position, for example. Further, this is a structure in which, due to this engagement, the microswitch 408 enters into an on state. Note that, in FIG. 40, the second link pins 58 that are shown by the solid lines and by the two-dot chain lines show the moving stroke of the second link pin 58 for pushing the actuator portion 408A of the microswitch 408.

The above-described microswitch 408 is electrically connected to, for example, an ECU (Electronic Control Unit) that is installed in the vehicle, and the motor 84 of the locking mechanism 80 is electrically connected to this ECU. When the microswitch 408 enters into an on state due to, for example, a user carrying an electronic key (a so-called smart key) pushing the fuel lid 16 that is positioned at the closed position in toward the vehicle transverse direction inner side, the ECU rotates the motor 84 forward for a predetermined time period. Due thereto, the stopper 82 is moved from the locking position to the lock releasing position, and the heart cam mechanism 50 is operated. As a result, the lifter 40 is rotated to the advanced-out position, and the fuel lid 16 is pushed open. Namely, the fuel lid opener 400 relating to this embodiment can be used as a type (a push sensing type) that unlocks the fuel lid 16 by sensing the pushing-in operation of the fuel lid 16 by a user carrying a smart key.

Moreover, the fuel lid opener 400 (push sensing type) relating to this embodiment and the fuel lid opener 300 (automatic opening type) relating to the third embodiment differ only slightly with respect to the existence of the microswitch 408, and the like. Further, as described above, the fuel lid opener 300 and the fuel lid opener 200 (manual opening type) relating to the second embodiment differ only with respect to the existence of the mechanism operating portion 82C at the stopper 82 and the existence of the tension coil spring 302. Accordingly, at the fuel lid opener 200, the fuel lid opener 300 and the fuel lid opener 400, many of the parts can be used in common, and the structures for mounting to the lid box 14 can be used in common.

Note that this fourth embodiment is structured such that the convex portion 410 is formed at the first link 52 such that the microswitch 408 enters into an on state at the time when the fuel lid 16 that is positioned at the closed position is pushed-in toward the vehicle transverse direction inner side. However, the present disclosure is not limited to this, and the position of the convex portion 410 can be changed appropriately. For example, if the convex portion 410 is formed at the first link 52 such that the microswitch 408 enters into an on state in the state in which the lifter 40 is positioned at the advanced-out position (see FIG. 29), the open state of the fuel lid 16 can be sensed. Further, for example, if the convex portion 410 is formed at the first link 52 such that the microswitch 408 enters into an on state in the state in which the lifter 40 is positioned at the withdrawn position (see FIG. 30), the closed state of the fuel lid 16 can be sensed (the lid closed position can be sensed). In this sensing of the lid closed position, the incorrect operation of sensing that the fuel lid 16 is closed even if the fuel lid 16 is open, can be prevented. This sensing of the lid closed position is suitable to vehicle of types in which, for example, the fuel supply port is opened after the pressure of the fuel tank interior is decreased.

Fifth Embodiment

Figure 41:
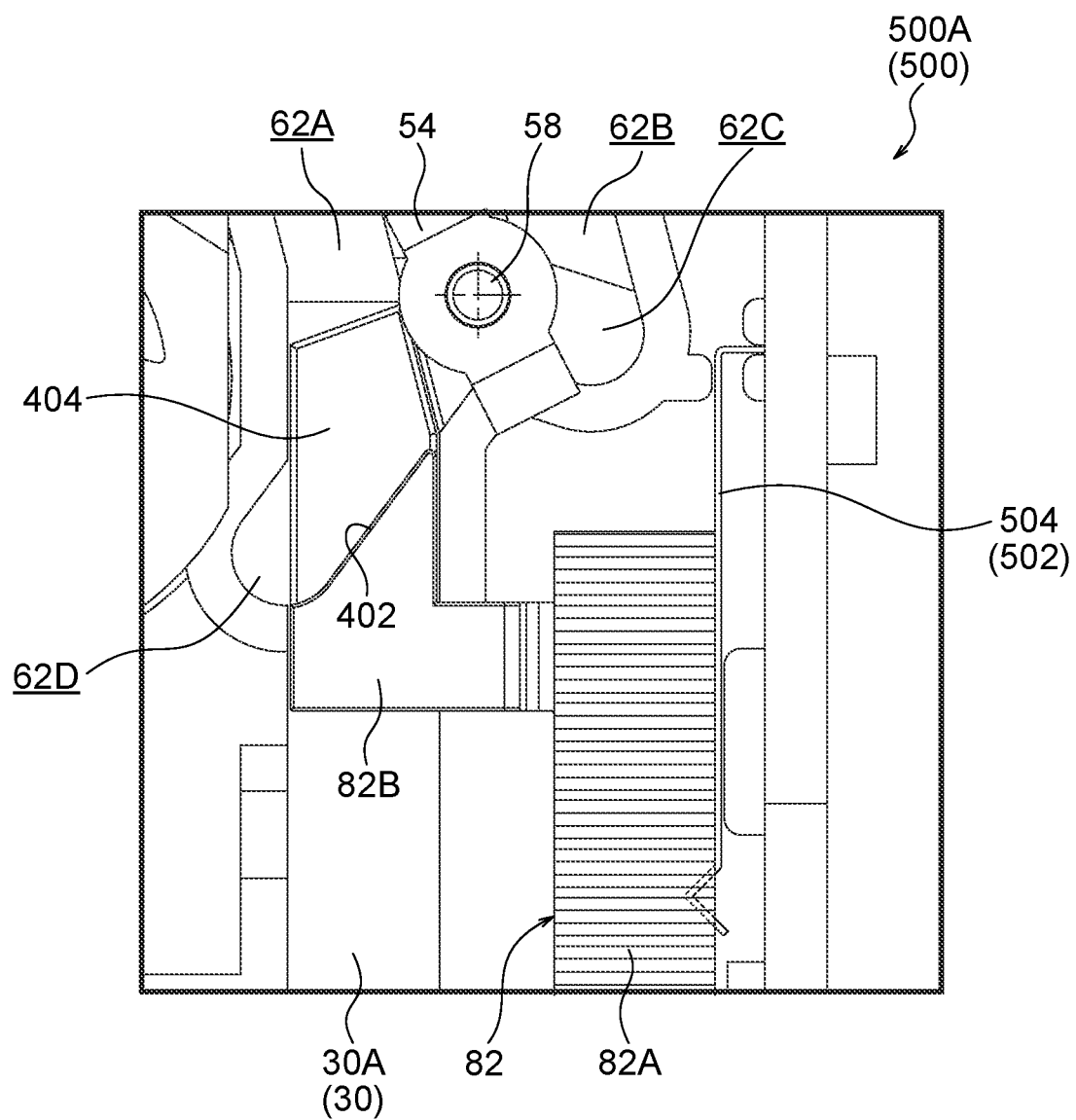
FIG. 41 is a side view showing a portion of a fuel lid opener relating to a fifth embodiment of the present invention in an enlarged manner, and is a drawing showing a plate spring type.
Figure 42:
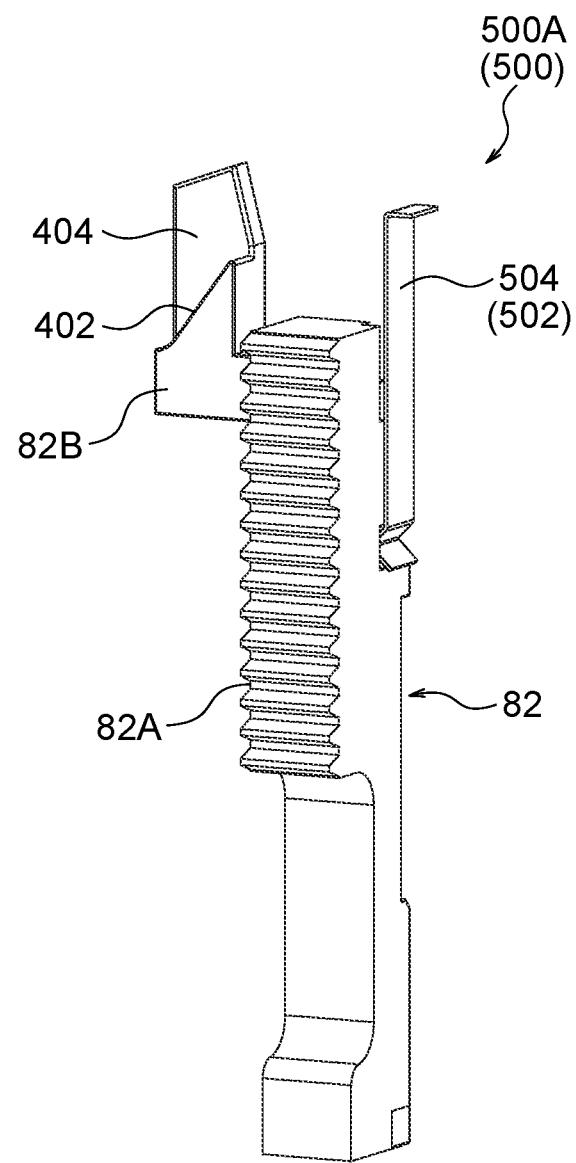
FIG. 42 is a perspective view showing the stopper and a plate spring.
Figure 43:
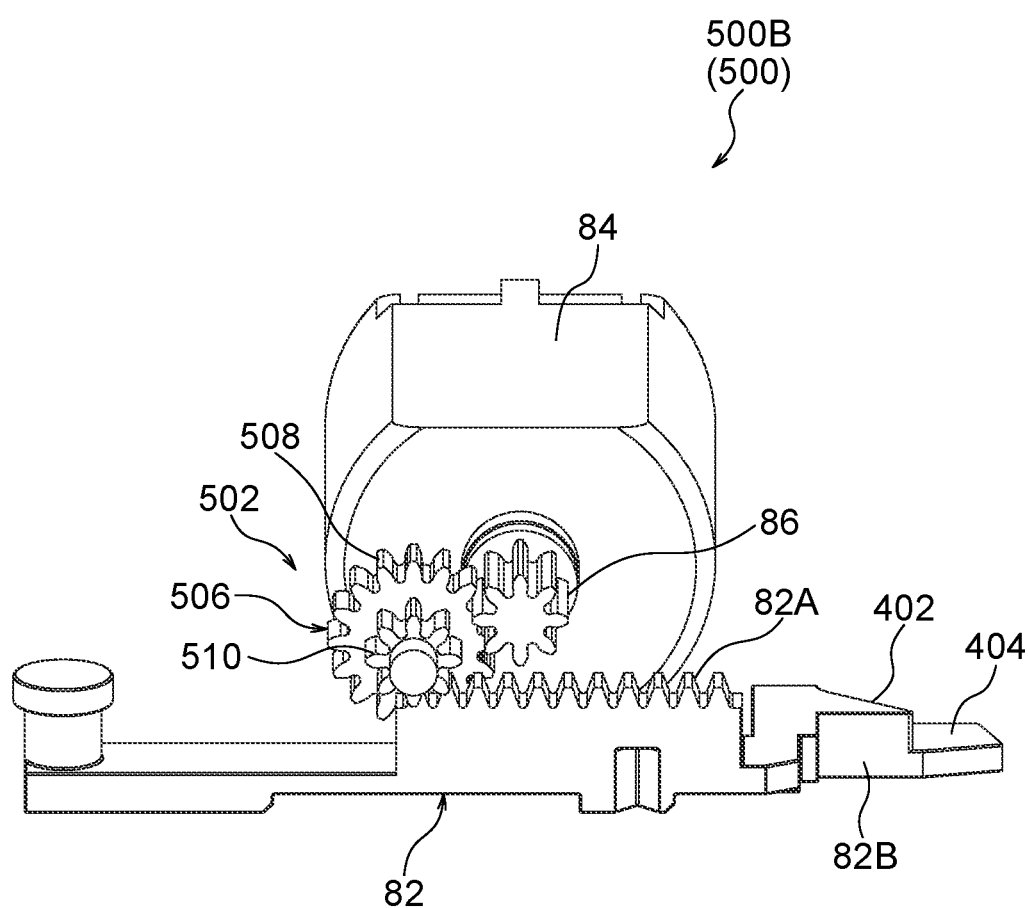
FIG. 43 is a perspective view showing a portion of the fuel lid opener relating to the fifth embodiment of the present invention in an enlarged manner, and is a drawing showing a two-stage gear pinion type.
Figure 44:
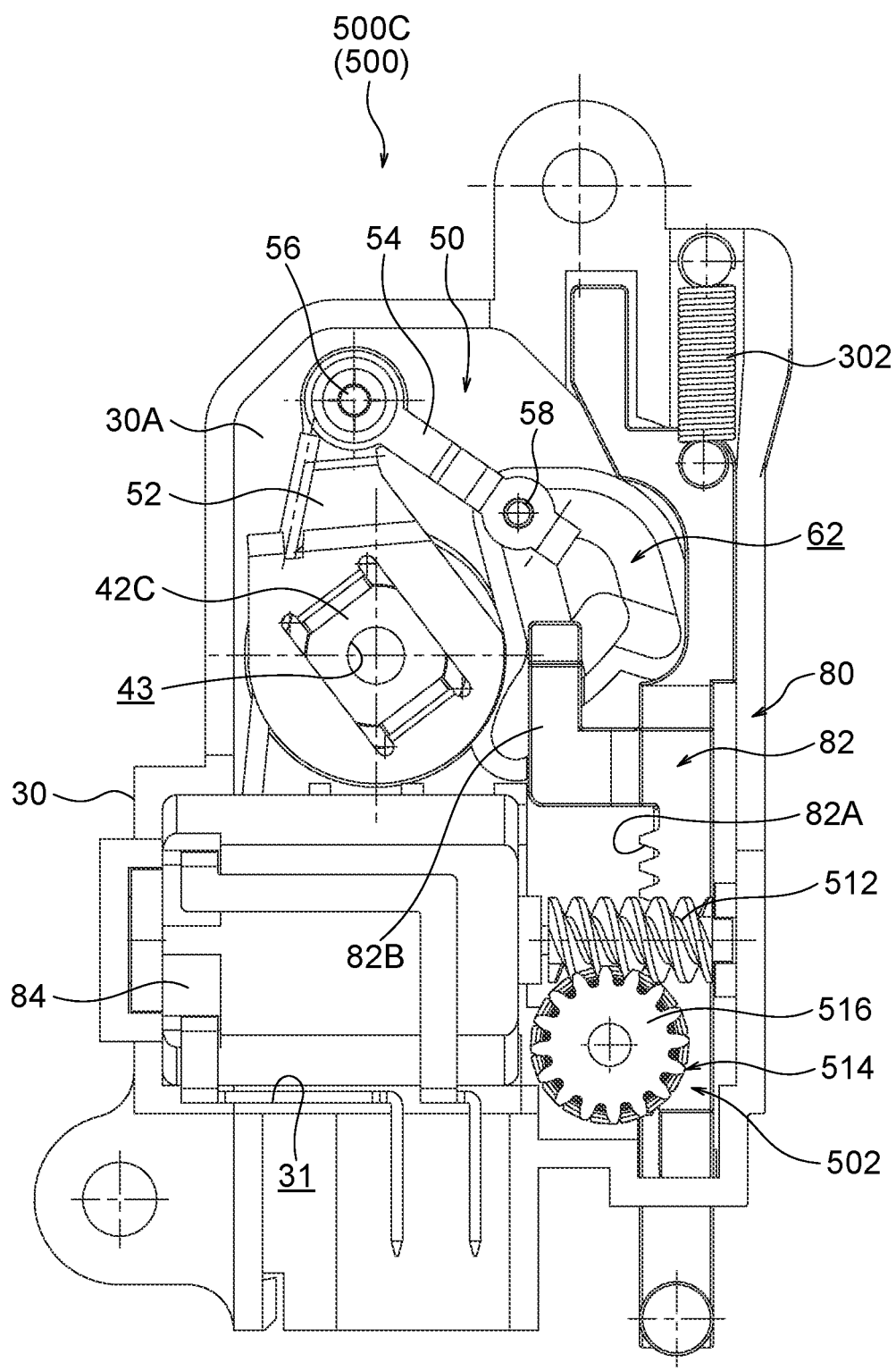
FIG. 44 is a side view showing a state in which the cover has been removed from the case of the fuel lid opener relating to the fifth embodiment of the present invention, and is a drawing showing a two-stage gear worm type.

Next, a fuel lid opener 500 relating to a fifth embodiment of the present invention is described by using FIG. 41 and FIG. 42. The fuel lid opener 500 relating to this embodiment is structured such that a stopper holding portion 502, which restricts or suppresses inadvertent displacement of the stopper 82 from the locking position, is added to the fuel lid openers relating to the above-described respective embodiments. This stopper holding portion 502 is a structure that releases the above-described holding by the forward rotation of the motor 84. Examples of the fuel lid opener 500 having this stopper holding portion 502 are a spring plate type 500A that is shown in FIG. 41 and FIG. 42, a two-stage gear pinion type 500B that is shown in FIG. 43, and a two-stage gear worm type 500C that is shown in FIG. 44. Note that the stopper 82 that is shown in FIG. 41 through FIG. 43 is, as an example, a type that does not have the mechanism operating portion 82C, and the stopper 82 that is shown in FIG. 44 is, as an example, a type that has the mechanism operating portion 82C.

In the plate spring type shown in FIG. 41 and FIG. 42, in the state in which the stopper 82 is positioned at the locking position, a plate spring 504 that is mounted to the case 30 hooks on the stopper 82, and the stopper 82 is held at the locking position. The stopper 82 inadvertently moving from the locking position due to external force can be prevented by this plate spring 504. This is a structure in which the above-described holding (the above-described hooking) is forcibly released by the forward rotation of the motor 84 for displacing the stopper 82 to the lock releasing position by the forward rotation of the motor 84.

In the two-stage gear pinion type shown in FIG. 43, a two-stage gear 506 is provided between the pinion 86 that is mounted to the output shaft of the motor 84, and the rack teeth 82A of the stopper 82. This two-stage gear 506 is structured such that a large-diameter gear portion 508, which is a spur gear that meshes with the pinion 86, and a small-diameter gear portion 510, which is a spur gear that meshes with the rack teeth 82A, are joined coaxially and integrally. Due thereto, the reduction ratio of the gear mechanism that includes the above-described two-stage gear 506 is high, and therefore, inadvertent displacement of the stopper 82 due to external force can be suppressed by this high reduction ratio. Further, the stopper 82 can be displaced well by the motor 84 that is compact. Note that it is preferable to use this two-stage gear pinion type together with the above-described plate spring type.

In the two-stage gear worm type shown in FIG. 44, a two-stage gear 514 is provided between a worm gear 512, which is mounted to the output shaft of the motor 84, and the rack teeth 82A of the stopper 82. This two-stage gear 514 is structured such that a large-diameter gear portion 516, which is a helical gear that meshes with the worm gear 512, and a small-diameter gear portion (not illustrated), which is a spur gear that meshes with the rack teeth 82A, are joined coaxially and integrally. Due thereto, the reduction ratio of the gear mechanism that includes the above-described two-stage gear 514 is high, and therefore, inadvertent displacement of the stopper 82 can be restricted by so-called self-locking. Further, the stopper 82 can be displaced well by the motor 84 that is compact.

In this embodiment, the stopper 82 being displaced inadvertently from the locking position to the lock releasing position due to vibrations at the time when the vehicle travels or the like can be prevented or suppressed.

Sixth Embodiment

Figure 45A:
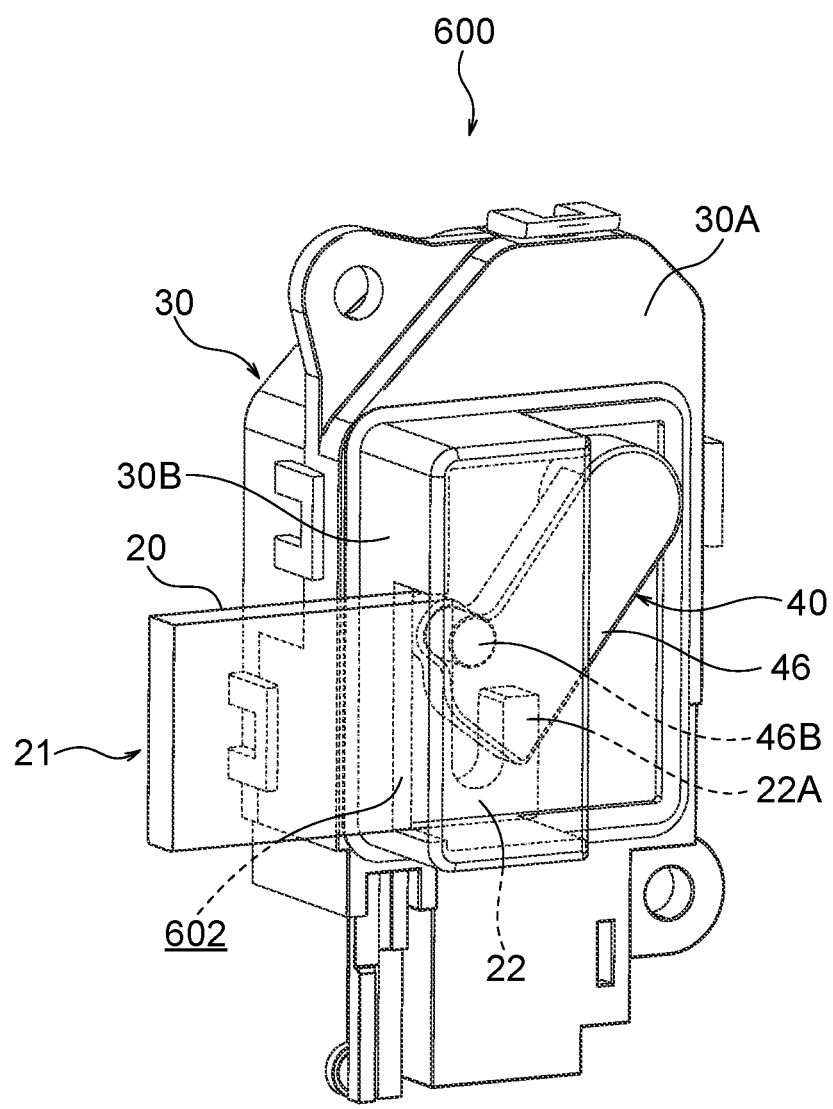
FIG. 45A is a perspective view showing a state in which the lifter is positioned at an advanced-out position, in a fuel lid opener relating to a sixth embodiment of the present invention.
Figure 45C:
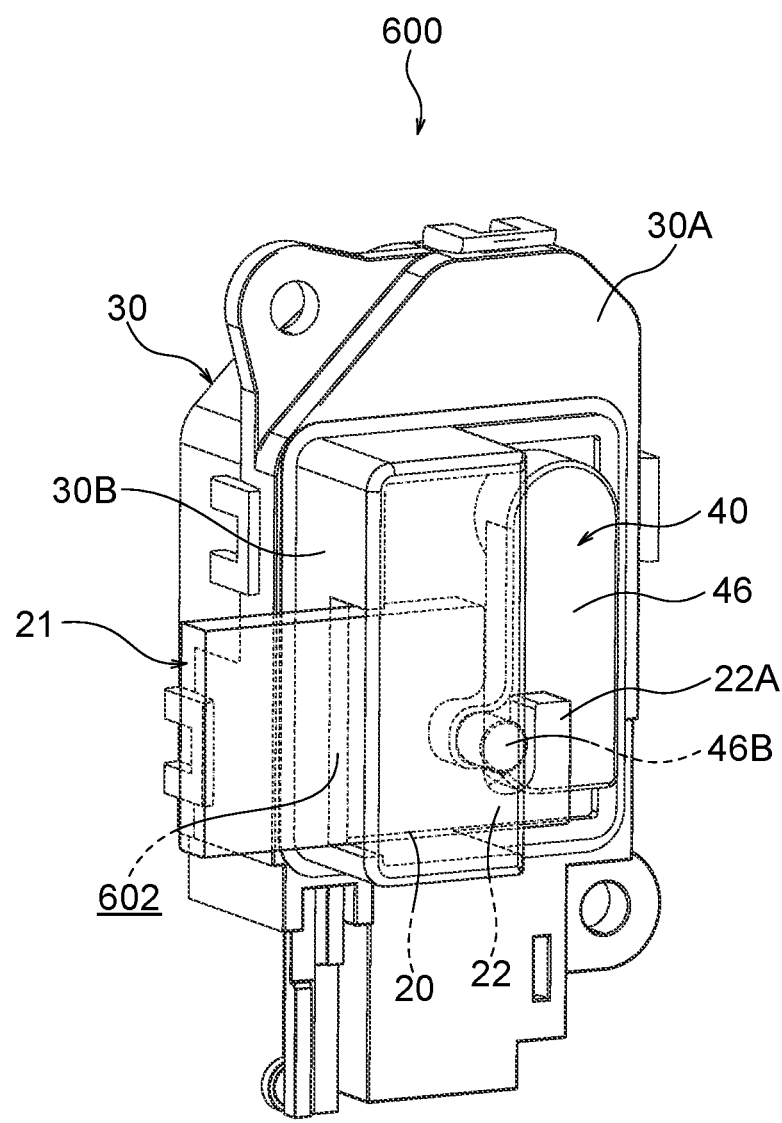
FIG. 45C is a perspective view showing a state in which the lifter is positioned at a withdrawn position, in the fuel lid opener relating to the sixth embodiment of the present invention.

Next, a fuel lid opener 600 relating to a sixth embodiment of the present invention is described by using FIG. 45A through FIG. 45C. This fuel lid opener 600 is a structure that is basically similar to the fuel lid openers relating to the above-described respective embodiments, but the case 30 of this fuel lid opener 600 has a side surface cover portion 30B for preventing the arm portion 46 of the lifter 40 from being wrongly pushed-in at the time of refueling. Here, this side surface cover portion 30B is formed integrally with the base wall 30A of the case 30, and is formed in the shape of a box whose vehicle transverse direction inner side is open. The arm portion 46 of the lifter 40 is covered from the vehicle transverse direction outer side by this side surface cover portion 30B.

Figure 16:
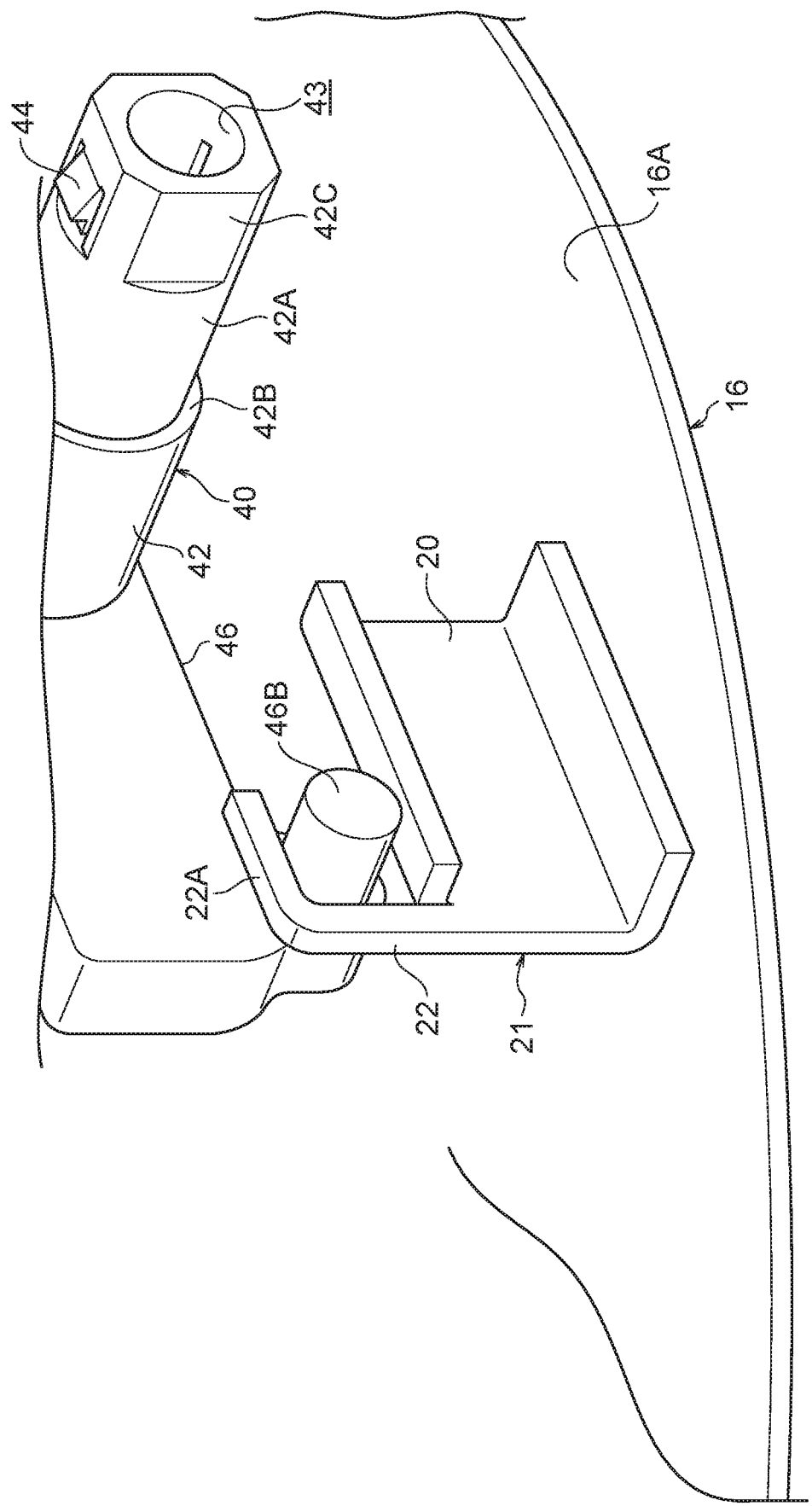
FIG. 16 is a perspective view showing the modified example of the fuel lid relating to the first embodiment of the present invention.
Figure 17:
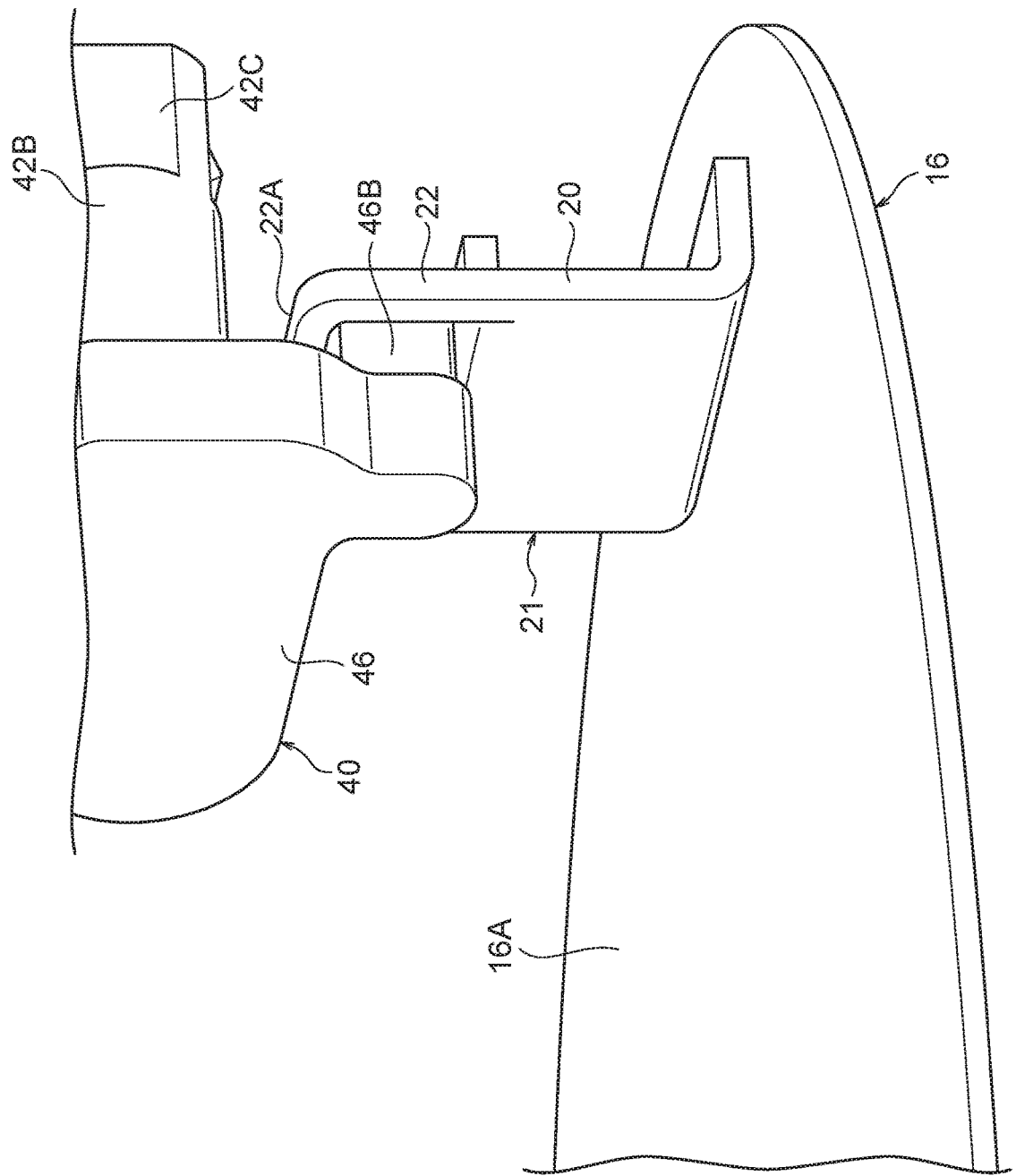
FIG. 17 is a perspective view in which the structure shown in FIG. 16 is seen from a different angle than in FIG. 16.
Figure 18:
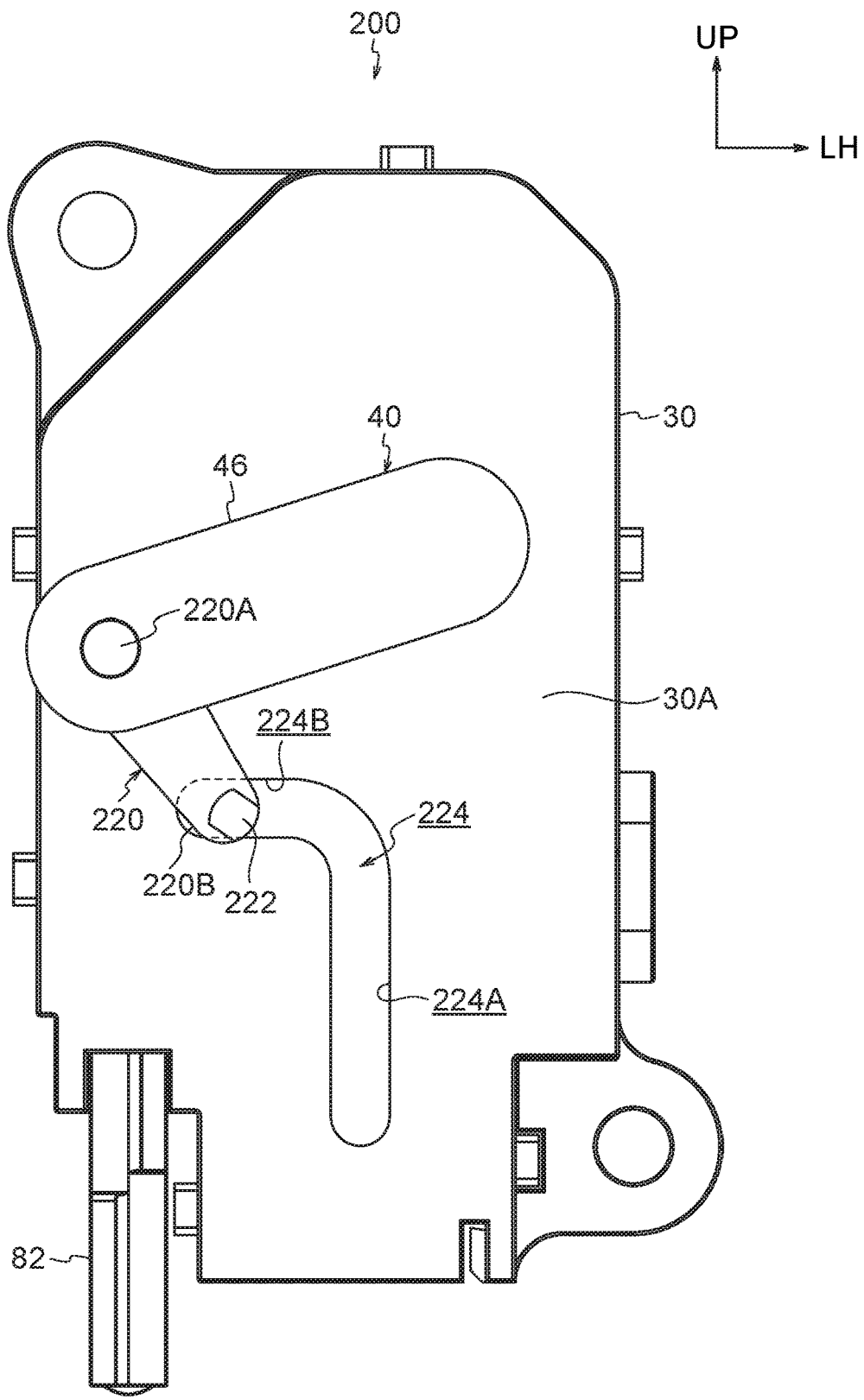
FIG. 18 is a one side view showing a fuel lid opener relating to a second embodiment of the present invention.
Figure 19:
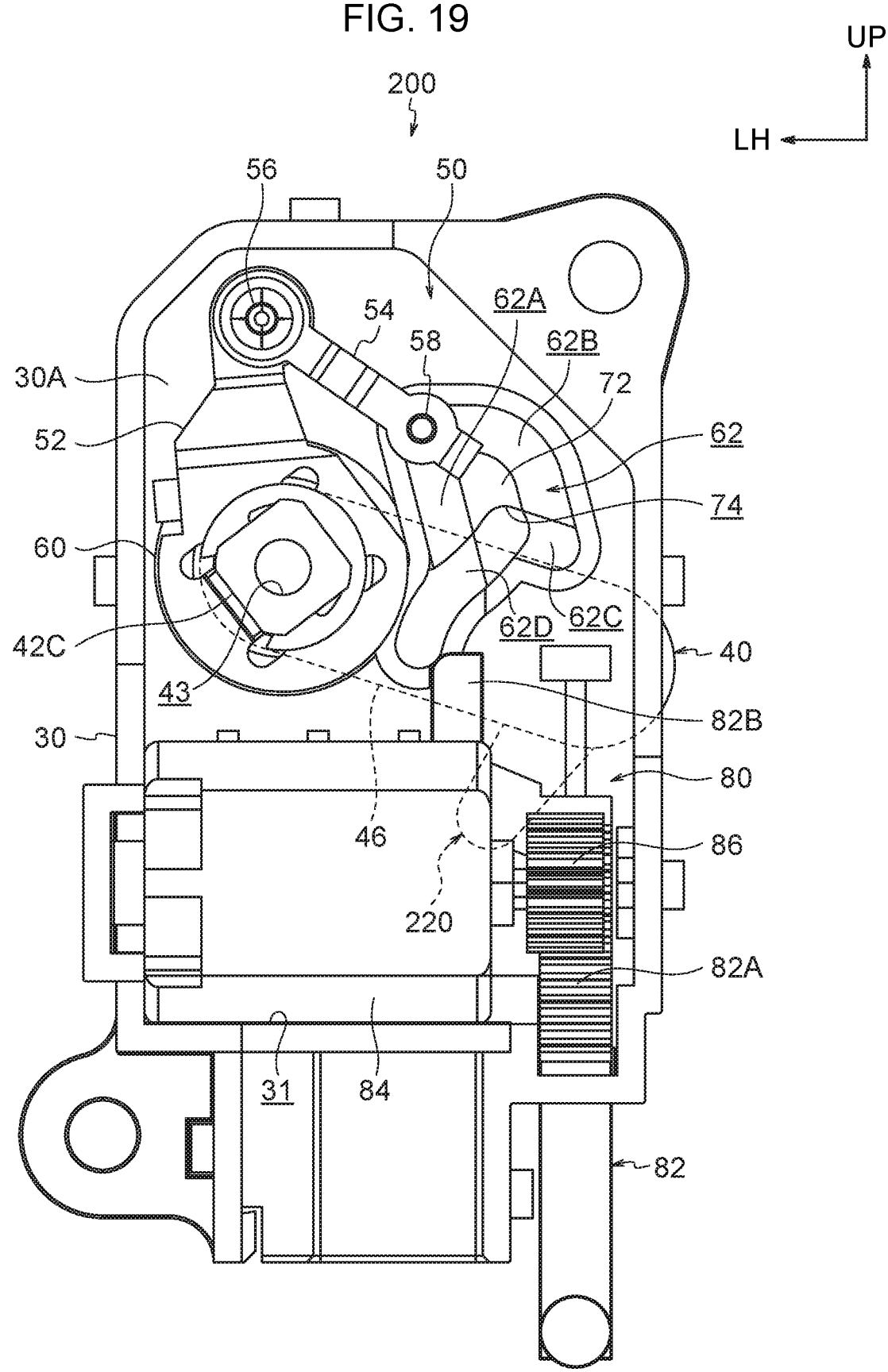
FIG. 19 is another side view showing a state in which the cover is removed from the case of the fuel lid opener shown in FIG. 18, and is a drawing showing a state in which the lifter is positioned at an advanced-out position and a stopper is positioned at a lock releasing position.
Figure 20:
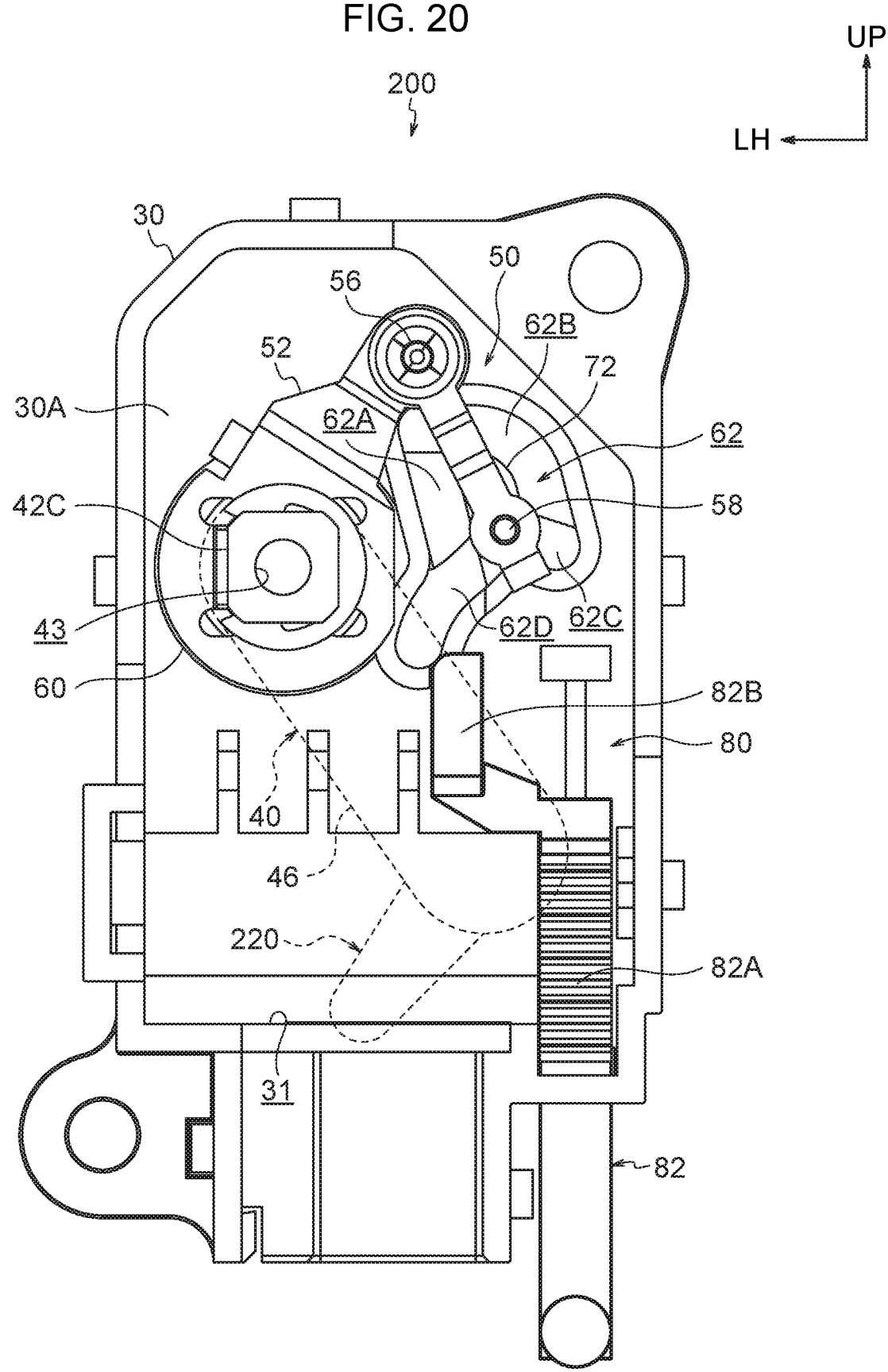
FIG. 20 is a side view corresponding to FIG. 19 and showing a state in which the lifter is positioned at a withdrawn position.
Figure 21:
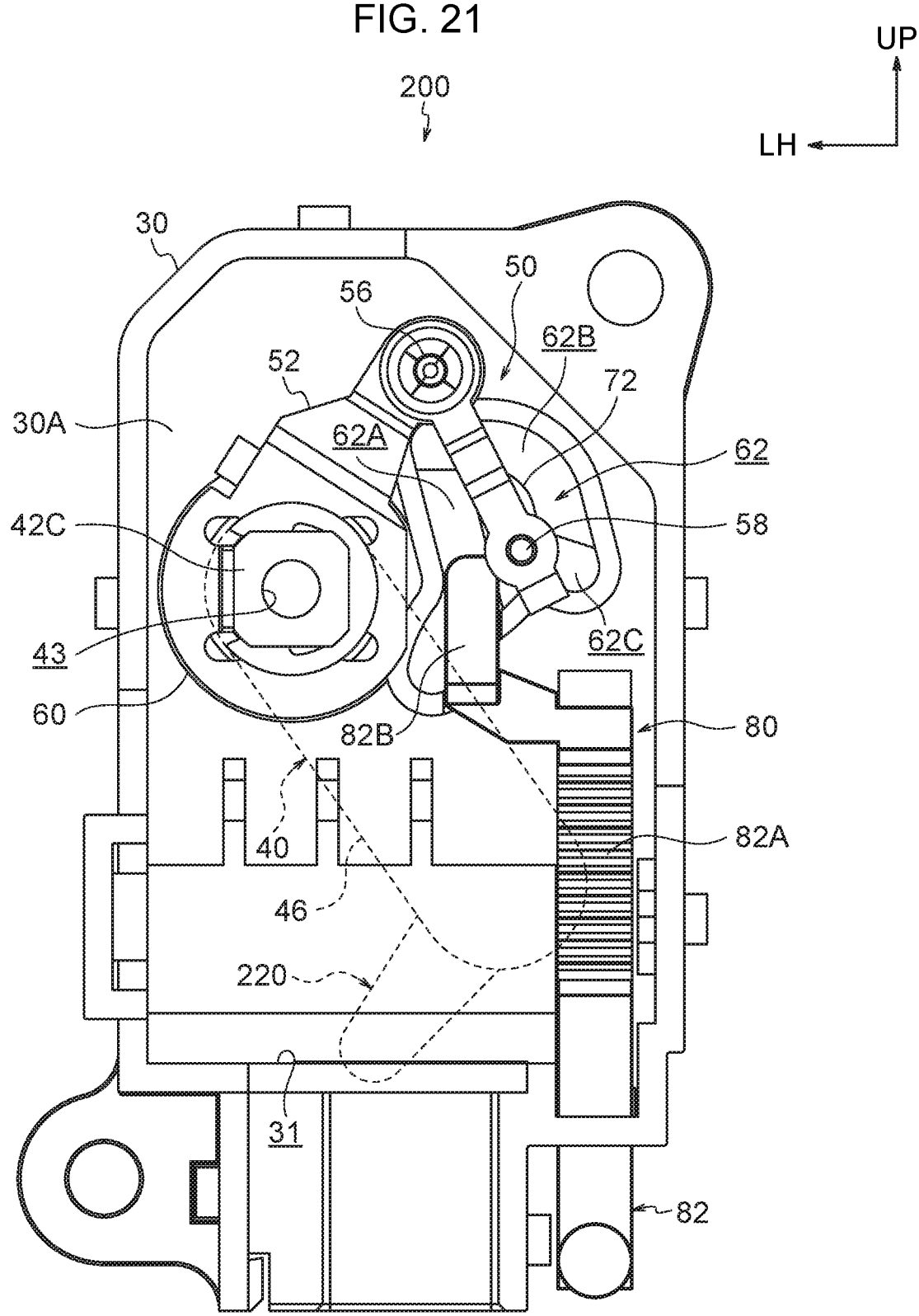
FIG. 21 is a side view that corresponds to FIG. 20 and shows a state in which the stopper is positioned at a locking position.
Figure 22:
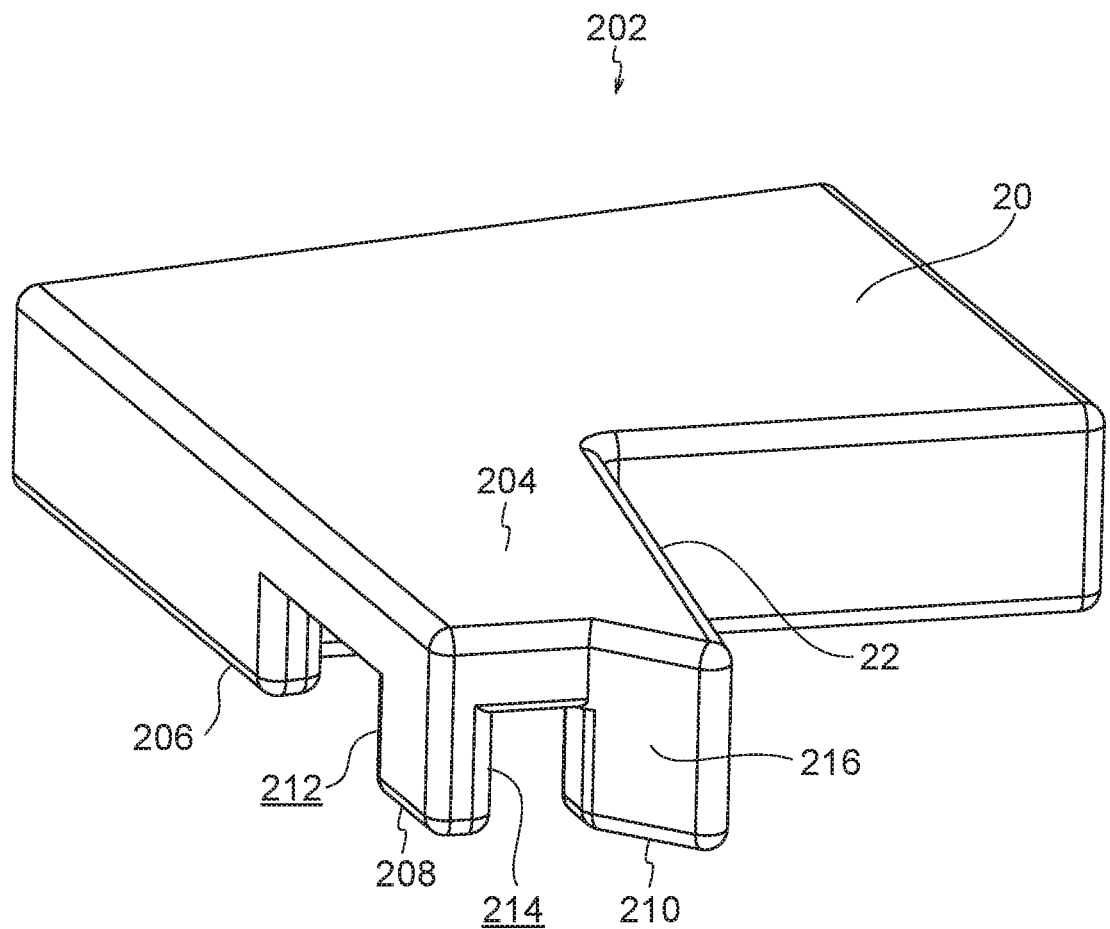
FIG. 22 is a perspective view showing a pushing portion and an engaged portion of the fuel lid relating to the second embodiment of the present invention.

A through-hole 602, which is shaped as an elongated rectangle whose length runs along the vehicle vertical direction (the length direction of the case 30), is formed in the vehicle transverse direction outer side wall portion of this side surface cover portion 30B. This through-hole 602 is formed to a width of an extent such that a user cannot insert their finger or the like therein. The lifter engaging portion 21 that is provided at the reverse surface 16A of the fuel lid 16 is inserted in this through-hole 602 at the time of closing the fuel lid 16. This lifter engaging portion 21 is basically similar to the lifter engaging portion 21 that is shown in FIG. 16 and FIG. 17, but here, is formed in the shape of a flat plate from a metal plate or the like. Note that the shapes of the side surface cover portion 30B and the through-hole 602 are not limited to the shapes shown in FIG. 45A through FIG. 45C, and can be changed appropriately. For example, the side surface cover portion 30B may be a portion at which the side opposite the side wall 30A of the case 30 is open. Further, the side surface cover portion 30B may be a portion that is molded separately from the case 30 and is mounted to the case 30.

In this embodiment, the fuel gun or the arm of the user or the like inadvertently hitting the arm portion 46 of the lifter 40 at the time of refueling can be prevented by the above-described side surface cover portion 30B. Therefore, the arm portion 46 of the lifter 40 being wrongly pushed in to the withdrawn position can be prevented. Due thereto, the trouble of returning the lifter 40, which has been wrongly pushed in to the withdrawn position, to the advanced-out position can be eliminated. Namely, in the case of the above-described manual opening type and push sensing type for example, the aforementioned trouble is the trouble of pushing the arm portion 46 of the lifter 40 in further toward the vehicle transverse direction inner side than the withdrawn position, and, in the case of the above-described automatic opening type, the aforementioned trouble is the trouble of pushing the in-cabin switch one more time. However, in the present embodiment, such troubles can be eliminated.

Additional Description of Embodiments

Note that the above-described third embodiment describes a case in which the fuel lid opener 200 relating to the second embodiment is changed to an automatic opening type, but the present disclosure is not limited to this, and the fuel lid opener 10 relating to the first embodiment may be changed to an automatic opening type. In this case, it suffices to, in the fuel lid opener 10 relating to the first embodiment, add a mechanism operating portion to the stopper 82, and to add an urging member such as the tension coil spring 302 or the like.

Further, although the fuel lid opener 300 relating to the above-described third embodiment is structured to have the tension coil spring 302 as the urging member, the present disclosure is not limited to this. For example, there may be a structure in which, after the motor 84 is rotated forward, and the stopper 82 is moved from the locking position to the lock releasing position, the motor 84 is rotated reversely, and the stopper 82 is returned to the locking position. In this case, for example, there is the need to provide, at the case 30 or the like, a holding portion that holds the stopper 82 at the locking position and that can release the aforementioned holding at the time when the motor 84 rotates forward (e.g., a portion that holds the stopper 82 by frictional force).

Further, although the above-described respective embodiments are structured such that the entire lifter 40 is the "rotating portion", the present disclosure is not limited to this. For example, the lifter may be structured by a pinion that is rotatably supported at the case 30, and a rack that meshes with this pinion. In this case, there is a structure in which the aforementioned pinion that is a portion of the lifter 40 is the "rotating portion", and the aforementioned rack is supported so as to be able to advance-out with respect to the case 30. In this case, the aforementioned rack is a structure that contacts the fuel lid 16, which is in the closed state, from the reverse surface 16A side.

Further, the above-described respective embodiments are structured such that the case 30 of the fuel lid opener 10, 200, 300, 400, 500, 600 is mounted to the rear surface of the rear wall 14A3 of the lid box 14, but the present disclosure is not limited to this. For example, there may be a structure in which the case 30 is mounted to the upper surface of the upper wall 141A1 of the lid box 14, or there may be a structure in which the case 30 is mounted to the lower surface of the lower wall 14A2 of the lid box 14.

Further, although the above-described respective embodiments are structured such that the fuel lid opener 10, 200, 300, 400, 500, 600 is provided with the locking mechanism 80, the present disclosure is not limited to this, and there may be a structure in which the locking mechanism 80 is omitted.

Further, although the above-described respective embodiments are structured such that the push lifter mechanism is the heart cam mechanism 50, the present disclosure is not limited to this, and there may be a structure in which the push lifter mechanism is a knock cam mechanism.

Further, although the above-described respective embodiments are structured such that the drive source of the locking mechanism 80 is the motor 84, the present disclosure is not limited to this. The drive source of the locking mechanism 80 may be, for example, a solenoid (an electromagnetic valve). Further, a servo motor is included among motors that serve as the drive source of the locking mechanism 80.

Further, although the above-described respective embodiments describe cases in which the fuel lid opener 10, 200, 300, 400, 500, 600 is a structural component of the fuel lid assembly 12, the present disclosure is not limited to this. The fuel lid opener 10 relating to the present embodiment can be applied also as the opener of a lid (a cover) that is provided at an electrical appliance or the like for example.

In addition, the present invention can be implemented by being modified in various ways within a scope that does not depart from the gist thereof. Further, the scope of the right of the present invention is, of course, not limited to the above-described respective embodiments.

Note that the disclosure of Japanese Patent Application No. 2018-103773 filed on May 30, 2018 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A fuel lid opener comprising:
   a case that is mounted to a lid box at which a fuel lid is pivotally supported so as to be able to open and close;
   a lifter that is supported so as to be able to advance or withdraw with respect to the case, and that contacts the fuel lid, which is in a closed state, from a reverse surface side;
   a push lifter mechanism that is provided within the case, and that is structured so as to cause the lifter to alternately repeat advancing-out and withdrawing, each time the lifter is push-operated via the fuel lid, and so as to push the fuel lid open due to advancing-out of the lifter; and
   a locking mechanism having a stopper, which is supported at the case so as to be movable between a locking position, at which the stopper restricts operation of the push lifter mechanism, and a lock releasing position, at which the stopper releases the restricting, and having a drive source that can move the stopper from the locking position to the lock releasing position, wherein, at a time when the stopper is moved to the lock releasing position, the stopper engages with the push lifter mechanism, operates the push lifter mechanism, and causes the lifter to advance-out.

2. The fuel lid opener of claim 1, wherein:
   the locking mechanism has an urging member that returns the stopper, which has been moved to the lock releasing position, to the locking position, and
   the push lifter mechanism is structured so as to permit withdrawing of the lifter at a time of closing the fuel lid, in a state in which the stopper is positioned at the locking position.

3. The fuel lid opener of claim 1, wherein the lifter has an engaging portion that engages with an engaged portion provided at a reverse surface of the fuel lid, and that restrains the fuel lid in the closed state, engagement being released by advancing-out of the lifter at a time of pushing the fuel lid open.

4. The fuel lid opener of claim 1, wherein:
   the lifter has a rotating portion that rotates with respect to the case due to the lifter advancing or withdrawing with respect to the case, and
   the push lifter mechanism is a heart cam mechanism having:
   a cam groove that is formed in a heart shape as seen from a direction running along a rotation axis of the rotating portion;
   a first link that is mounted to the rotating portion; and
   a second link that is rotatably connected to the first link, and that has a guided portion that is inserted in the cam groove.

5. The fuel lid opener of claim 4, wherein the stopper has:
   a stopper portion that is entered in the cam groove in a state in which the stopper is positioned at the locking position; and
   a mechanism operating portion that engages with the guided portion and operates the heart cam mechanism at a time when the stopper is moved to the lock releasing position.

6. The fuel lid opener of claim 4, wherein the push lifter mechanism has a torsion spring, a spiral spring or a power spring, which is disposed coaxially with the rotation axis of the rotating portion of the lifter and that urges the lifter in an advancing-out direction.

\* \* \* \* \*